(12) United States Patent
Dohmae et al.

(10) Patent No.: US 12,131,085 B2
(45) Date of Patent: Oct. 29, 2024

(54) SYSTEM AND METHOD FOR TRANSMITTING ELECTRONIC DATA ASSOCIATED WITH A USER IDENTIFIED BASED ON SOURCE IDENTIFICATION INFORMATION

(71) Applicant: Ricoh Company, Ltd., Tokyo (JP)

(72) Inventors: Kota Dohmae, Kanagawa (JP); Xiaofeng Han, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 18/135,188

(22) Filed: Apr. 17, 2023

(65) Prior Publication Data
US 2023/0251805 A1  Aug. 10, 2023

Related U.S. Application Data

(63) Continuation of application No. 17/557,041, filed on Dec. 21, 2021, now Pat. No. 11,656,817.

(30) Foreign Application Priority Data

Dec. 25, 2020 (JP) ................. 2020-217199

(51) Int. Cl.
*G06F 3/12* (2006.01)
*H04L 9/40* (2022.01)

(52) U.S. Cl.
CPC .......... *G06F 3/1238* (2013.01); *G06F 3/1205* (2013.01); *G06F 3/1222* (2013.01);
(Continued)

(58) Field of Classification Search
CPC .... G06F 3/1238; G06F 3/1205; G06F 3/1222; G06F 16/58; H04L 63/08
(Continued)

(56) References Cited

U.S. PATENT DOCUMENTS

| 10,291,820 | B2 | 5/2019 | Kanno |
| 2007/0081186 | A1* | 4/2007 | Numata ................. G06F 3/1212 358/1.15 |

(Continued)

FOREIGN PATENT DOCUMENTS

| JP | 2008-211646 A | 9/2008 |
| JP | 2017-111799 | 6/2017 |

(Continued)

OTHER PUBLICATIONS

Web site http://www.printing.ne.jp/index_p.html from web.archive.org, Nov. 1, 2020, with machine translation of text characters on web page.

(Continued)

*Primary Examiner* — Jamares Q Washington
(74) *Attorney, Agent, or Firm* — XSENSUS LLP

(57) ABSTRACT

An output system, a system, and an output method. The output system communicates with an output apparatus and an information processing apparatus, and transmits, in response to a request from the output apparatus for electronic data including source identification information received from the information processing apparatus, electronic data associated with a user identified based on the source identification information to the output apparatus.

18 Claims, 41 Drawing Sheets

(52) U.S. Cl.
CPC ............ *G06F 3/1236* (2013.01); *G06F 3/126* (2013.01); *G06F 3/1288* (2013.01); *H04L 63/08* (2013.01)

(58) Field of Classification Search
USPC .............................. 358/1.14, 1.15, 405, 403
See application file for complete search history.

(56) References Cited

U.S. PATENT DOCUMENTS

| | | |
|---|---|---|
| 2009/0059274 A1 | 3/2009 | Tomita |
| 2011/0035583 A1 | 2/2011 | Hashimoto |
| 2012/0147420 A1* | 6/2012 | Nishimi ................ G06F 3/1292 358/1.15 |
| 2012/0218599 A1* | 8/2012 | Kashioka .............. G06F 3/1238 358/1.15 |
| 2015/0154484 A1* | 6/2015 | Iwasaki ................ G06F 3/1222 358/1.14 |
| 2015/0169266 A1 | 6/2015 | Iwasaki et al. |
| 2015/0339561 A1* | 11/2015 | Takenaka ............. G06F 3/1238 358/1.14 |
| 2016/0253127 A1* | 9/2016 | Panda .............. G06K 19/06112 358/1.15 |
| 2017/0171399 A1 | 6/2017 | Yamada et al. |
| 2020/0174720 A1 | 6/2020 | Kunimatsu |

FOREIGN PATENT DOCUMENTS

| | | |
|---|---|---|
| JP | 2017-173914 | 9/2017 |
| JP | 2018-030266 A | 3/2018 |
| JP | 2018-067971 | 4/2018 |
| JP | 2019-159971 A | 9/2019 |
| WO | 2013/052641 A2 | 4/2013 |

OTHER PUBLICATIONS

Extended European Search Report issued May 24, 2022, in corresponding European Patent Application 21212557.9.
Notice of Reasons for Refusal issued Jun. 4, 2024 in Japanese Patent Application No. 2020-217199 with English translation thereof, 13 pages.

* cited by examiner

FIG. 7

| PRINT JOB ID | TENANT ID | USER ID | FILE NAME | PRINT DATA PATH | PRINT RESERVATION |
|---|---|---|---|---|---|
| 000001 | 12345678 | USER A | A.DOC | http://host.domain/files/xxx | FALSE |
| 000002 | 12345678 | USER A | B.DOC | http://host.domain/files/yyy | FALSE |
| 000003 | 12345678 | USER A | C.DOC | http://host.domain/files/zzz | FALSE |
| 000004 | 12345678 | USER B | FILE.PDF | http://host.domain/files/aaa | FALSE |
| 000005 | 567891234 | USER C | IMAGE.IMG | http://host.domain/files/bbb | FALSE |
| ⋮ | ⋮ | ⋮ | ⋮ | ⋮ | ⋮ |

FIG. 8

| PRINT JOB ID | TENANT ID | USER ID | FILE NAME | PRINT DATA PATH | PRINT RESERVATION |
|---|---|---|---|---|---|
| 000001 | 12345678 | USER A | A.DOC | http://host.domain/files/xxx | TRUE |
| 000002 | 12345678 | USER A | B.DOC | http://host.domain/files/yyy | TRUE |
| 000003 | 12345678 | USER A | C.DOC | http://host.domain/files/zzz | FALSE |
| 000004 | 12345678 | USER B | FILE.PDF | http://host.domain/files/aaa | FALSE |
| 000005 | 567891234 | USER C | IMAGE.IMG | http://host.domain/files/bbb | FALSE |
| ⋮ | ⋮ | ⋮ | ⋮ | ⋮ | ⋮ |

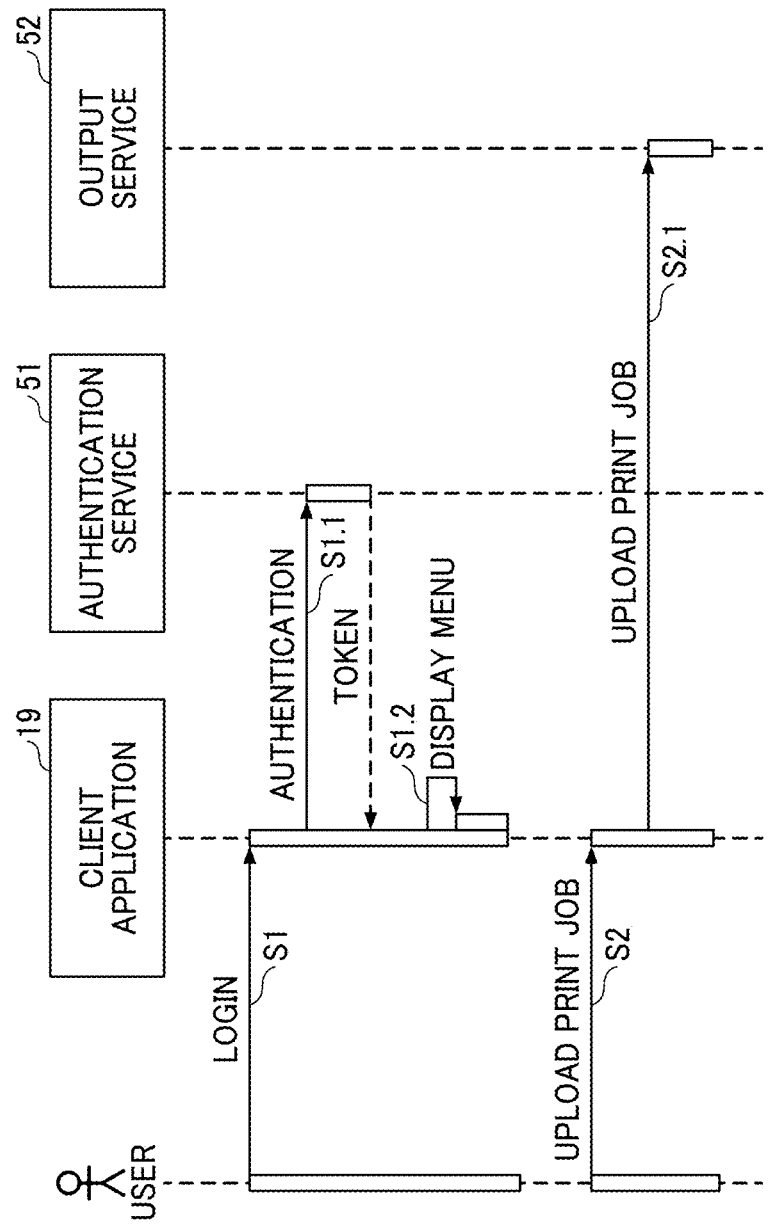

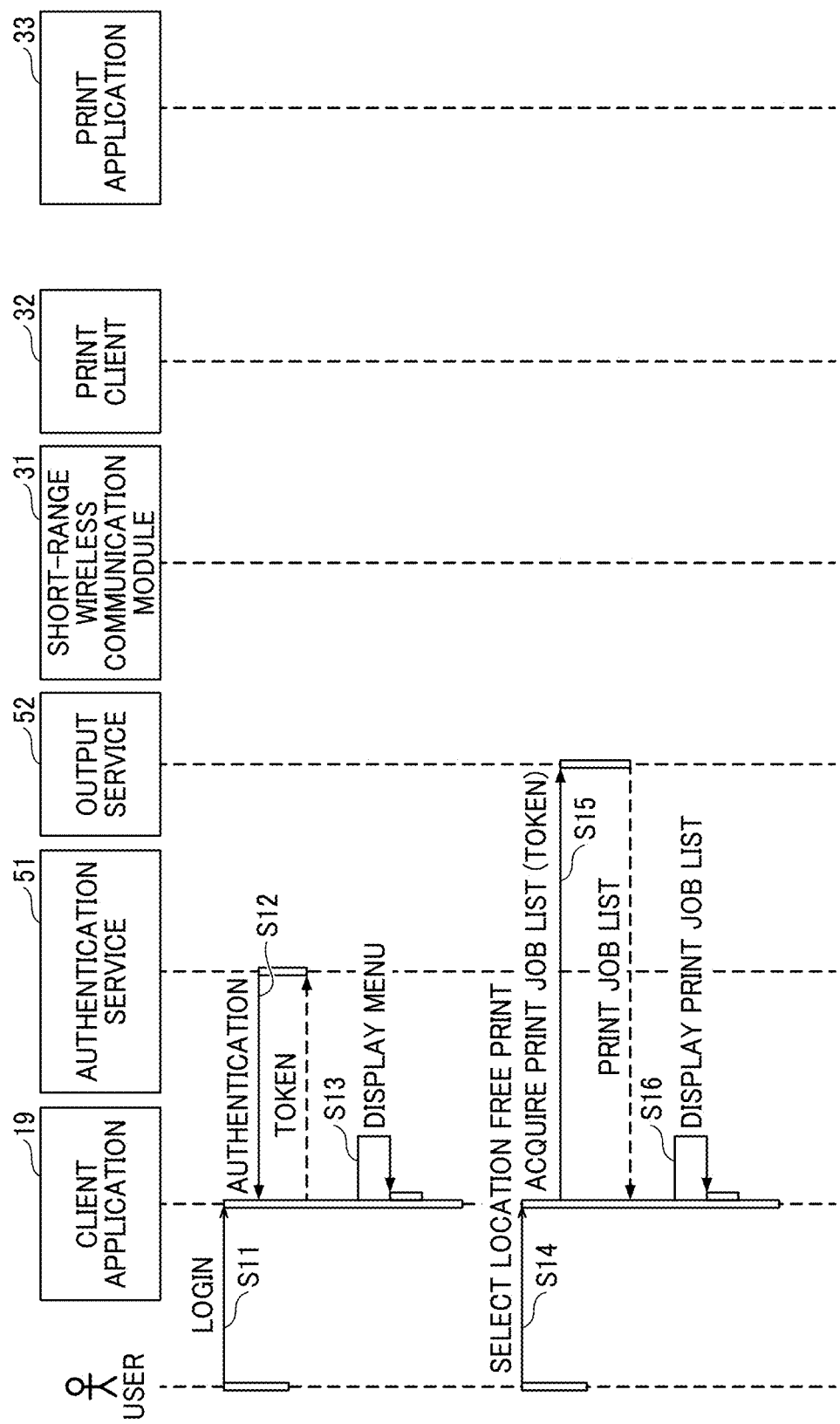

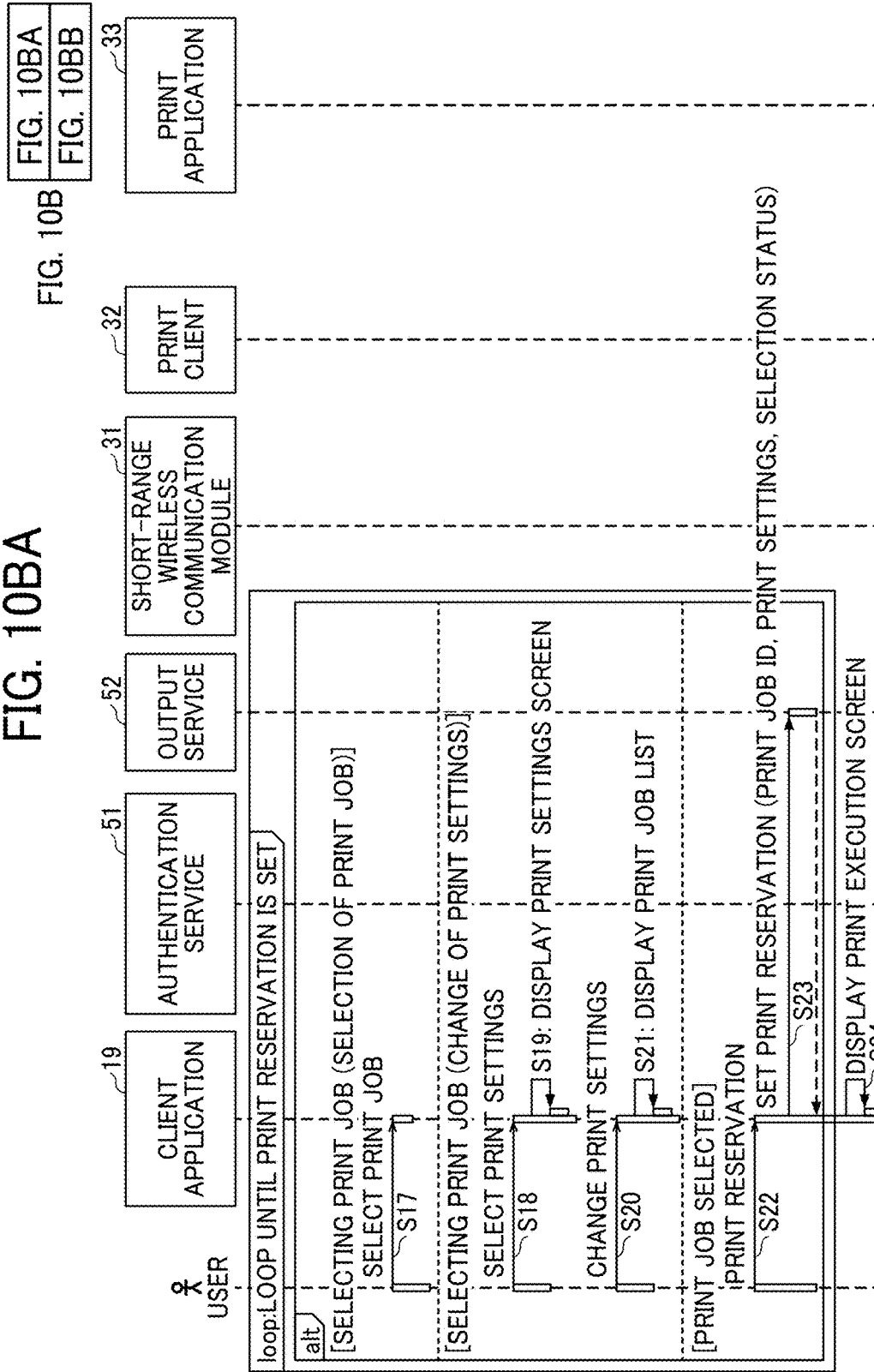

FIG. 11

| PRINT JOB ID | TENANT ID | USER ID | FILE NAME | PRINT DATA PATH | PRINT RESERVATION | ... |
|---|---|---|---|---|---|---|
| 000001 | 12345678 | USER A | A.DOC | http://host.domain/files/xxx | FALSE | ... |
| 000002 | 12345678 | USER A | B.DOC | http://host.domain/files/yyy | FALSE | ... |
| 000003 | 12345678 | USER A | C.DOC | http://host.domain/files/zzz | FALSE | ... |

FIG. 12

| PRINT JOB ID | TENANT ID | USER ID | FILE NAME | PRINT DATA PATH | PRINT RESERVATION | ... |
|---|---|---|---|---|---|---|
| 000001 | 12345678 | USER A | A.DOC | http://host.domain/files/xxx | TRUE | ... |
| 000002 | 12345678 | USER A | B.DOC | http://host.domain/files/yyy | TRUE | ... |
| 000003 | 12345678 | USER A | C.DOC | http://host.domain/files/zzz | FALSE | ... |

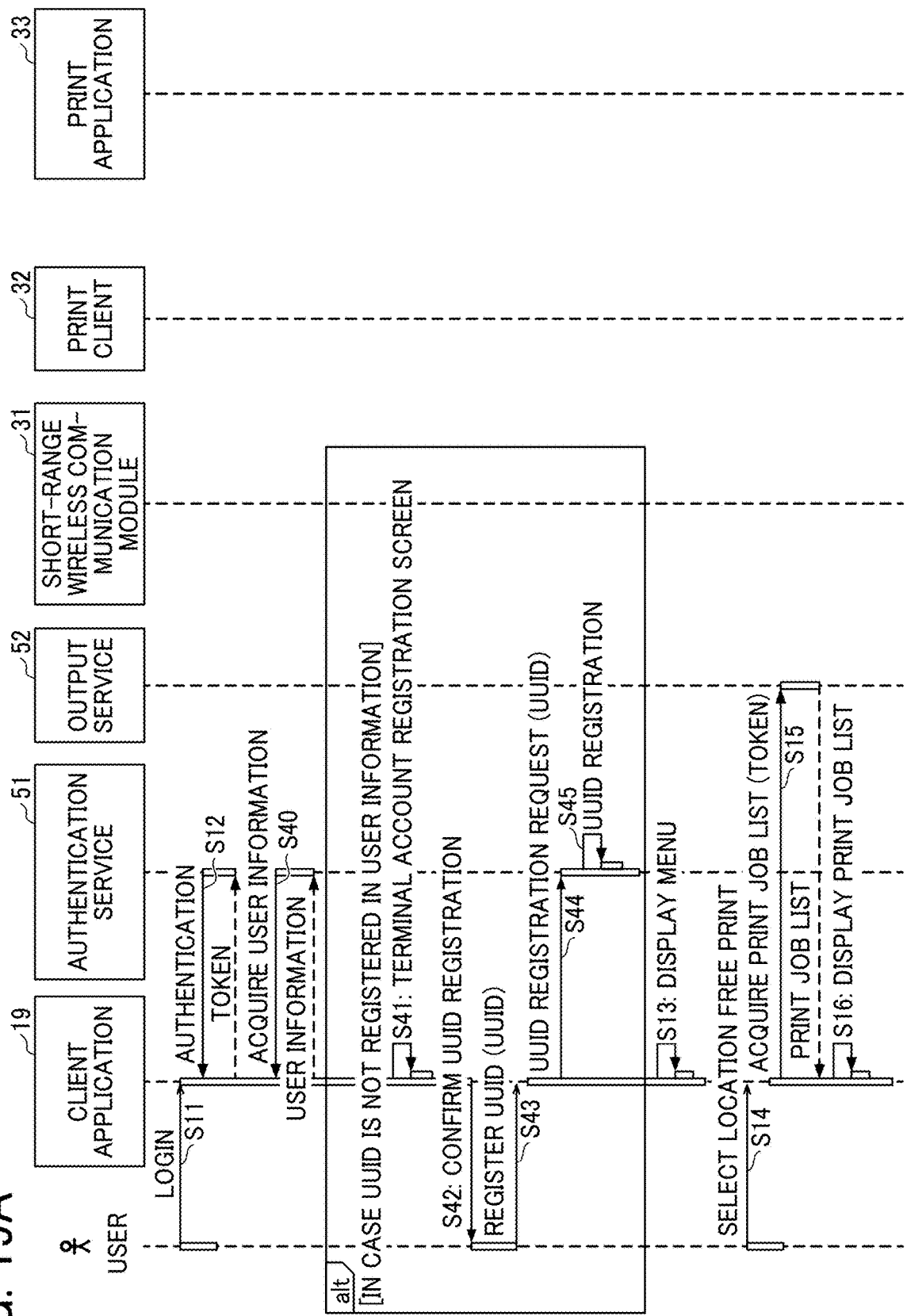

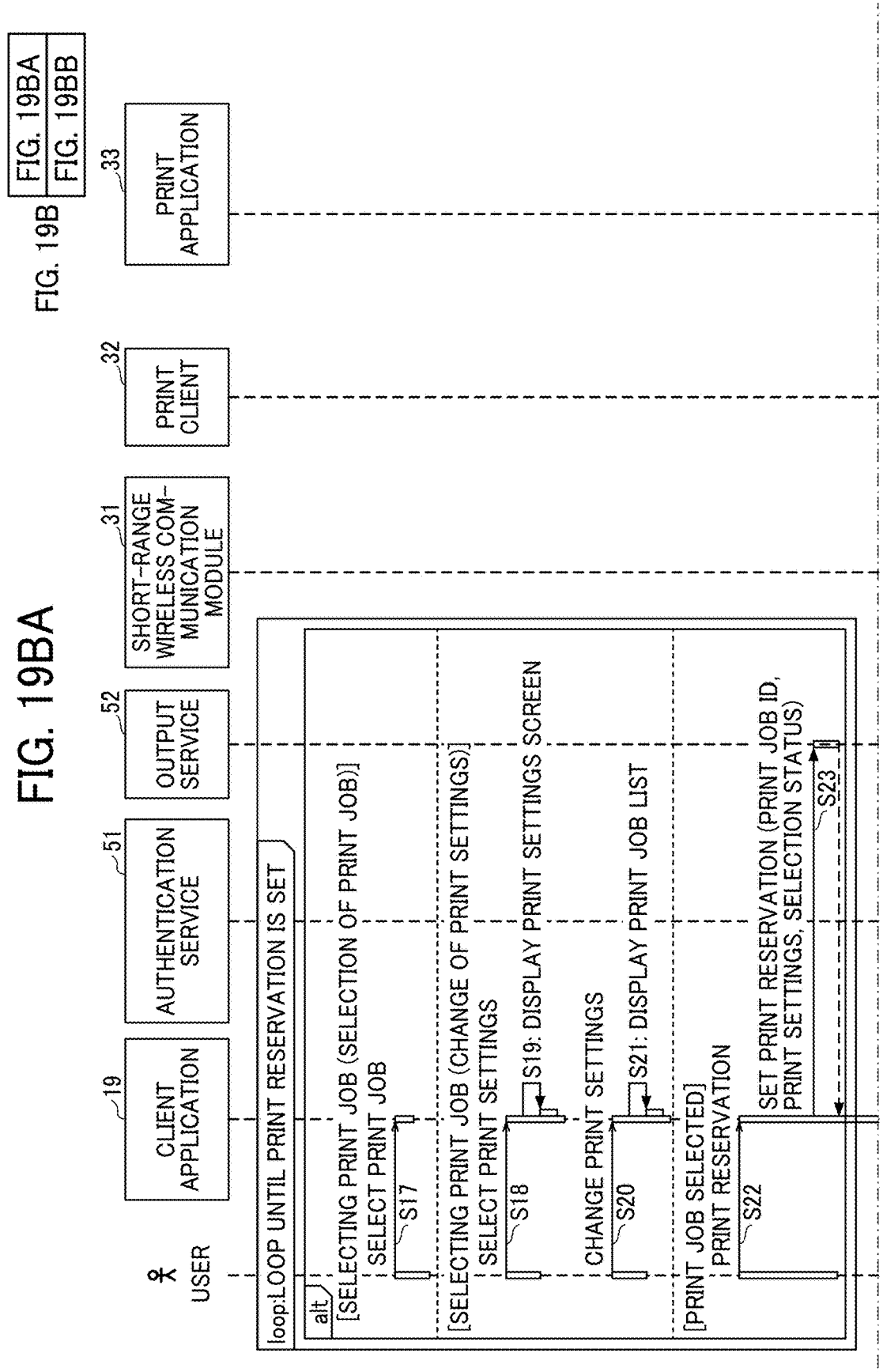

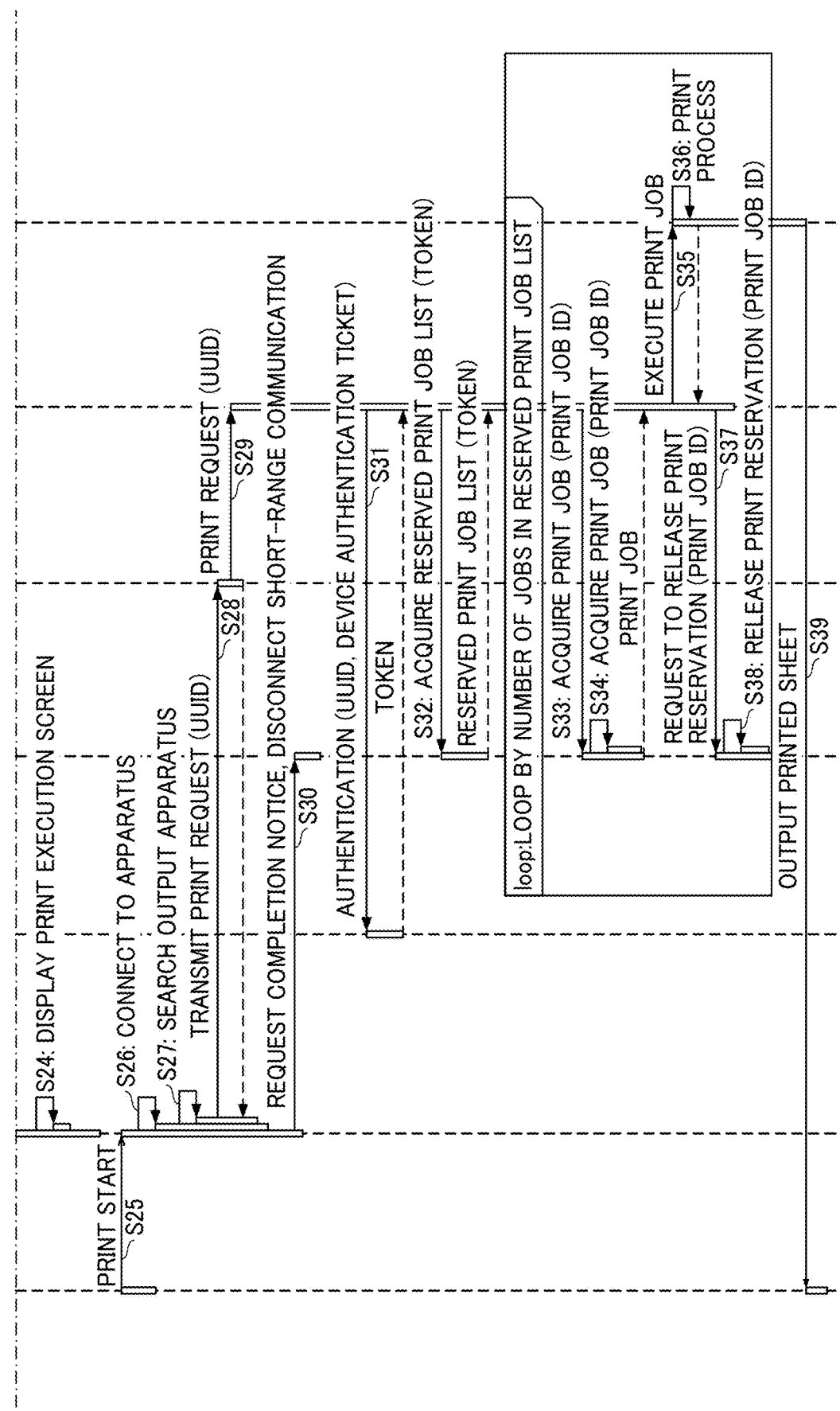

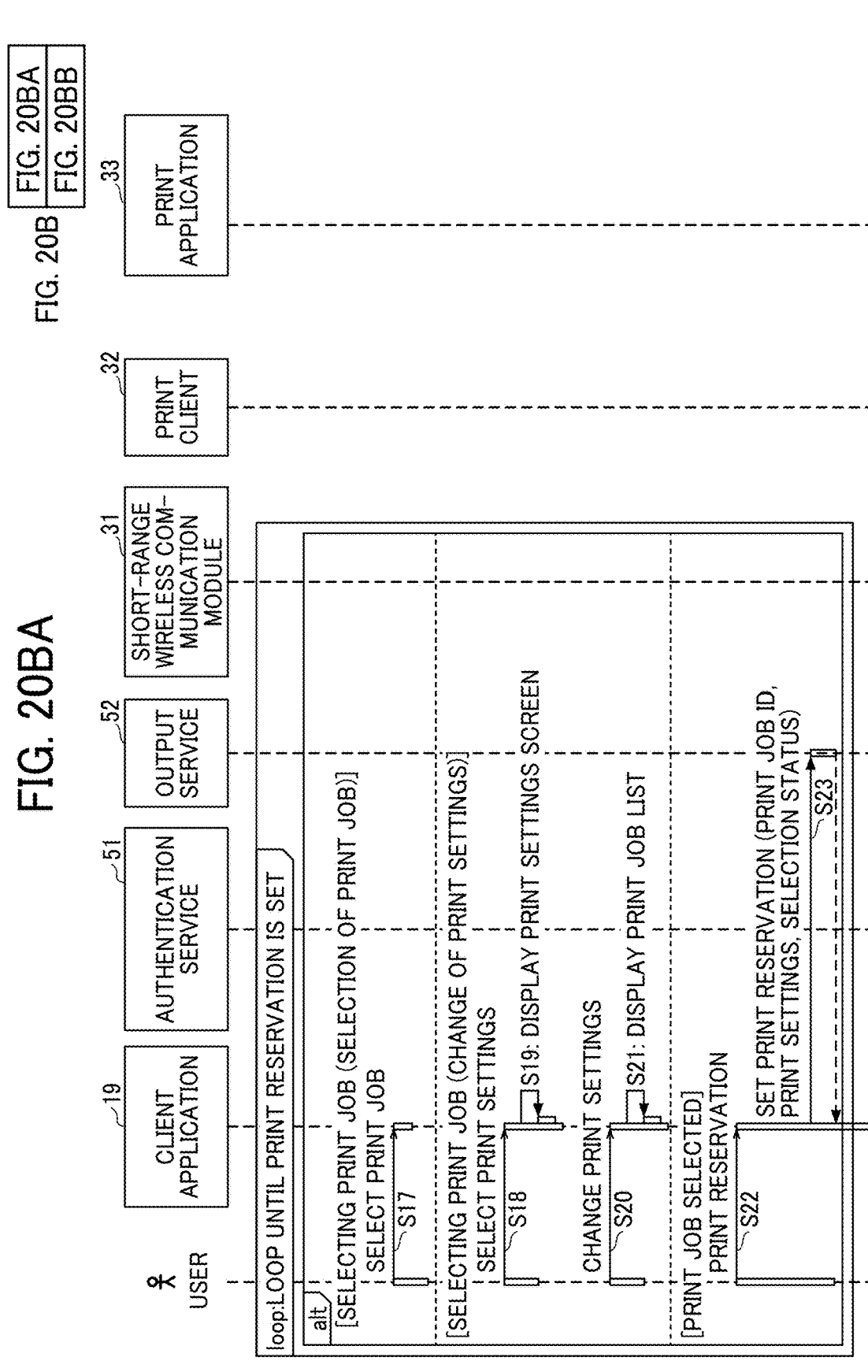

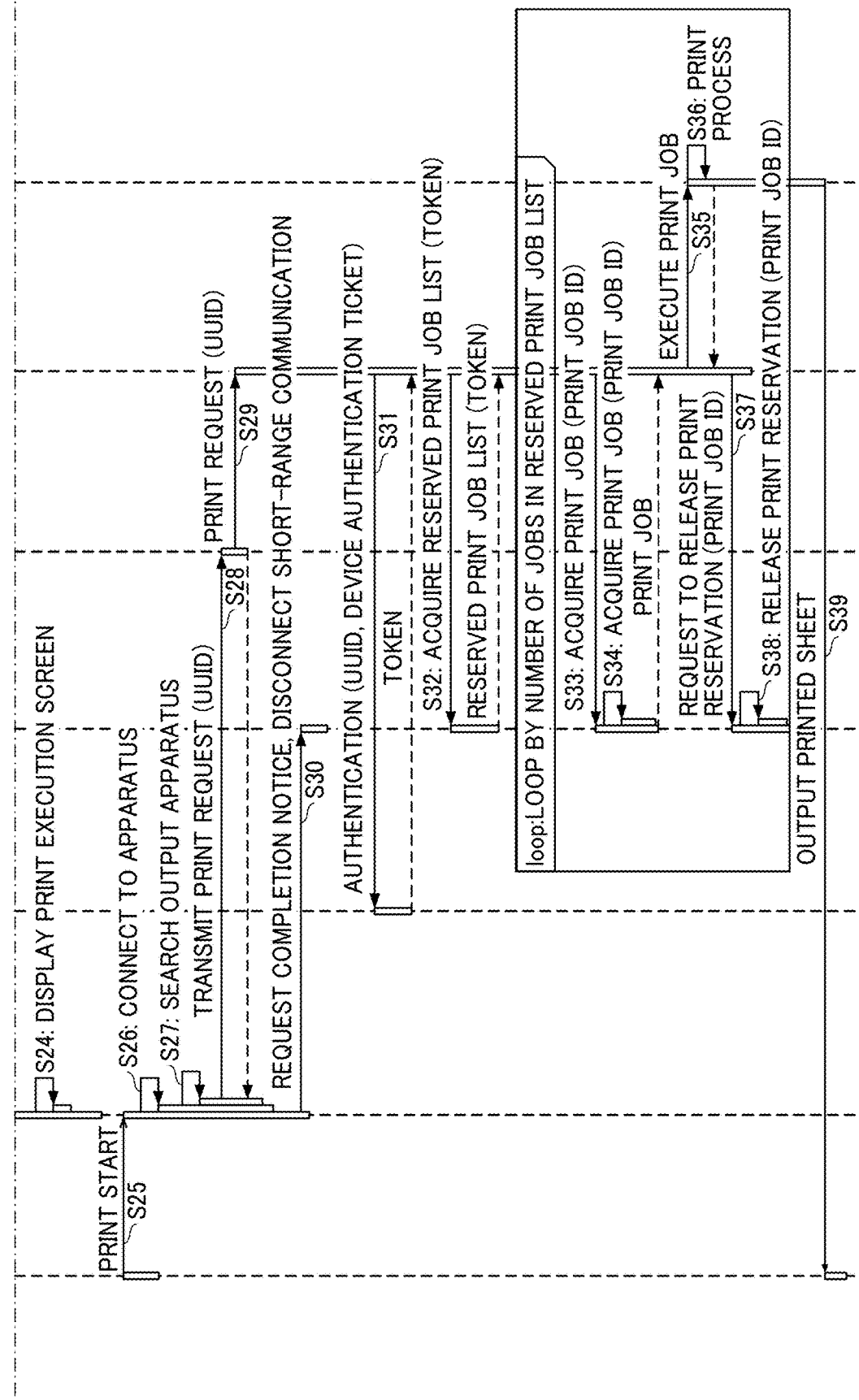

FIG. 28

```
                                                                    260
                                                                     ↙
IC CARD                                                           ╱—261
    AVAILABLE —263                                          ╭─────────╮
    60134e82      —264                                      │ DISABLE │—265
                                                            ╰─────────╯
─────────────────────────────────────────────────────────────────────────
SMART DEVICE                                                      ╱—262
    AVAILABLE— 266
    a0a0a0a0-b1b1-c2c2-d3d3-e4e4e4f5f5f5    —267            ╭─────────╮
                                                            │ DISABLE │—268
                                                            ╰─────────╯
─────────────────────────────────────────────────────────────────────────
```

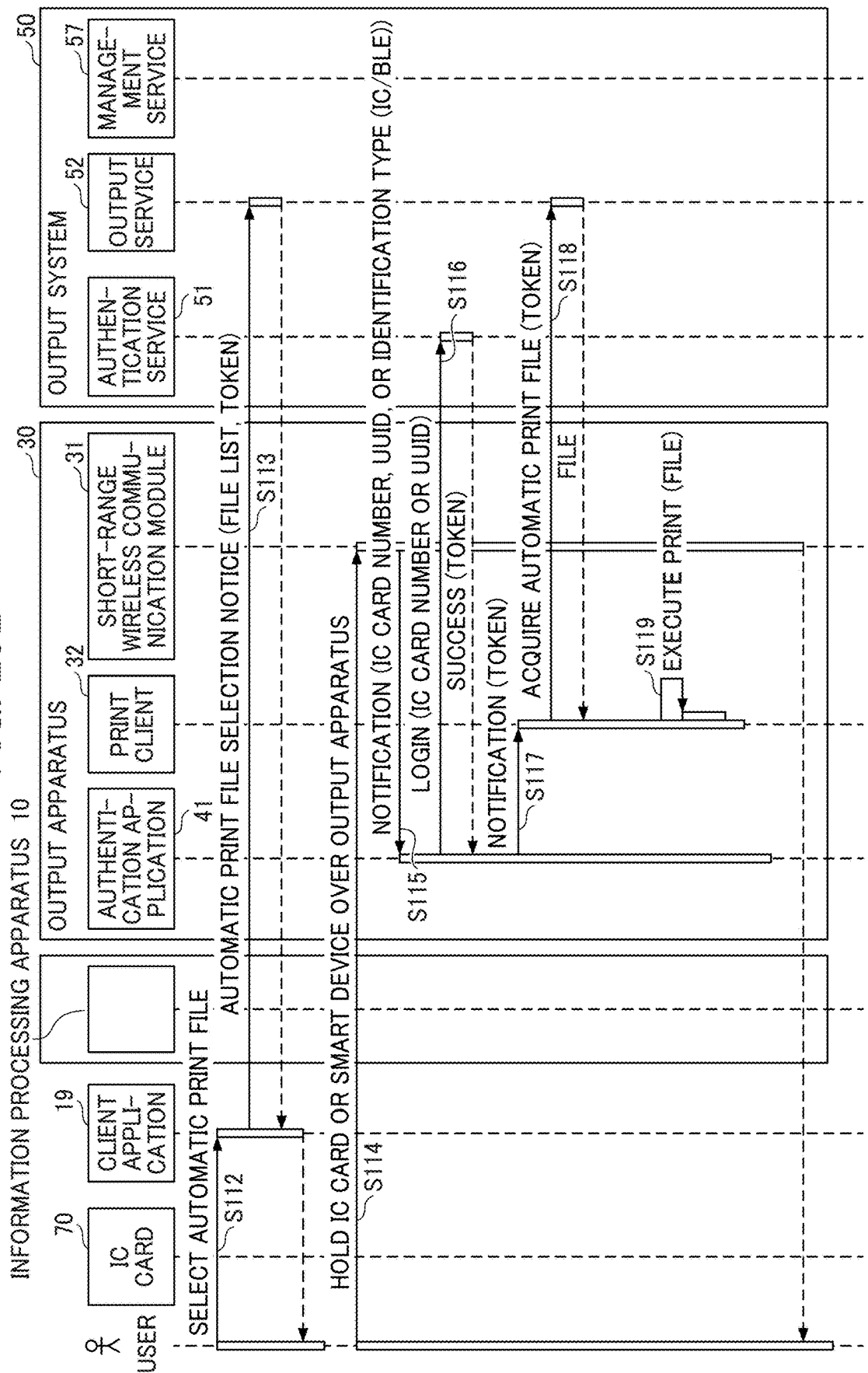

FIG. 30

| | | | | | TENANT ID:1195139923 | LOGOUT |
| | | | | | | HELP |

XXXXXXXXXXXXXX

| DOCUMENT LIST ▷ | 📄 DOCUMENT LIST |
| FILE UPLOAD | |
| EMAIL PRINT SETTINGS | ↻ RELOAD  🗑 DELETE |
| LOG DOWNLOAD | PAGE: 1/1 TOTAL: 2   NUMBER OF ITEMS [10 ▽]  ⊛ TOP ⊙ BACK | NEXT ⊙ LAST ⊛ |
| PRINT SETTINGS | |

| ☐ | FILE NAME | UPLOADED DATE AND TIME | NUMBER OF PAGES | FILE SIZE(KB) | STATUS |
|---|---|---|---|---|---|
| ☐ | test.pdf | 2020/11/24 14:00:47 | 3 | 23 | READY |
| ☐ | test.pdf | 2020/11/24 13:55:04 | 3 | 23 | READY |

272

NUMBER OF ITEMS [10 ▽]  ⊛ TOP ⊙ BACK | NEXT ⊙ LAST ⊛

PAGE TOP 270, 271

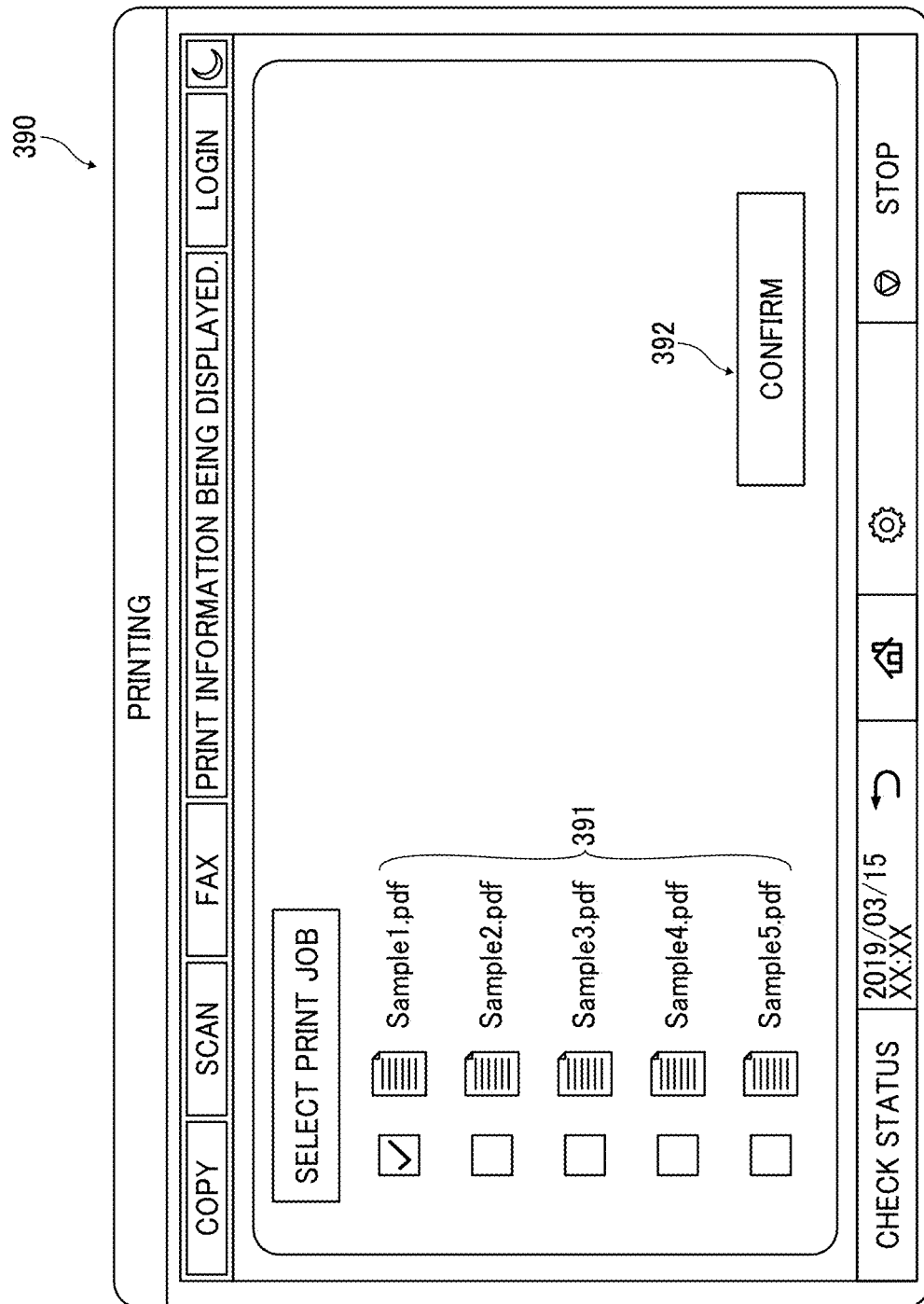

SYSTEM AND METHOD FOR TRANSMITTING ELECTRONIC DATA ASSOCIATED WITH A USER IDENTIFIED BASED ON SOURCE IDENTIFICATION INFORMATION

CROSS-REFERENCE TO RELATED APPLICATIONS

This patent application is a continuation of U.S. application Ser. No. 17/557,041, filed Dec. 21, 2021, which is based on and claims priority pursuant to 35 U.S.C. § 119(a) to Japanese Patent Application No. 2020-217199, filed on Dec. 25, 2020, in the Japan Patent Office, the entire disclosure of each are incorporated by reference herein.

BACKGROUND

Technical Field

The present disclosure relates to an output system, a system, and an output method.

Related Art

A known system provides a pull print service (location-free printing, secure printing) in which electronic data is sent from an information processing apparatus operated by a user to an output system on a network, and the user downloads and prints the electronic data of the output system from any output apparatus.

In the output system, a technique has been disclosed that allows the user to easily identify the stored electronic data. In the output system, in response to the user inputting to an output apparatus, a temporary code issued by a server to the information processing apparatus, the output apparatus sends the temporary code to the server, receives the electronic data from the server, and prints the electronic data.

SUMMARY

Embodiments of the present disclosure describe an output system, a system, and an output method. The output system communicates with an output apparatus and an information processing apparatus, and transmits, in response to a request from the output apparatus for electronic data including source identification information received from the information processing apparatus, electronic data associated with a user identified based on the source identification information to the output apparatus.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

A more complete appreciation of the disclosure and many of the attendant advantages and features thereof can be readily obtained and understood from the following detailed description with reference to the accompanying drawings, wherein:

FIG. 7 is a diagram illustrating an example of a print job storage unit storing no print job reserved for printing;

FIG. 8 is a diagram illustrating an example of a print job storage unit storing two print jobs reserved for printing;

FIG. 9 is a sequence diagram illustrating an example of a process in which the information processing apparatus registers a print job in the output system in response to a user operation;

FIGS. 10A, 10BA, and 10BB are sequence diagrams illustrating an example of a process in which the information processing apparatus communicates with the output apparatus and executes a reserved print job;

FIG. 11 is a diagram illustrating an example of a print job list of user A;

FIG. 12 is a diagram illustrating an example of the print job list of user A including reserved print jobs;

FIGS. 19A, 19BA, and 19BB are sequence diagrams illustrating an example of a process in which an output apparatus executes a print job reserved for printing by a user, which involves registration of a universally unique identifier (UUID);

FIGS. 20A, 20BA, and 20BB are sequence diagrams illustrating an example of a process in which the output apparatus executes a print job reserved for printing by the user, which involves updating the UUID;

FIG. 28 is a diagram illustrating an example of a my page screen displayed by a personal computer (PC);

FIGS. 29A and 29B are sequence diagrams illustrating an example of a process in which the information processing apparatus registers the print job in the output system and the output apparatus acquires a print job from the output system and prints the print job in response to an operation of the user;

FIG. 30 is a diagram illustrating an example of a print file management screen displayed by the information processing apparatus;

FIG. 36 is a diagram illustrating an example of a print job selection screen displayed in response to the user holding the IC card or the information processing apparatus over the output apparatus with a radio button that disables the automatic print selected.

Figure 1:
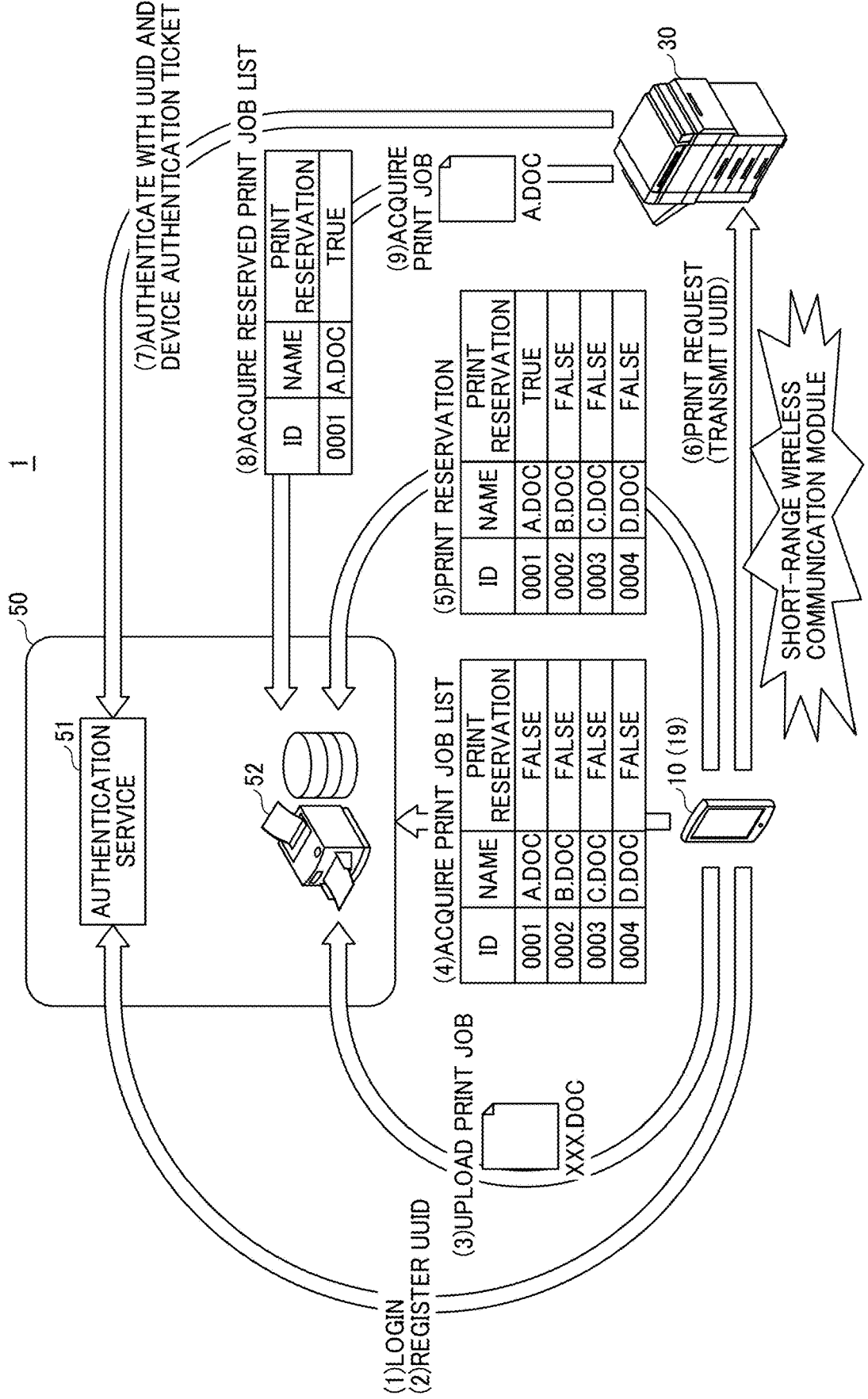
FIG. 1 is a diagram illustrating an example of an overview of an operation of an information processing system.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Hereinafter, as an example of embodiments for carrying out the present disclosure, an output system and an output method performed by the output system are described with reference to the drawings.

With reference to FIG. 1, a description is given below of steps in an operation performed by an information processing system 1 according to a first embodiment. FIG. 1 is a diagram illustrating an overview of an operation of the information processing system 1 according to the present embodiment.

(1) A user inputs a user identifier (ID) and a password or an email address and a password into a client application 19 operated on an information processing apparatus 10 to log in to an output system 50. An authentication service 51 operating in the output system 50 authenticates the user.

(2) The client application 19 registers a UUID in the output system 50 in association with the user ID. The UUID is a 128-bit character string for uniquely identifying an object on software.

(3) The information processing apparatus 10 registers a print job in the output system 50. The print job can be registered by either a personal computer (PC) or a smartphone as the information processing apparatus 10. The print job is registered in association with the user ID.

(4) The client application 19 requests a print job list from an output service 52 of the output system 50. The output service 52 transmits the print job associated with the user ID to the client application 19.

(5) In response to the user selecting the print job to be printed, the client application 19 transmits identification information of corresponding print jobs (when a.doc and b.doc are reserved for printing) to the output service 52. The output service 52 updates print reservation setting for a.doc and b.doc in a print job storage unit, which is described below, from "FALSE" to "TRUE".

As described above, the user can select the print job on the information processing apparatus 10 in the present embodiment. The user does not have to operate an output apparatus 30. The number of operations of the user on the output apparatus 30 can be reduced.

(6) In response to the user holding the information processing apparatus 10 over a short-range wireless communication module 31 (for example, in case the information processing apparatus 10 is portable), the client application 19 transmits the UUID and makes a print request to the output apparatus 30.

(7) The output apparatus 30 requests authentication from the authentication service 51 using the UUID and a device authentication ticket.

(8) In response to a successful authentication, the output service 52 transmits to the output apparatus 30, a print job list (for example, a.doc and b.doc) whose print reservation setting is "TRUE" among the print jobs of the logged-in user associated with the UUID.

(9) The output apparatus 30 acquires print jobs by using print job IDs as many as the number of print jobs in the print job list. The output apparatus 30 prints the acquired print jobs. The output service 52 updates the print reservation setting of the print job that has been printed from "TRUE" to "FALSE".

When printing of all the print jobs reserved for printing is completed, "TRUE" disappears from the print reservation setting.

As described above, in the information processing system of the present embodiment, since the user registers the print job to be reserved for printing in the output system 50 in advance, the user does not need to select the print job on the output apparatus 30. The user does not need to touch the output apparatus 30.

Further, in the conventional technology, authentication information is transmitted from the information processing apparatus to the output apparatus, and if the authentication information is leaked, there is a concern about security that various operations are performed by impersonating the user. In the present embodiment, since the information processing apparatus 10 transmits the UUID to the output apparatus 30, there is little possibility that confidential information such as the password is leaked.

Further, the information processing apparatus 10 can transmit a print job to the output apparatus 30 by the short-range wireless communication, but the short-range wireless communication has a narrow band and takes a long time for communication. In the present embodiment, since the output apparatus 30 receives the print job on the network such as a local area network (LAN), the time required for receiving the print job can be shortened.

Further, after the information processing apparatus 10 logs in to the output apparatus 30 by the short-range wireless communication, the information processing apparatus 10 may connect to a network such as the LAN and may transmit the print job to the output apparatus 30. However, switching from the short-range wireless communication to Wi-Fi requires user operation or takes time. In the present embodiment, since there is no network switching, operability of the user can be improved and the user can save time.

Electronic data may be any data to be processed by a device. The electronic data is, for example, a print job, a file, print data, or the like.

The print job is a process that is a unit of execution when the output apparatus 30 prints the document data requested to be printed. The print job includes at least document data and may also include print settings. The job of the image forming apparatus is called a print job, but in other devices, a job with a name corresponding to a function of the device is executed. The document data may include not only characters but also images, figures, and the like, or may be only images.

Source identification information is information that can identify a source of a request for the electronic data. The source identification information does not include the password. In the present embodiment, an example case in which the UUID or the IC card number is used as the source identification information is described. In addition, a Media Access Control (MAC) address, a fixed Internet Protocol (IP) address, Subscriber Identity Module (SIM) card information, a production number, a serial number, and the like may be used as the source identification information.

A token includes user's authority information. The token is associated with the user logged in with authentication information. Alternatively, the token may include information that can identify the user. By identifying the user with the token, the user's authority (display, print, edit, etc. of a print job) is also determined. The token may include user privileges.

Figure 2:
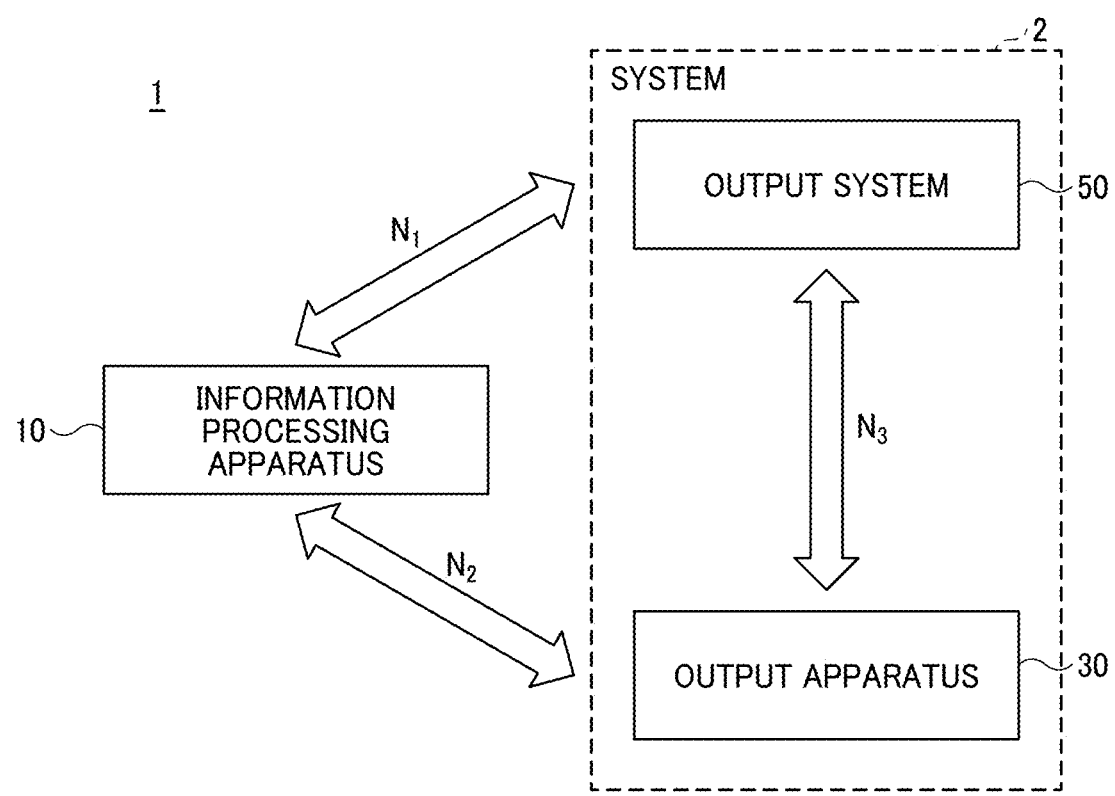
FIG. 2 is a block diagram illustrating an example of a system configuration of the information processing system.

FIG. 2 is a block diagram illustrating an example of a system configuration of the information processing system 1 according to the present embodiment. The information processing system 1 includes the information processing apparatus 10, the output system 50, and the output apparatus 30. The configuration in which the output apparatus 30 and the output system 50 are taken out from the information processing system 1 is referred to as a system 2.

The information processing apparatus 10 and the output system 50 communicate with each other through a network N1. The network N1 of the present embodiment is a network using public lines such as third generation (3G), fourth generation (4G), fifth generation (5G), and Long Term Evolution (LTE). The public line is a communication line connecting bases that is used by unspecified users sharing the same physical line. For example, a mobile phone network and a Personal Handyphone System (PHS) communication network can be mentioned. The information processing apparatus 10 is connected to an access point through a wireless LAN such as Wi-Fi and communicates with the output system 50 through the internet or communicates by wire.

The information processing apparatus 10 and the output apparatus 30 communicate with each other through a network N2. The network N2 of the present embodiment is a network using short-range wireless communication such as Near Field Communication (NFC), BLUETOOTH (registered trademark), and BLUETOOTH LOW ENERGY (registered trademark).

In addition, the network N2 may be a network that communicates in a relatively short distance, such as infrared communication and visible light communication.

The output apparatus 30 and the output system 50 communicate with each other through a network N3. The network N3 of the present embodiment is assumed to be a LAN constructed in a facility where the output apparatus 30 and the output system 50 are installed, a wide area network (WAN) including a plurality of LANs, the internet, and the like. Any communication means may be used as the network N3 as long as the output apparatus 30 and the output system 50 can communicate with each other. The network N3 is any one of a wired network, a wireless network, and a combination of the wired network and the wireless network. Further, the output apparatus 30 may be connected to a public line to communicate with the output system 50.

The information processing apparatus 10 includes a function as a computer with a client application operating. The client application includes functions of registering the print job in the output system 50 and acquiring (downloading) the print job and displaying the print job in a list. Further, the information processing apparatus 10 may include a function of editing or deleting the print job.

In addition to the client application, a general application (hereinafter, simply referred to as an application) also operates on the information processing apparatus 10, which assists the user in creating document data or acquiring the document data from the internet. Further, the client application operated on the information processing apparatus 10 includes a function of causing the output apparatus 30 to print the print job stored in the output system 50 (starts communication with the output apparatus 30 and transmits the print job).

Specifically, examples of the information processing apparatus 10 include, but not limited to, a smartphone, a mobile phone, a tablet terminal, a game machine, a personal digital assistant (PDA), a digital camera, a wearable PC, the PC, a game machine, and the like.

The output system 50 is, for example, one or more information processing apparatuses on the internet. The information processing apparatus on the network may be referred to as a server. The server is a computer or software that functions to provide information and processing results in response to a request from a client.

The output system 50 accumulates the print jobs transmitted from the information processing apparatus 10, and also transmits the print jobs to the output apparatus 30 in response to a request from the output apparatus 30. The output system 50 includes one or more information processing apparatuses. The output system 50 may reside on the internet or on-premises. When the output system 50 resides on the internet, the output system 50 is preferred to support cloud computing. Cloud is a term used when use of a particular hardware resource is not intended. The output system may be called a cloud system, a server system, or the like.

Further, the output system 50 includes a storage for storing the print job. The storage may be used by a service that provides users with disk space on the internet. The output system 50 is sometimes referred to as online storage. The output system 50 may be used by both general users and entities like companies. In the case of a company, a file server is not necessary to be built in-house, and storage capacity is increased or decreased as necessary.

Examples of the output apparatus 30 include a printer, an image forming apparatus, an image processing apparatus, a copier, a multifunction device, a multifunction peripheral (MFP), or the like that executes the print job. As long as a print function is provided, any apparatus may be used as the output apparatus 30 of the present embodiment.

Further, the output apparatus 30 may be a device including a function of outputting data other than the print function. Examples of the output apparatus 30 include a projector, a head up display (HUD) device, an electronic whiteboard, a digital signage, or the like. In the case of the devices described above, the output apparatus 30 outputs (displays, plays, etc.) data such as video, documents, and music acquired from the output system 50.

In addition, the output apparatus 30 is not limited to the printer or the like as long as the device includes a communication function. Examples of the output apparatus 30 include, for example, an industrial machine, an imaging device, a sound collecting device, a medical device, a network home appliance, a car (connected car), a notebook PC, the mobile phone, the smartphone, the tablet terminal, the game machine, the PDA, a digital camera, a wearable PC, a desktop PC, or the like.

Figure 3:
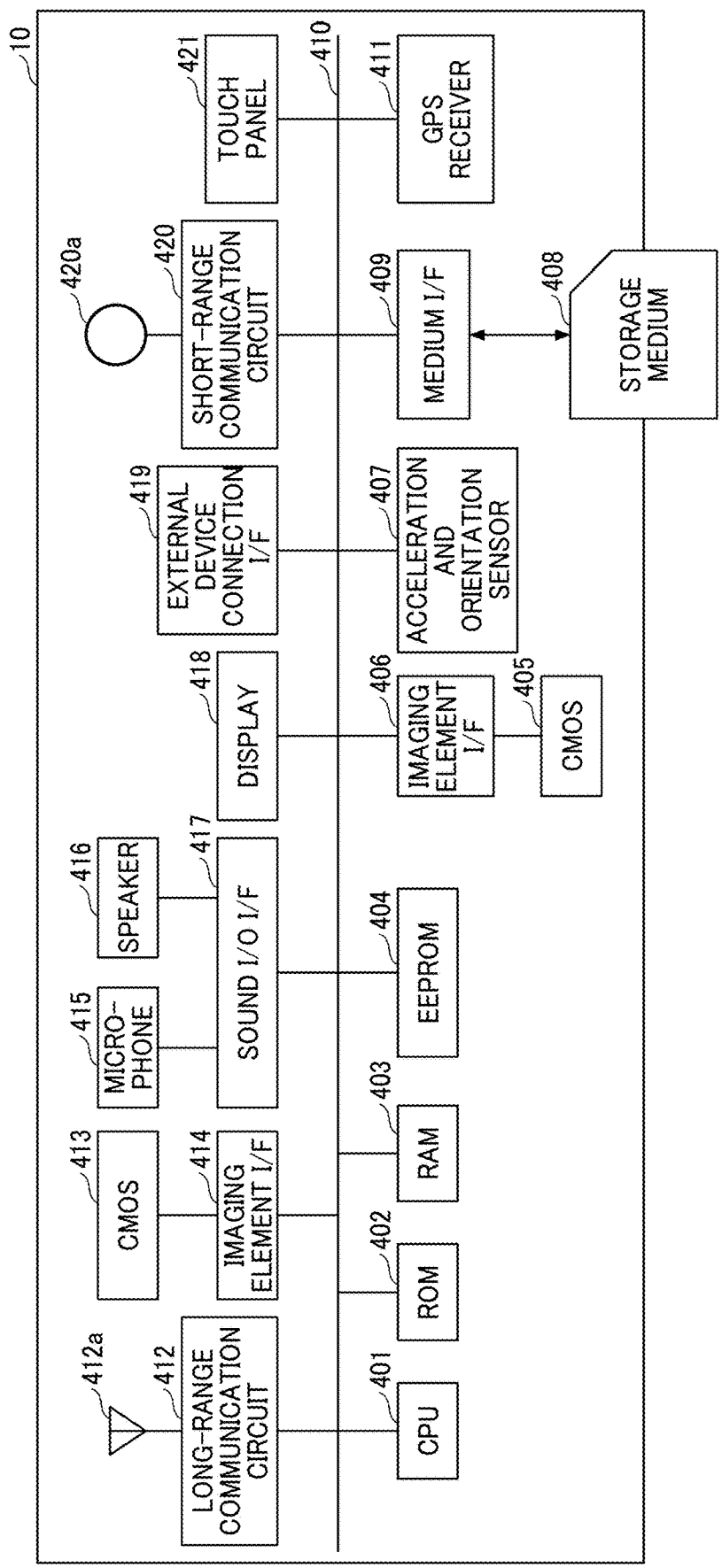
FIG. 3 is a block diagram illustrating an example of a hardware configuration of an information processing apparatus.
Figure 4:
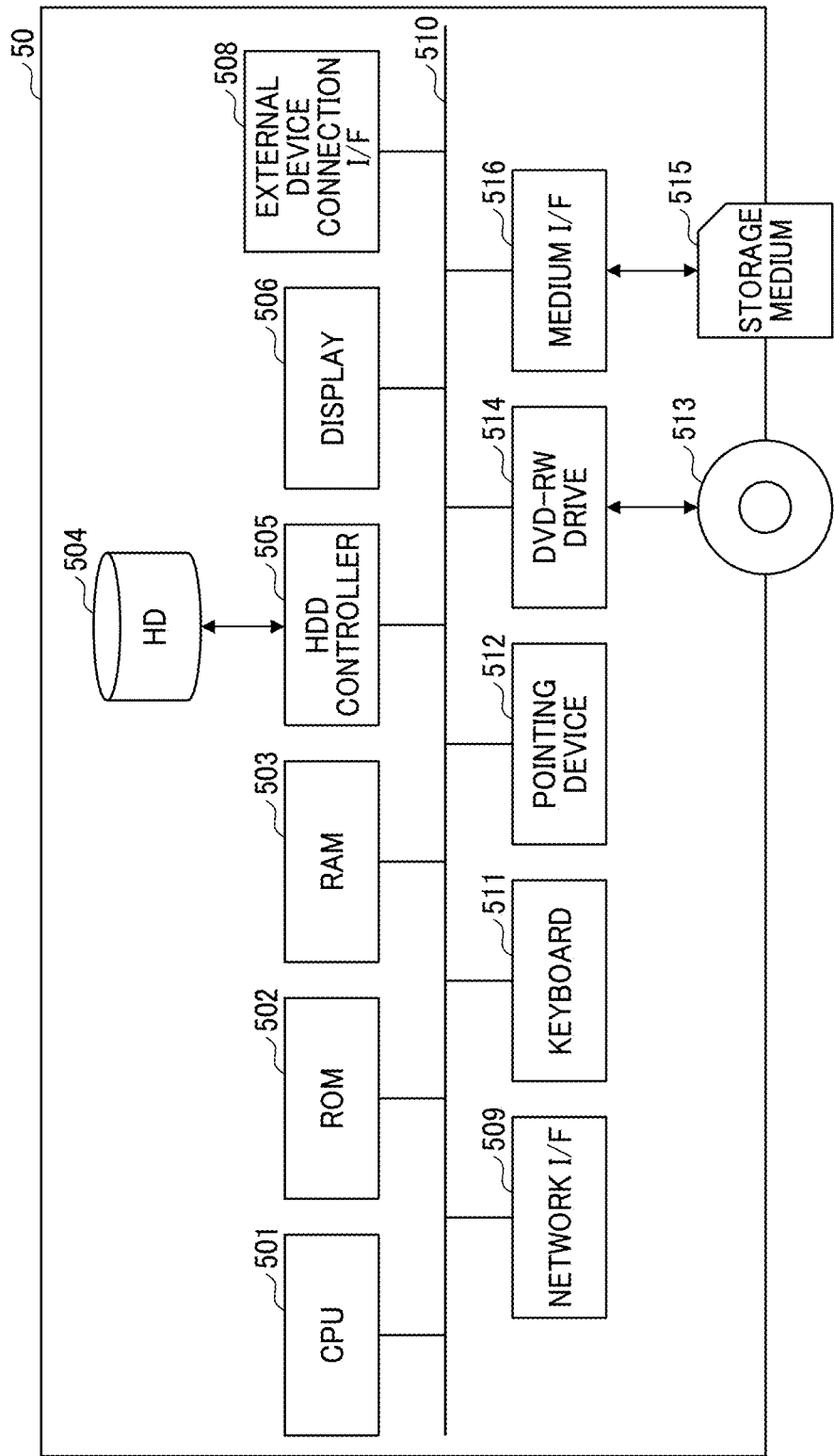
FIG. 4 is a block diagram illustrating an example of a hardware configuration of an output system.
Figure 5:
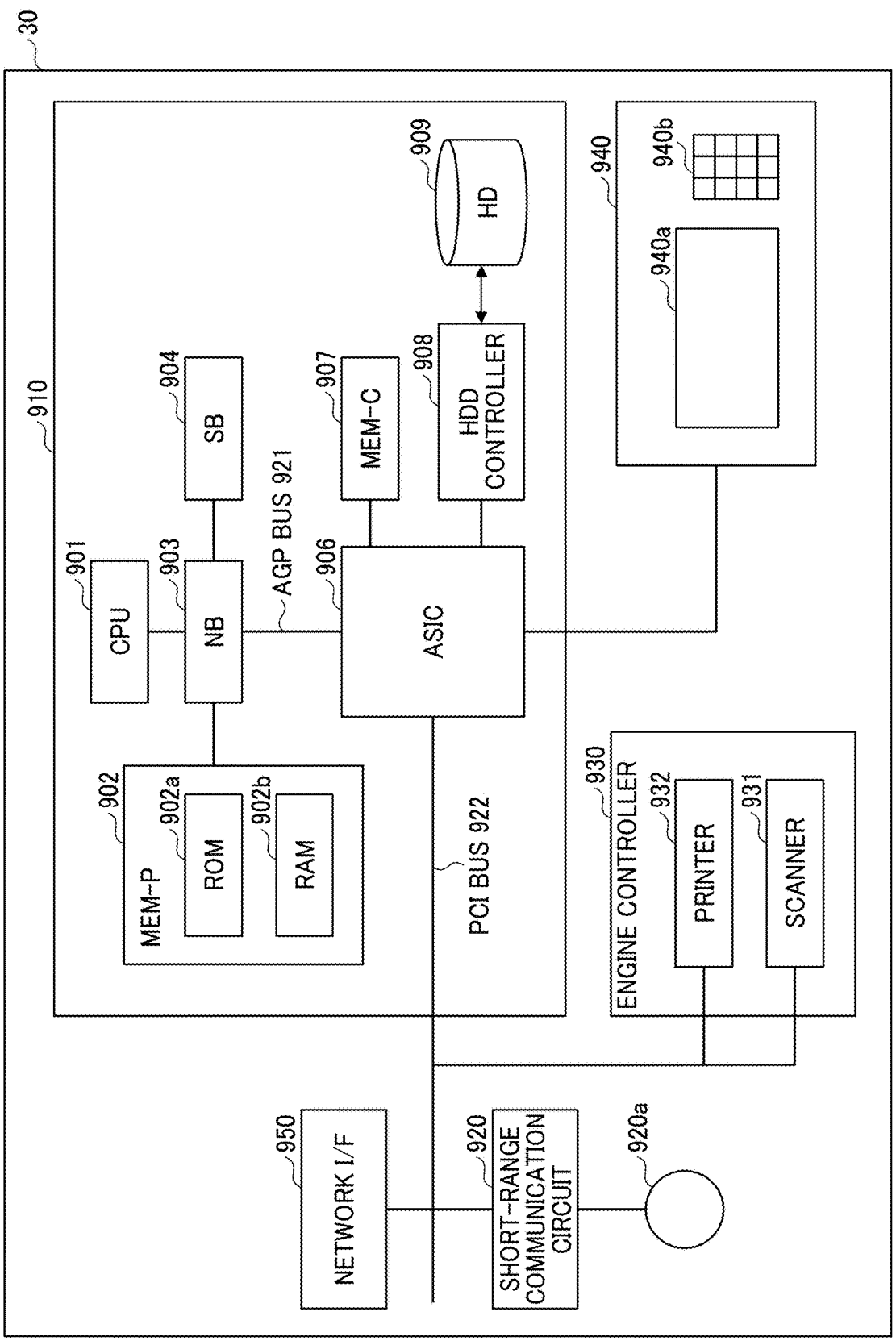
FIG. 5 is a block diagram illustrating an example of a hardware configuration of an output apparatus.

With reference to FIGS. 3 to 5, a hardware configuration of the information processing system is described.

FIG. 3 is a block diagram illustrating the hardware configuration of the information processing apparatus 10. As illustrated in FIG. 3, the information processing apparatus 10 includes a central processing unit (CPU) 401, a read only memory (ROM) 402, a random access memory (RAM) 403, an electrically erasable and programmable ROM (EEPROM) 404, a complementary metal oxide semiconductor (CMOS) sensor 405, an imaging element interface (I/F) 406, an acceleration and orientation sensor 407, a medium I/F 409 and a Global Positioning System (GPS) receiver 411.

The CPU 401 controls the entire operation of the information processing apparatus 10. The ROM 402 stores a program such as an initial program loader (IPL) to boot the CPU 401. The RAM 403 is used as a work area for the CPU 401. The EEPROM 404 reads or writes various data such as a program (application) for the information processing apparatus 10 under the control of the CPU 401. The CMOS sensor 405 is an example of a built-in imaging device that captures an object (mainly, a self-image of a user) under the control of the CPU 401 to obtain image data such as a photograph. The CMOS sensor may be an imaging device such as a charge coupled device (CCD) sensor. The imaging element I/F 406 is a circuit that controls a drive of the CMOS sensor 405. The acceleration and orientation sensor 407 includes various sensors such as an electromagnetic compass for detecting geomagnetism, a gyrocompass, and an acceleration sensor. The medium I/F 409 controls reading or writing (storage) of data to a storage medium 408 such as a flash memory. The GPS receiver 411 receives a GPS signal from a GPS satellite.

Further, the information processing apparatus 10 includes a long-range communication circuit 412, a CMOS sensor 413, an imaging element I/F 414, a microphone 415, a speaker 416, a sound input/output (I/O) I/F 417, a display 418, an external device connection I/F 419, a short-range communication circuit 420, an antenna 420a for the short-range communication circuit 420, and a touch panel 421.

The long-range communication circuit 412 is a circuit for communicating with other devices through the network N1. The CMOS sensor 413 is a built-in imaging element for capturing an image of a subject and obtaining image data such as the photograph under the control of the CPU 401. The imaging element I/F 414 is a circuit that controls the drive of the CMOS sensor 413. The microphone 415 is a built-in circuit that converts sound into an electric signal. The speaker 416 is a built-in circuit that generates sound such as music or voice by converting an electric signal into physical vibration. The sound I/O I/F 417 is a circuit that processes sound signal input and output between the microphone 415 and the speaker 416 under the control of the CPU 401. The display 418 is an example of a display device that displays an image of the object, various icons, etc. Examples of the display 418 include a liquid crystal display (LCD) and an organic electroluminescence (EL) display. The external device connection I/F 419 is an interface for connecting various external devices. The short-range communication circuit 420 is a communication circuit that communicates in compliance with the Near Field Communication (NFC), the BLUETOOTH (registered trademark), and the like. The touch panel 421 is one example of an input device that allows a user to operate the information processing apparatus 10 by touching a screen of the display 418.

Further, the information processing apparatus 10 includes a bus line 410. Examples of the bus line 410 include, but not limited to, an address bus and a data bus, which electrically connects the components such as the CPU 401 illustrated in FIG. 3 with each other.

FIG. 4 is a block diagram illustrating a hardware configuration of the output system 50. As illustrated in FIG. 4, the output system 50 is implemented by a computer and includes a CPU 501, a ROM 502, a RAM 503, a hard disk (HD) 504, a hard disk drive (HDD) controller 505, a display 506, an external device connection I/F 508, a network I/F 509, a bus line 510, a keyboard 511, a pointing device 512, a digital versatile disk-rewritable (DVD-RW) drive 514, and a medium I/F 516.

Among these elements, the CPU 501 controls entire operation of the output system 50. The ROM 502 stores the program such as the initial program loader (IPL) used for driving the CPU 501. The RAM 503 is used as a work area for the CPU 501. The HD 504 stores various data such as programs. The HDD controller 505 controls reading and writing of various data from and to the HD 504 under control of the CPU 501. The display 506 displays various information such as a cursor, menu, window, character, or image. The external device connection I/F 508 is an interface for connecting various external devices. The external device in this case is, for example, a Universal Serial Bus (USB) memory or a printer. The network I/F 509 is an interface for performing data communication using the networks N1 and N3. The bus line 510 is the address bus, the data bus, or the like for electrically connecting each component such as the CPU 501 illustrated in FIG. 4.

The keyboard 511 is an example of the input device provided with a plurality of keys for allowing a user to input characters, numerals, or various instructions. The pointing device 512 is an example of the input device that allows a user to select or execute a specific instruction, select a target for processing, or move a cursor being displayed. The DVD-RW drive 514 reads and writes various data from and to a DVD-RW 513, which is an example of a removable storage medium. The DVD-RW may be a digital versatile disc-recordable (DVD-R) or the like. The medium I/F 516 controls reading and writing (storing) of data from and to a storage medium 515 such as the flash memory.

FIG. 5 is a block diagram illustrating a hardware configuration of the output apparatus 30. In FIG. 5, the image forming apparatus is assumed as the output apparatus 30. As illustrated in FIG. 5, the output apparatus 30 includes a controller 910, a short-range communication circuit 920, an engine controller 930, a control panel 940, and a network I/F 950.

The controller 910 includes a CPU 901 as a main processor, a system memory (MEM-P) 902, a north bridge (NB) 903, a south bridge (SB) 904, an Application Specific Integrated Circuit (ASIC) 906, a local memory (MEM-C) 907, an HDD controller 908, and an HD 909 as a storage unit. The NB 903 and the ASIC 906 are connected through an Accelerated Graphics Port (AGP) bus 921.

The CPU 901 is a processor that performs overall control of the output apparatus 30. The NB 903 connects the CPU 901 with the MEM-P 902, SB 904, and AGP bus 921 and includes a memory controller for controlling reading or writing operation of various data with respect to the MEM-P 902, a Peripheral Component Interconnect (PCI) master, and an AGP target.

The MEM-P 902 includes a ROM 902a as a memory that stores program and data for implementing various functions of the controller 910 and further includes a RAM 902b as a memory that deploys the program and data, or as a drawing memory that stores drawing data for printing. The program stored in the ROM 902a may be stored in any computer-readable storage medium, such as a compact disc-read only memory (CD-ROM), compact disc-recordable (CD-R), or digital versatile disc (DVD), in a file format installable or executable by the computer for distribution.

The SB 904 connects the NB 903 with a peripheral component interconnect (PCI) device or a peripheral device. The ASIC 906 is an IC dedicated to an image processing use, and connects the AGP bus 921, a PCI bus 922, the HDD controller 908, and the MEM-C 907 as a bridge. The ASIC 906 includes a PCI target, an AGP master, an arbiter (ARB) as a central processor of the ASIC 906, a memory controller for controlling the MEM-C 907, a plurality of direct memory access controllers (DMACs) capable of converting coordinates of image data with a hardware logic, and a PCI unit that transfers data between a scanner 931 and a printer 932 through the PCI bus 922. The ASIC 906 may be connected to a USB interface, or an Institute of Electrical and Electronics Engineers 1394 (IEEE1394) interface.

The MEM-C 907 is a local memory used as a buffer for image data to be copied or a code buffer. The HD 909 is a storage for storing image data, font data used during printing, and forms. The HDD controller 908 reads or writes various data from or to the HD 909 under control of the CPU 901. The AGP bus 921 is a bus interface for a graphics accelerator card, which has been proposed to accelerate graphics processing. Through directly accessing the MEM-P 902 by high-throughput, speed of the graphics accelerator card is improved.

The short-range communication circuit 920 includes a short-range communication antenna 920a. The short-range communication circuit 920 is a communication circuit that communicates in compliance with NFC, BLUETOOTH (registered trademark) and the like.

The engine controller 930 includes a scanner 931 and a printer 932. The control panel 940 includes a display panel 940a implemented by, for example, a touch panel that displays current settings or a selection screen and receives a user input and an operation panel 940b including a numeric keypad that receives set values of various image forming parameters such as image density parameter and a start key that accepts an instruction for starting copying. The controller 910 controls all operations of the output apparatus 30, for example, drawing, communication, or user input to the control panel 940. The scanner 931 or the printer 932 includes an image processing unit such as error diffusion processing and gamma conversion processing.

In response to an instruction to select a specific application through the control panel 940, for example, using a mode switch key, the output apparatus 30 selectively performs a document box function, a copy function, a print function, and a facsimile function. In the output apparatus 30, the document box mode is selected when the document box function is selected, the copy mode is selected when the copy function is selected, the print mode is selected when the print function is selected, and the facsimile mode is selected when the facsimile function is selected.

The network I/F 950 is an interface for performing data communication using the network N3. The short-range communication circuit 920 and the network I/F 950 are electrically connected to the ASIC 906 through the PCI bus 922.

Figure 6:
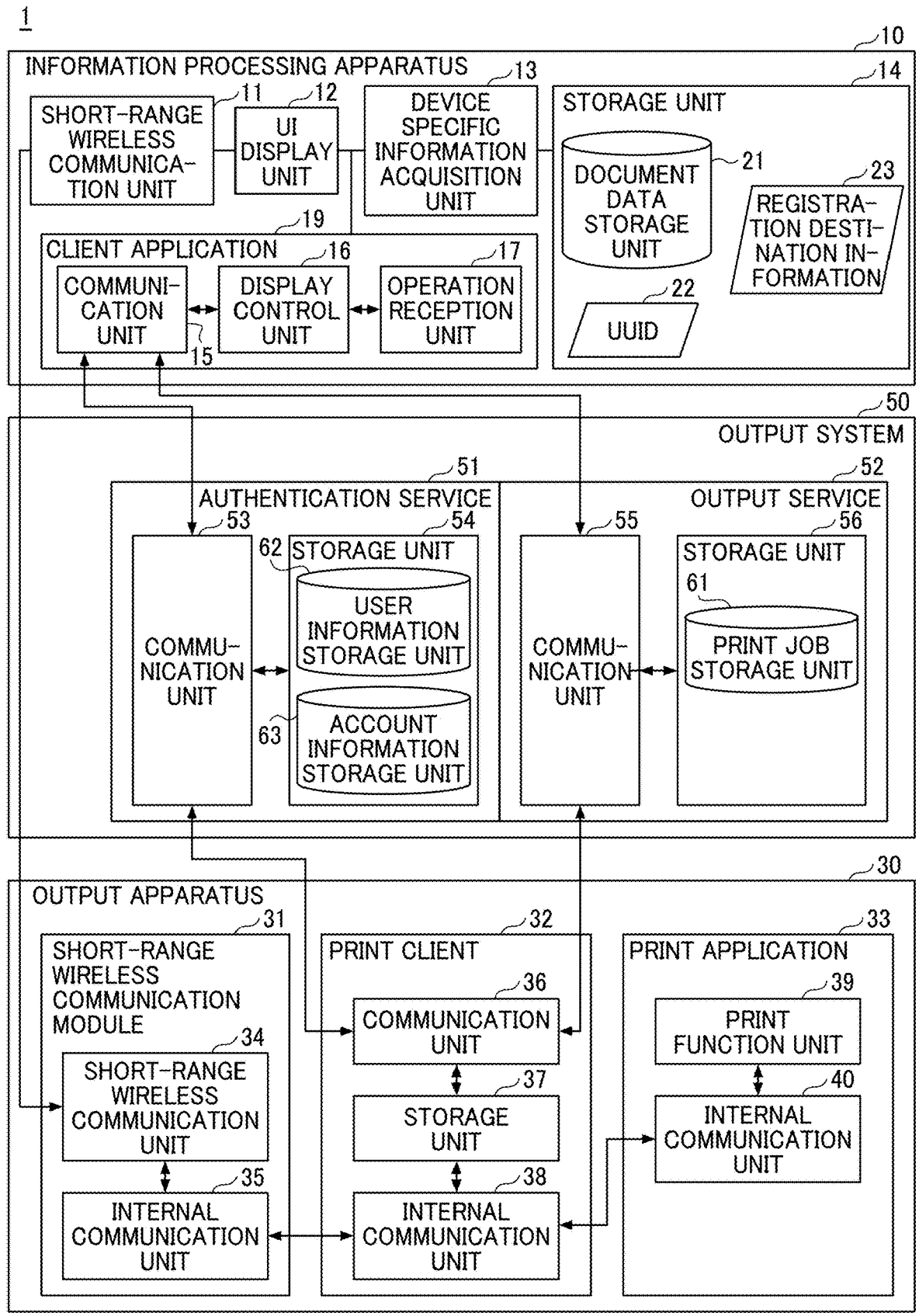
FIG. 6 is a block diagram illustrating an example of a functional configuration of the information processing apparatus, the output system, and the output apparatus of the information processing system according to a first embodiment of the present disclosure.

With reference to FIG. 6, functions provided by the information processing system are described. FIG. 6 is a block diagram illustrating an example of a functional configuration of the information processing apparatus 10, the output system 50, and the output apparatus 30 of the information processing system 1.

The information processing apparatus 10 includes a short-range wireless communication unit 11, a user interface (UI) display unit 12, a device specific information acquisition unit 13, a storage unit 14, a communication unit 15, a display control unit 16, and an operation reception unit 17. The communication unit 15, the display control unit 16, and the operation reception unit 17 are implemented by operating any of the components illustrated in FIG. 3 in response to a command from the CPU 401 according to the client application 19 expanded from the EEPROM 404 to the RAM 403. Each of the other functional units is implemented by operating any of the components illustrated in FIG. 3 in response to a command from the CPU 401 according to a program (native application, web browser, etc.) expanded from the EEPROM 404 to the RAM 403.

The communication unit 15 connects to the network N1 and communicates with the output system 50 using the registration destination information 23 stored in the storage unit 14. The registration destination information 23 is information indicating the registration destination of the print job. Details are described in Table 2. As described above, the communication unit 15 connects to a public line (3G/4G/LTE/5G, etc.), a wireless LAN, or the like, and transmits the print job to the output system 50. The transmission is not limited to wireless communication and may be transmitted through a wired LAN or the like. Further, the communication unit 15 receives the print job list from the output system 50.

The display control unit 16 generates a screen including a UI and displays the screen on the display 418. The display control unit 16 arranges the information acquired from the output system 50 in layout components provided by the client application 19 to generate a screen.

The operation reception unit 17 receives various operations on the information processing apparatus 10. The operation reception unit 17 receives from the user, for example, instructions such as selection of document data to be registered as the print job and selection of the print job to be executed.

The short-range wireless communication unit 11 communicates with the output apparatus 30 by short-range wireless (NFC, BLUETOOTH (registered trademark)/BLUETOOTH LOW ENERGY (registered trademark), infrared communication, visible light communication, and the like).

The user may cause the output apparatus 30 to read a bar code such as a QUICK RESPONSE (QR) code (registered trademark) or a two-dimensional bar code to transmit information.

The UI display unit 12 displays the UI of the information processing apparatus 10. The UI display unit displays the UI other than the client application 19. The UI display unit 12 receives user operation from, for example, the touch panel.

The device specific information acquisition unit 13 acquires information unique to the information processing apparatus 10 or the client application 19. In the present embodiment, the UUID 22 is described as an example, but when the information processing apparatus 10 includes the IC card, an IC card number may be used instead of the UUID 22. Alternatively, both the UUID and the IC card number may be used.

Further, the information processing apparatus 10 includes a storage unit 14 implemented by one or more of the EEPROM 404, the RAM 403, or the ROM 402 illustrated in FIG. 3. A document data storage unit 21 is implemented in the storage unit 14. The UUID 22 and the registration destination information 23 are stored in the storage unit 14. The document data storage unit 21 stores document data generated by the user or document data acquired from the internet or the like. The document data storage unit 21 may be on the network. The document data selected by the user is registered in the output system 50 as the print job.

The UUID 22 and the registration destination information 23 are described with reference to Tables 1 and 2.

TABLE 1

| UUID |
|---|
| a0a0a0a0-b1b1-c2c2-d3d3-e4e4e4f5f5f5 |

Table 1 illustrates an example of the UUID 22. The UUID serves as identification information for the information processing apparatus 10 or the client application 19. When the information processing apparatus 10 is dedicated to a user, the UUID functions as an identifier of the user. The UUID needs to be unique and biometric authentication information such as a user's fingerprint may be used alternatively. The UUID is not changed at least frequently.

Further, instead of the UUID, a MAC address, fixed IP address, SIM card information, production number, serial number, or the like may be used. The UUID is a number unique to the information processing apparatus 10 or the client application 19.

TABLE 2

| OUTPUT SYSTEM ID | 12345 |
|---|---|
| URL | https:// |

TABLE 2-continued

| USERNAME | ICHIRO |
|---|---|
| PASSWORD | ****** |

Table 2 schematically illustrates an example of the registration destination information 23. The registration destination information 23 is information including the registration destination of the print job. As an example, the registration destination information 23 includes an output system ID, a uniform resource locator (URL), a username, and a password. The output system ID is information for identifying the output system 50, and uniquely identifies the output system 50. The ID is a combination of a name, a code, a character string, a numerical value, or the like used to uniquely distinguish a specific target from a plurality of targets. The ID is sometimes called identification information.

The URL is information indicating location and communication method of resources such as files and services that can be accessed on the network. The URL may include address information indicating the location of the resource. In the present embodiment, the address of the output system 50 is included in the URL. The username and password are login information for the user to log in to the output system 50, but the login information is dispensable.

The function of the output system 50 is described in the following. The output system 50 includes an authentication service 51 and an output service 52, each of which includes communication units 53 and 55 and storage units 54 and 56, respectively. A service indicates providing some kind of information processing to the user. The service includes a function according to content.

The authentication service 51 performs user authentication, authorization of authority, and the like based on user information stored in the user information storage unit 62 and transmits an authentication result to the information processing apparatus 10 or the output apparatus 30. Authentication indicates determining whether a user is a legitimate authorized person. In the present embodiment, the authentication determines whether the user is authorized to use the output system 50. The authorization of authority is to give the user the authority of the operation that the user can perform (display, print, edit, and the like of the print job).

In addition, the authentication service 51 may execute device authentication. The device authentication indicates authenticating whether an output apparatus 30 is a legitimate device. A device authentication ticket is used for the device authentication. The output apparatus 30 stores the device authentication ticket in advance. The device authentication ticket is information indicating that the output apparatus 30 is located in the tenant and has been authenticated. The device authentication ticket is stored in the output apparatus 30 in response to an administrator, a customer engineer, or the like operating the output apparatus 30 to input authentication information distributed by a seller, and the authentication service 51 determining that the authentication is successful. Therefore, even if the user can log in to the output system 50, printing cannot be performed from the output apparatus 30 that does not store the device authentication ticket.

Further, the authentication service 51 manages association between the UUID and the user ID in the account information storage unit 63. The authentication service 51 identifies the user ID associated with the UUID transmitted from the output apparatus 30.

The authentication service 51 is a function implemented by operating any of the components illustrated in FIG. 4 by an instruction from the CPU 501 according to the program of the authentication service 51 expanded from the HD 504 to the RAM 503.

The communication unit 53 of the authentication service 51 connects to the network N1 or the network N3 and transmits and receives various data to and from the information processing apparatus 10 and the output apparatus 30. The communication unit 53 of the present embodiment mainly receives the UUID or the like from the information processing apparatus 10 and returns the authentication result.

Further, the authentication service 51 includes a storage unit 54 implemented by one or more of HD 504, RAM 503 or ROM 502 illustrated in FIG. 4. A user information storage unit 62 and an account information storage unit 63 are implemented in the storage unit 54 (Tables 3 and 4).

TABLE 3

| | |
|---|---|
| USER ID | USER A |
| PASSWORD | ******* |
| EMAIL ADDRESS | usera@sample.com |
| TOKEN | 1234567890 |
| . . . | . . . |

Table 3 schematically illustrates the user information stored in the user information storage unit. As the user information, items such as a user ID, a password, an email address, and a token are registered.

The user ID is identification information that identifies the user.

The password is normally confidential information that proves legitimacy of the user.

The email address is the user's email address and may be used for authentication because the email address is unique.

The token is alternative information of the user ID generated by successful authentication.

TABLE 4

| USER ID | ON PREMISES ACCOUNT | |
|---|---|---|
| | ON PREMISES ID | ON PREMISES ID TYPE |
| USER 0001 | A12345 | PC ID |
| | a0a0a0a0-b1b1-c2c2-d3d3-e4e4e4f5f5f5 | PHONE ID |

Table 4 illustrates an example of account information stored in the account information storage unit 63. The account information associates the user ID with the identification information on an on-premises node. The identification information on the on-premises node is called an on-premises ID. The on-premises ID is identification information of a device used by the user on-premises. Accordingly, the on-premises ID is, for example, identification information of the information processing apparatus 10 or the client application 19. Further, a type of the on-premises ID is registered in the on-premises ID.

The output service 52 is a function implemented by operating any of the components illustrated in FIG. 4 by an instruction from the CPU 501 according to the program of the authentication service 51 expanded from the HD 504 to the RAM 503.

The output service 52 receives the print job from the information processing apparatus 10 and returns the print job according to the request from the output apparatus 30. In the present embodiment, the client that receives the print job includes, in addition to the client application 19, web UI, email, a port monitor (a module that transmits the output of the printer driver), and the like.

The output service 52 stores the print job received from the information processing apparatus 10 by the communication unit 55 in a print job storage unit 61. At the time of storage, the output service 52 assigns a print job ID and saves the print job ID together with the user ID and the file name.

The communication unit 55 of the output service 52 connects to the network N1 or the network N3 and transmits and receives various data to and from the information processing apparatus 10 and the output apparatus 30. The communication unit 55 of the output service 52 of the present embodiment mainly receives the print job from the information processing apparatus 10 and transmits the print job to the output apparatus 30.

In response to receiving a request for the print job for which the UUID is designated from the output apparatus 30, the communication unit 55 of the output service 52 acquires the user ID associated with the UUID from the authentication service. Then, the print job associated with the user ID is acquired from the print job storage unit 61 and the communication unit 55 transmits the print job to the output apparatus 30.

The output service 52 includes a storage unit 56 implemented by one or more of the HD 504, RAM 503, or ROM 502 illustrated in FIG. 4. The print job storage unit 61 is implemented in the storage unit 56 (Table 5).

TABLE 5

| PRINT JOB ID | TENANT ID | USER ID | FILE NAME | PRINT DATA PATH | PRINT RESERVATION | . . . |
|---|---|---|---|---|---|---|
| 000001 | 12345678 | USER A | A.DOC | http://host.domain/files/xxx | FALSE | . . . |
| 000002 | 12345678 | USER A | B.DOC | http://host.domain/files/yyy | FALSE | . . . |
| 000003 | 12345678 | USER A | C.DOC | http://host.domain/files/zzz | FALSE | . . . |
| 000004 | 12345678 | USER B | FILE.PDF | http://host.domain/files/aaa | FALSE | . . . |
| 000005 | 567891234 | USER C | IMAGE.IMG | http://host.domain/files/bbb | FALSE | . . . |

Table 5 schematically illustrates print job information stored in the print job storage unit 61. In the print job information, items such as the print job ID, tenant ID, user ID, file name, print data path, and print reservation setting are registered.

The print job ID is print job identification information assigned to each print job by the output system 50.

The tenant ID is identification information of the tenant to which the user belongs. —The user ID is identification information of the user who registered the print job.

The file name is the file name of the document data to be printed.

The print data path indicates a location (address on the network) where the print job (file) is stored. The print data path, or the document data may be stored in the print job storage unit 61.

Functions of the output apparatus 30 are described in the following. In the output apparatus 30, a short-range wireless communication module 31, a print client 32, and a print application 33 operate. A module indicates an application or a program. The print client is a print client application.

The short-range wireless communication unit 34 and the internal communication unit 35 included in the short-range wireless communication module 31 are implemented by operating any of the components illustrated in FIG. 5 in response to an instruction from the CPU 901 according to the short-range wireless communication module 31 developed from the HD 905 to the RAM 902b.

The communication unit 36 and the internal communication unit 38 included in the print client 32 are implemented by any of the components illustrated in FIG. 5 in response to a command from the CPU 901 according to the print client 32 expanded from the HD 905 to the RAM 902b.

The print function unit 39 and the internal communication unit 40 of the print application 33 are implemented by any of the components illustrated in FIG. 5 in response to a command from the CPU 901 according to the print application 33 expanded from the HD 905 to the RAM 902b.

The short-range wireless communication unit 34 connects to the network N2 and communicates with the information processing apparatus 10 by short-range wireless communication (NFC/BLUETOOTH (registered trademark)/BLUETOOTH LOW ENERGY (registered trademark), etc.).

The short-range wireless communication unit 34 periodically transmits radio wave indicating presence to the surroundings. When the information processing apparatus 10 approaches the reach of the radio wave, the radio wave is detected, and communication is automatically started between the short-range wireless communication unit 11 of the information processing apparatus 10 and the short-range wireless communication unit 34. In the present embodiment, the short-range wireless communication unit 34 receives the UUID from the information processing apparatus 10.

The internal communication unit 35 performs interprocess communication with the print client 32. In the present embodiment, the internal communication unit 35 transmits the UUID to the internal communication unit 38 of the print client 32.

The communication unit 36 transmits and receives various data to and from the output system 50 through the network N3. In the present embodiment, the communication unit 36 transmits the UUID and the device authentication ticket and receives the print job.

The internal communication unit 38 performs the interprocess communication with the short-range wireless communication module 31. In the present embodiment, the internal communication unit 38 receives the UUID from the short-range wireless communication module 31. The internal communication unit 38 transmits a print process request to the print application 33.

The storage unit 37 of the print client 32 temporarily stores the UUID received by the internal communication unit 38, the print job received by the communication unit 36, and the like.

The print function unit 39 receives the print job from the print client 32 and executes the print job. That is, the print function unit 39 prints the file.

The internal communication unit 40 is used for data transfer in the output apparatus 30. The internal communication unit 40 receives the print job from the internal communication unit 38 of the print client 32.

With reference to FIGS. 7 and 8, an example of transitioning the print job stored in the print job storage unit 61 in the present embodiment is described.

FIG. 7 is a diagram illustrating an example of the print job storage unit 61 without any reserved print job stored. Accordingly, all data in print reservation setting are "FALSE". The data "TRUE" in the print reservation setting indicates that the print job is reserved for printing. The print job reserved for printing is a target of automatic print that allows the user to print by simply holding the information processing apparatus 10 over the output apparatus 30 (touchless). The data in the print reservation setting change in the order of "FALSE" in an initial state, "TRUE" during print reservation, and "FALSE" after printing is completed.

FIG. 8 is a diagram illustrating an example of a print job storage unit 61 with two print jobs reserved for printing. The print reservation setting of the print jobs whose file names are a.doc and b.doc are "TRUE".

With reference to FIG. 9, a process of registering the print job in the output system 50 by the user is described. FIG. 9 is a sequence diagram illustrating an example of the process in which the information processing apparatus 10 registers a print job in the output system 50 in response to a user operation.

In step S1, the user instructs the client application 19 to log in to the output system 50. In the present embodiment, the client application 19 is an application for a mobile device, but the print job may be input by a port monitor (a module for transmitting data created by a printer driver) or by email.

In step S1.1, the communication unit 15 of the client application 19 requests login by transmitting user information to the authentication service 51. A token is returned in response to a successful login. The user information includes a tenant ID, user identification information, a password, and the like. The user ID may be an email address. Further, the login method may be a login linked with an external service.

In step S1.2, the display control unit 16 of the client application 19 displays menus for various operations in response to the successful login by the authentication service 51.

In step S2, the user submits the print job to the client application 19. The information processing apparatus 10 for inputting the print job is mainly a PC, but a smartphone may also be used.

In step S2.1, the communication unit 15 of the client application 19 transmits the print job to the output service 52. The communication unit 53 of the output service 52 receives the print job and stores the print job in the print job storage unit 61. Specifically, the communication unit 53 assigns the print job ID, and stores the tenant ID identified by the user ID, the user ID, the file name, the print job path, and the print reservation setting (initial setting is "FALSE") in the print job storage unit 61.

Figure 10B:
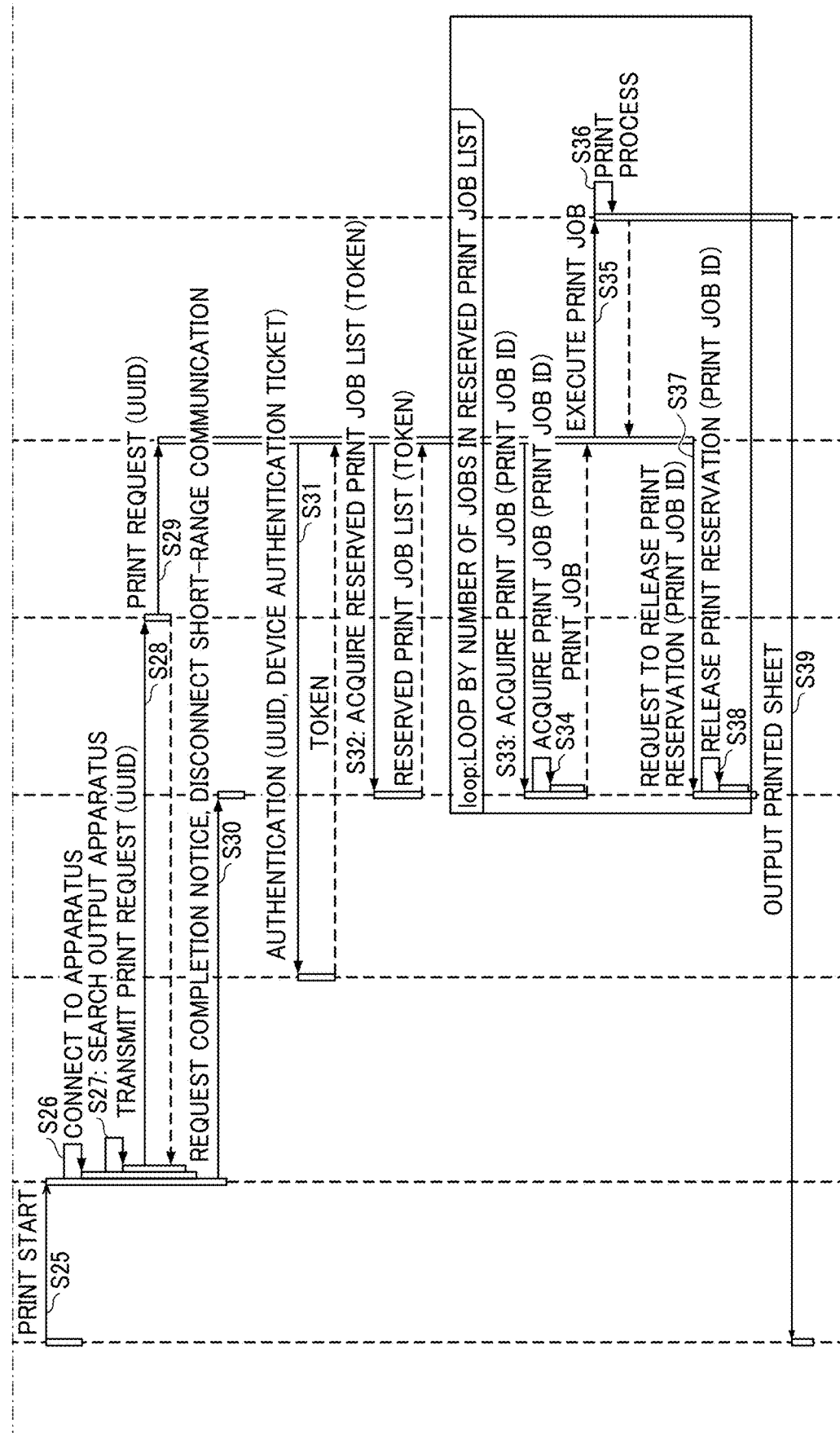

With reference to FIGS. 10A, 10BA, and 10BB, a process of the pull print according to the present embodiment is described. FIG. 10A is a sequence diagram illustrating an example of the process in which the information processing apparatus 10 communicates with the output apparatus 30 and the output apparatus 30 executes a reserved print job.

Figure 14:
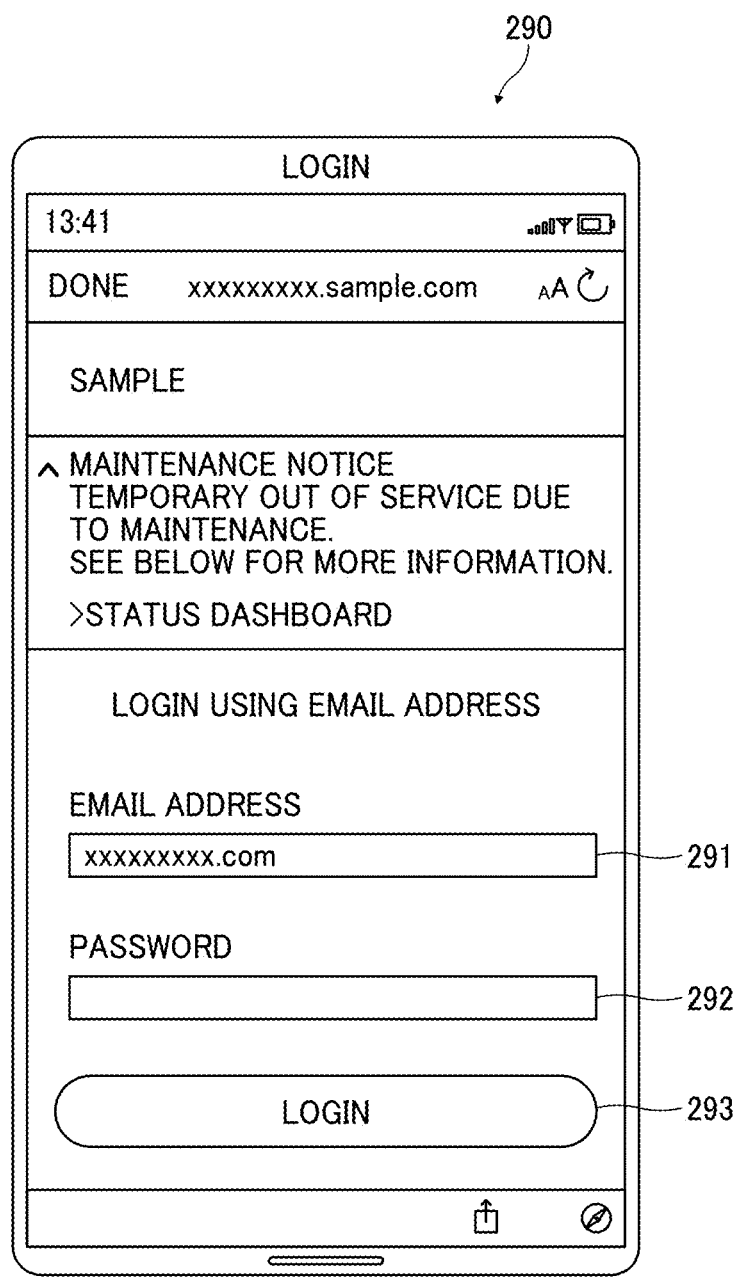
FIG. 14 is a diagram illustrating an example of a terminal login screen displayed by the information processing apparatus.

In steps S11 to S13, the user logs in to the output system 50. The login method may be the same as in FIG. 9. An example of a login screen is illustrated in FIG. 14.

Figure 16:
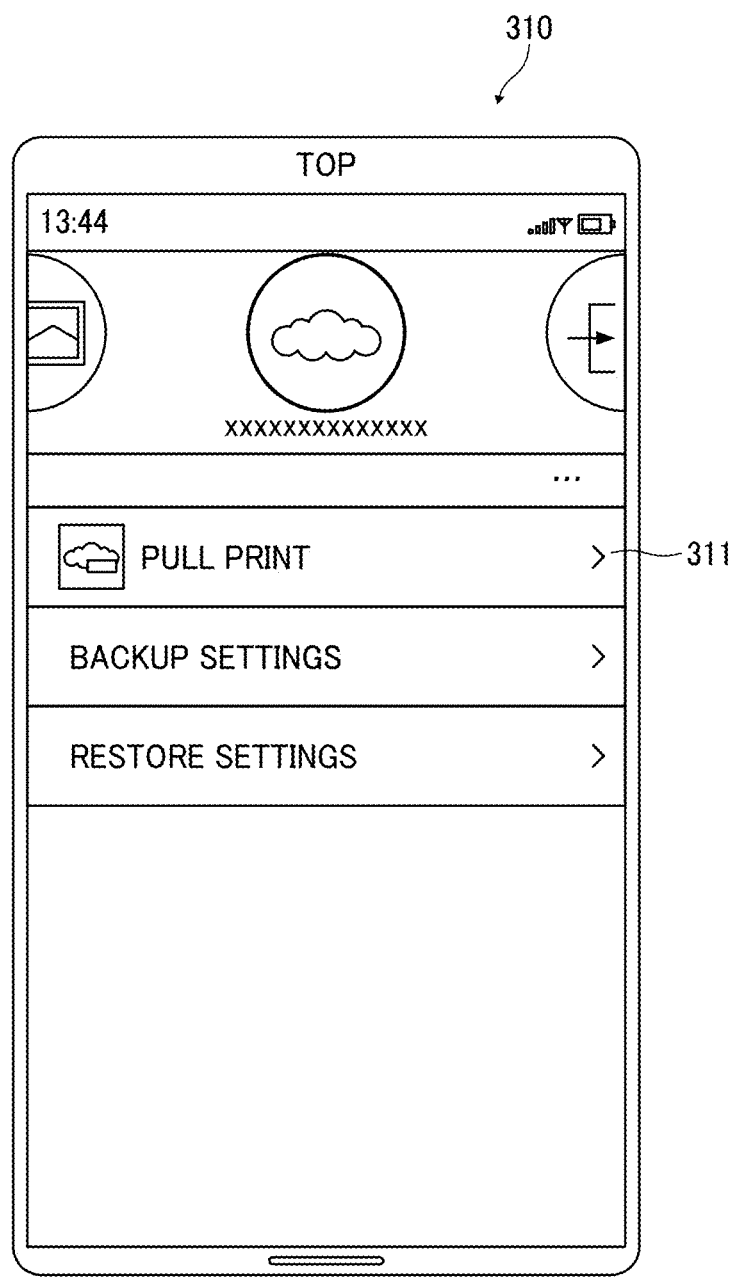
FIG. 16 is a diagram illustrating an example of a top screen displayed by the information processing apparatus.

In step S14, the user instructs the client application 19 to start printing from a menu screen. An example of the menu screen is illustrated in FIG. 16.

In step S15, the communication unit 15 of the client application 19 requests the output service 52 to acquire a list of print jobs associated with the user. At the time of request, the communication unit 15 uses the token acquired by the client application 19 in step S12. Specifically, the output service 52 acquires a list of print jobs associated with the user ID identified by the token.

In step S16, the communication unit 15 of the client application 19 receives the list of print jobs, and the display control unit 16 displays the list of print jobs. FIG. 11 is a diagram illustrating an example of the print job list of user A.

In step S17, the user inputs a selection of the print job to be reserved for printing to the client application 19. The operation reception unit 17 receives the selection. The user may select multiple print jobs.

In step S18, when the user wants to change print settings, the user inputs a start of changing the print settings of the print job to the client application 19. The operation reception unit 17 receives the start of changing the print settings.

In step S19, the display control unit 16 of the client application 19 displays the print setting screen.

In step S20, the user inputs any print settings to the client application 19. The operation reception unit 17 receives changes in the print settings. In the present embodiment, the user sets the print settings for each print job, but the print settings may be set for a plurality of print jobs together.

In step S21, when the change of the print setting is completed, the display control unit 16 of the client application 19 displays the print job list again.

Figure 17:
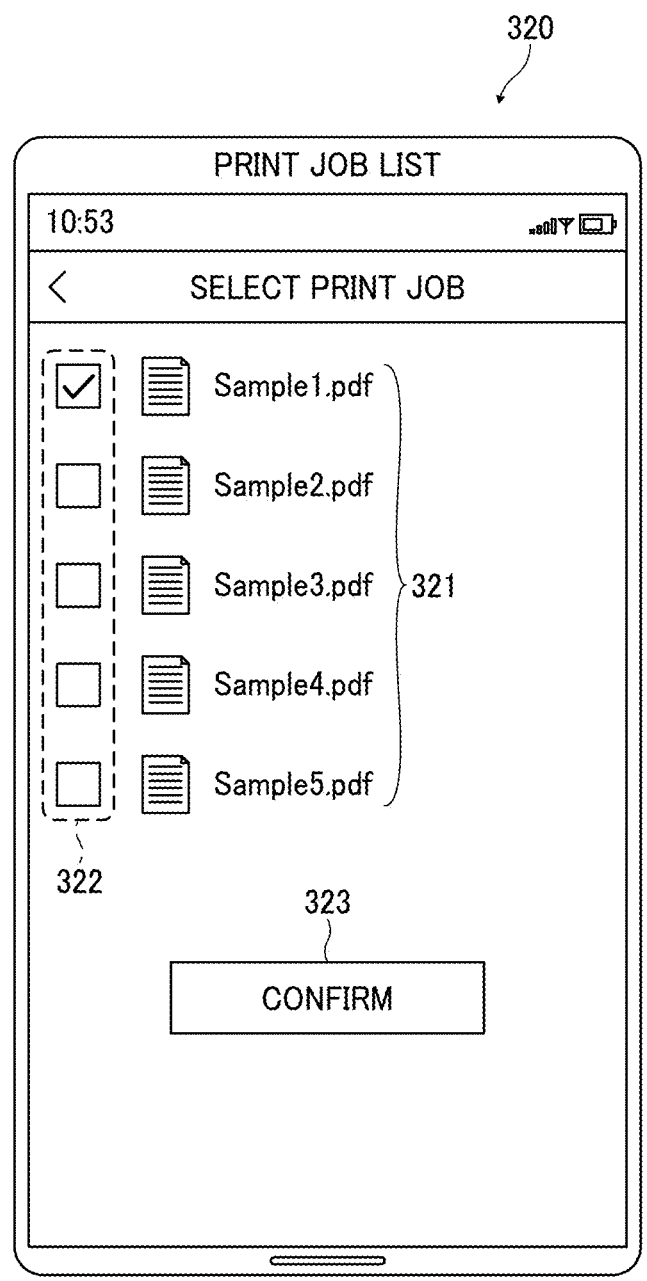
FIG. 17 is a diagram illustrating an example of a print job list screen displayed by the information processing apparatus.

In step S22, the user selects a print job to be reserved for printing on the print job list screen. The operation reception unit 17 receives the print reservation. An example of the print job list screen is illustrated in FIG. 17.

In step S23, the communication unit 15 of the client application 19 transmits the print job ID, the print job selection status, and the print settings to the output service 52. The communication unit 55 of the output service 52 receives the transmitted information and updates information on the print job storage unit 61. FIG. 12 is a diagram illustrating an example of the print job list of user A after the print reservation is made. In FIG. 12, the print reservations for a.doc and b.doc are set to "TRUE".

Figure 18:
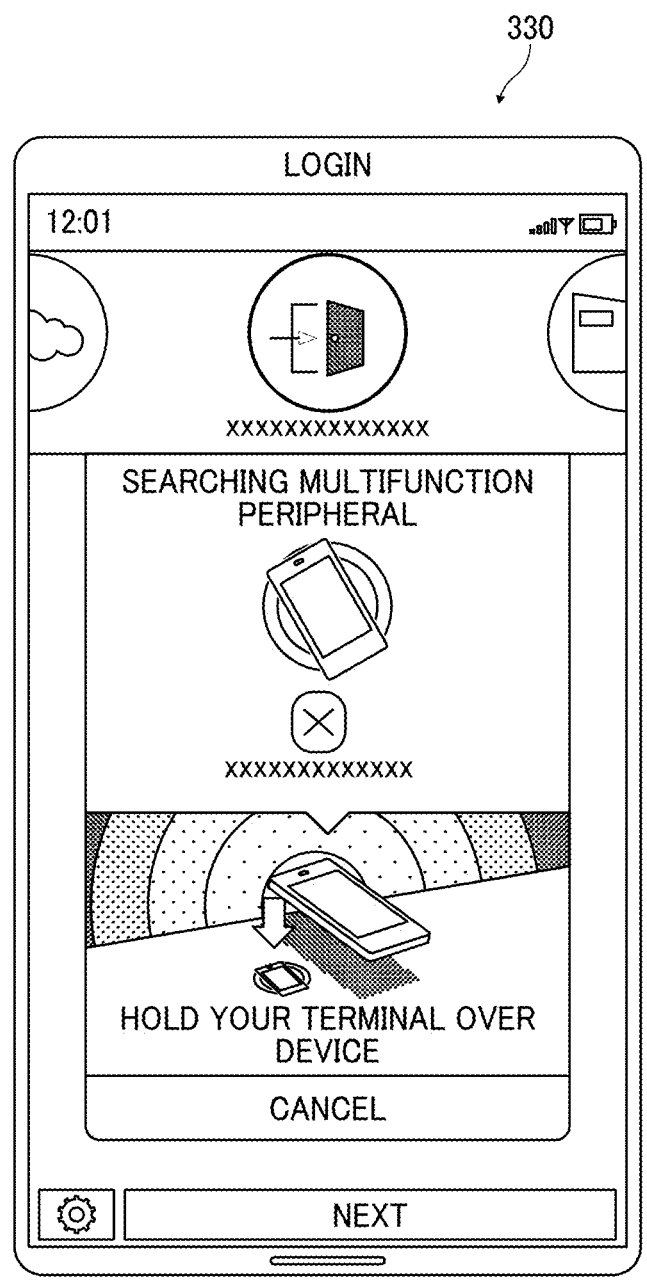
FIG. 18 is a diagram illustrating an example of the terminal login screen displayed by the information processing apparatus.

In step S24, in response to a successful print reservation setting, the display control unit 16 of the client application 19 displays a print execution screen. An example of the print execution screen is illustrated in FIG. 18.

In step S25, the user inputs a start of printing to the client application 19. The operation reception unit 17 receives the start of printing.

In step S26, when the user brings the information processing apparatus 10 close to the operation panel of the output apparatus 30, the short-range wireless communication unit 11 of the client application 19 connects to the output apparatus 30 that performs printing. In the present embodiment, the information processing apparatus 10 and the output apparatus 30 communicate with each other using BLUETOOTH LOW ENERGY (registered trademark), but other communication method may be used.

In step S27, the short-range wireless communication unit 11 of the client application 19 searches for a communicable output apparatus 30 in a vicinity.

In step S28, the short-range wireless communication unit 11 of the client application 19 transmits a print request and the UUID of the information processing apparatus 10 to the found output apparatus 30. In the present embodiment, the short-range wireless communication unit 11 transmits the UUID of the client application 19, but the IC card number of the IC card or the identification information of the smartphone may be used.

In step S29, the short-range wireless communication unit 34 of the short-range wireless communication module 31 of the output apparatus 30 receives the UUID. The internal communication unit 35 of the short-range wireless communication module 31 passes the UUID to the print client 32 and requests the print job to be executed.

In step S30, the short-range wireless communication unit 11 of the client application 19 ends the communication with the output apparatus 30.

In step S31, the communication unit 36 of the print client 32 transmits the UUID and the device authentication ticket to the authentication service 51 and requests login. In response to a successful authentication based on the device authentication ticket, the authentication service 51 identifies the user ID associated with the UUID in the account information storage unit 63. The communication unit 53 of the authentication service 51 transmits the token associated with the user ID to the output apparatus 30. The output apparatus 30 for which the device authentication ticket is not registered cannot be connected to the output system 50. Therefore, even if the UUID leaks, the output apparatus 30 that can be connected to the output system 50 is limited.

In step S32, in response to receiving the token, the communication unit 36 of the print client 32 requests the output service 52 for the list of reserved print jobs associated with the user. At the time of request, the communication unit 36 uses the token received in step S31. The communication unit 55 of the output service 52 transmits to the output apparatus 30, a list of print jobs whose print reservation setting is "TRUE" among the print jobs associated with the user ID identified by the token. The communication unit 36 of the print client 32 receives the list of print jobs.

In step S33, the communication unit 36 of the print client 32 designates the print job IDs included in the print job list in order and requests the output service 52 to acquire the print job.

In step S34, the communication unit 55 of the output service 52 transmits the print job associated with the print job ID to the print client 32 in response to the print job acquisition. The communication unit 36 of the print client 32 receives the print job. The print client 32 may receive a plurality of print jobs at once.

In step S35, the internal communication unit 38 of the print client 32 passes the print job to the print application 33 and requests the print execution.

In step S36, the print application 33 executes print process of the designated print job.

In step S37, the communication unit 36 of the print client 32 designates the print job ID and requests the output service 52 to release the print reservation of the print job that has undergone the print process.

In step S38, the communication unit 55 of the output service 52 changes the print reservation setting of the print job identified by the print job ID to "FALSE" (releases the print reservation). The output service 52 may delete the printed print job.

In step S39, the user acquires the printed sheet discharged (output) by the print application 33.

Although a print reservation phase is described in the present embodiment, the information processing apparatus 10 may automatically make the print reservation when the print job is registered. Alternatively, on a premise that the output apparatus 30 executes the print job at least once, the output apparatus 30 may automatically execute the print job in response to the user holding the information processing apparatus 10 over the output apparatus 30 even when the print reservation is not set.

Figure 13:
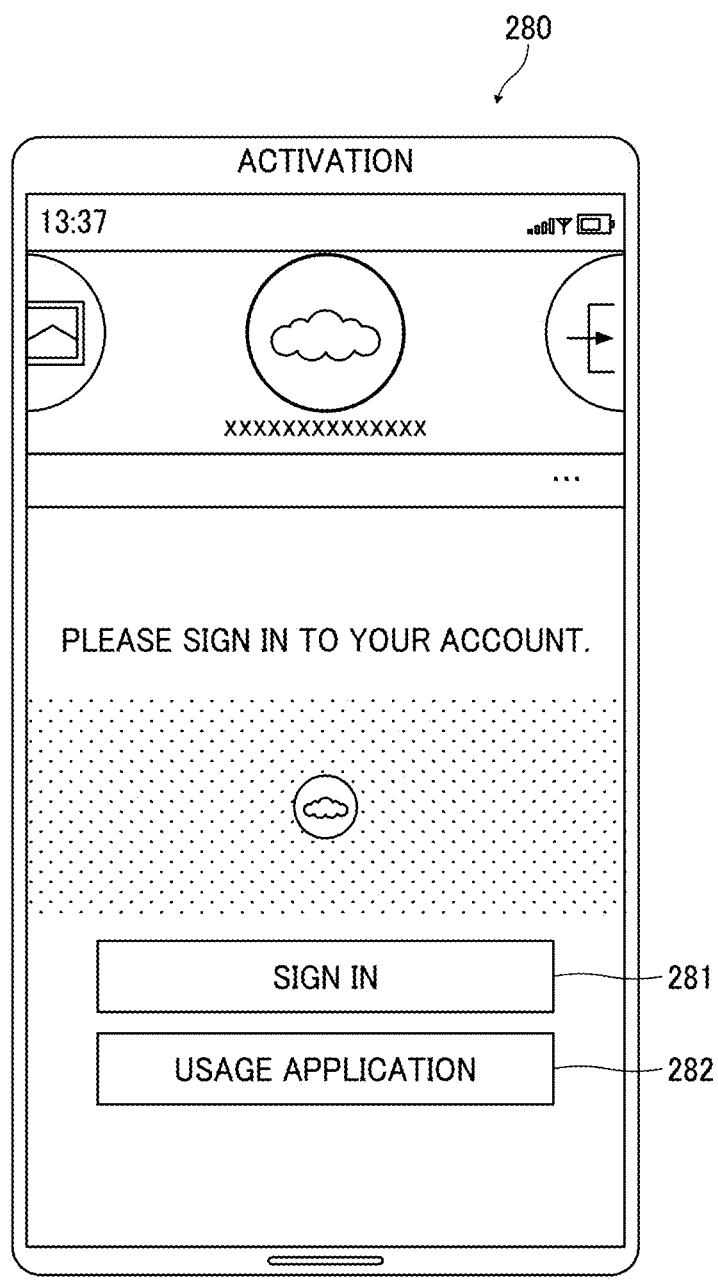
FIG. 13 is a diagram illustrating an example of an activation screen displayed by the information processing apparatus.

FIGS. 13 to 18 illustrate screen transition of the client application 19 described in the process of FIGS. 10A, 10BA, and 10BB. FIG. 13 is a diagram illustrating an example of an activation screen 280 displayed by the information processing apparatus 10. The activation screen 280 is a screen displayed immediately after the client application 19 is activated. The activation screen 280 includes a sign-in button 281 and a usage application button 282. The sign-in button 281 is a button for displaying a terminal login screen 290 of FIG. 14. The usage application button 282 is a button for the information processing apparatus 10 to connect to an application site for the pull print service.

FIG. 14 is a diagram illustrating an example of the terminal login screen 290 displayed by the information processing apparatus 10. The terminal login screen 290 includes a user ID field 291 and a password field 292. The user ID field 291 is a field in which the user inputs the user ID. The password field 292 is a field for the user to enter the password. A login button 293 is a button for displaying a terminal account registration screen 300 of FIG. 15. The screens of FIGS. 13 and 14 are often not displayed after the information processing apparatus 10 receives the token generated by the successful authentication.

Figure 15:
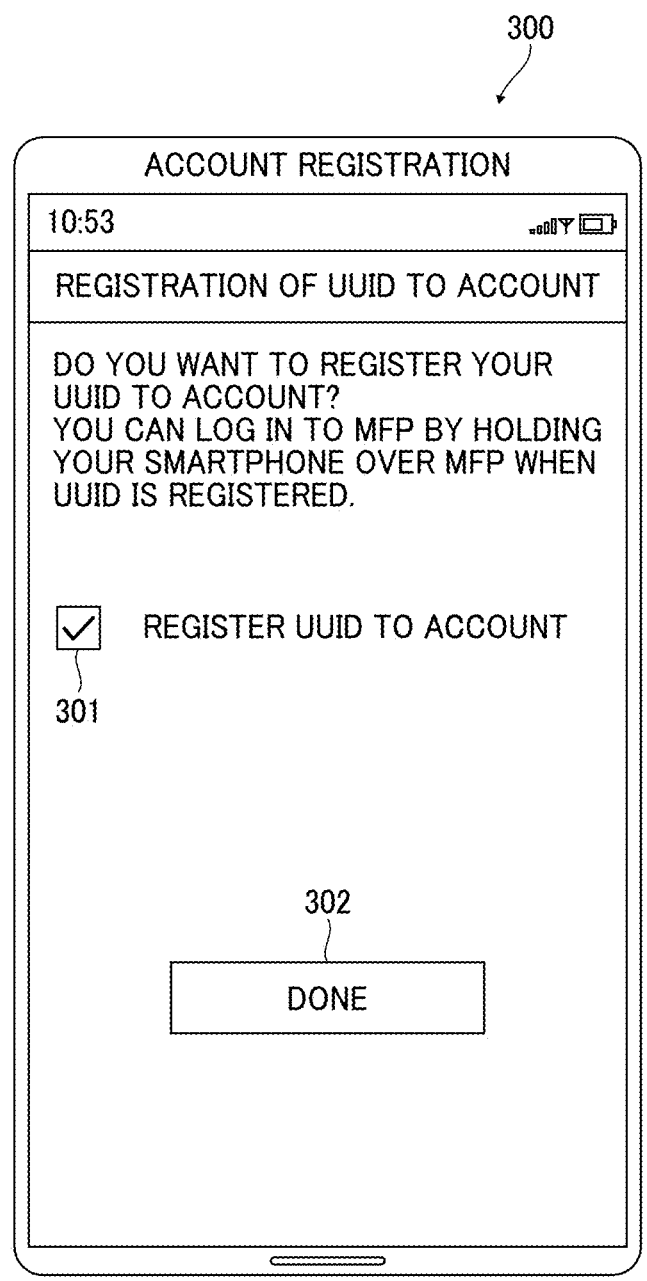
FIG. 15 is a diagram illustrating an example of a terminal account registration screen displayed by the information processing apparatus.

FIG. 15 is a diagram illustrating an example of the terminal account registration screen 300 displayed by the information processing apparatus 10. The terminal account registration screen 300 includes a check box 301 associated with "registering authentication information in the account". In response to the user checking the check box 301 and pressing a completion button 302, the UUID is stored in the account information storage unit 63 of the output system 50. The user performs the operation on the screen of FIG. 15 once. By pressing the completion button 302, the terminal account registration screen 300 transitions to a top screen 310 of FIG. 16.

FIG. 16 is a diagram illustrating an example of the top screen 310 displayed by the information processing apparatus 10. The top screen 310 is a screen that serves as a starting point for user operations. The top screen 310 includes a print button 311. The print button 311 is a button for displaying a print job list screen 320 of FIG. 17.

FIG. 17 is a diagram illustrating an example of the print job list screen 320 displayed by the information processing apparatus 10. The print job list screen 320 displays a print job list 321 including print jobs registered by the user in the output system 50. Each print job is displayed together with a check box 322, and the user makes a print reservation for the print job by checking the check box 322. When the user presses the confirmation button 323, a transition to a terminal login screen 330 of FIG. 18 is performed.

FIG. 18 is a diagram illustrating an example of the terminal login screen 330 displayed by the information processing apparatus 10. The terminal login screen 330 guides the user to hold the information processing apparatus 10 over the operation panel. The information processing apparatus 10 displaying the terminal login screen 330 transmits the UUID to the output apparatus 30.

As described above, in the information processing system 1 of the present embodiment, since the user registers the print job to be reserved for printing in the output system 50 in advance, the user does not need to select the print job in the output apparatus 30. Accordingly, the user does not have to touch the output apparatus 30. Since the information processing apparatus 10 transmits the UUID to the output apparatus 30, there is little risk of leaking confidential information such as the password.

The client application 19 includes a function of registering the UUID in the output system 50. The user needs to register once. A process for the client application 19 to register the UUID in the output system 50 in the pull print sequence diagram of FIGS. 10A, 10BA and 10BB are described below.

FIGS. 19A, 19BA, and 19BB are sequence diagrams illustrating an example of the process in which the output apparatus 30 executes the print job reserved for printing by the user, which involves registration of the UUID. In the description of FIGS. 19A, 19BA, and 19BB, difference from FIGS. 10A, 10BA, and 10BB is mainly described. Steps S11 and S12 may be the same as in FIG. 10A.

In step S40, the communication unit 15 of the client application 19 designates a token and acquires the UUID stored in the account information storage unit 63.

In step S41, when the authentication service 51 determines that the user ID (that is, also the UUID) is not stored in the account information storage unit 63, the determination is transmitted to the client application 19. The display control unit 16 of the client application 19 displays the terminal account registration screen 300 of FIG. 15. The user checks the check box 301 associated with "registering the authentication information in the account" and presses the completion button 302.

In step S42, the display control unit 16 of the client application 19 displays a dialog or the like for confirming whether to register the UUID.

In step S43, the user inputs to register the UUID in the client application 19. The operation reception unit 17 of the client application 19 receives the input.

In step S44, the communication unit 15 of the client application 19 requests the authentication service 51 to register the UUID.

In step S45, the communication unit 53 of the authentication service 51 receives the UUID registration request, and the authentication service 51 registers the UUID and the type in the on-premises account in association with the user ID. After registration, the terminal account registration screen 300 is not automatically displayed and is not displayed unless the user performs a predetermined operation.

Subsequent process may be the same as in FIGS. 10A, 10BA and 10BB.

According to this modified embodiment, the user can register the UUID in the output system 50 from the client application 19.

When the UUID is changed after the client application 19 registers the UUID in the output system 50, the user can update the UUID.

Figure 20A:
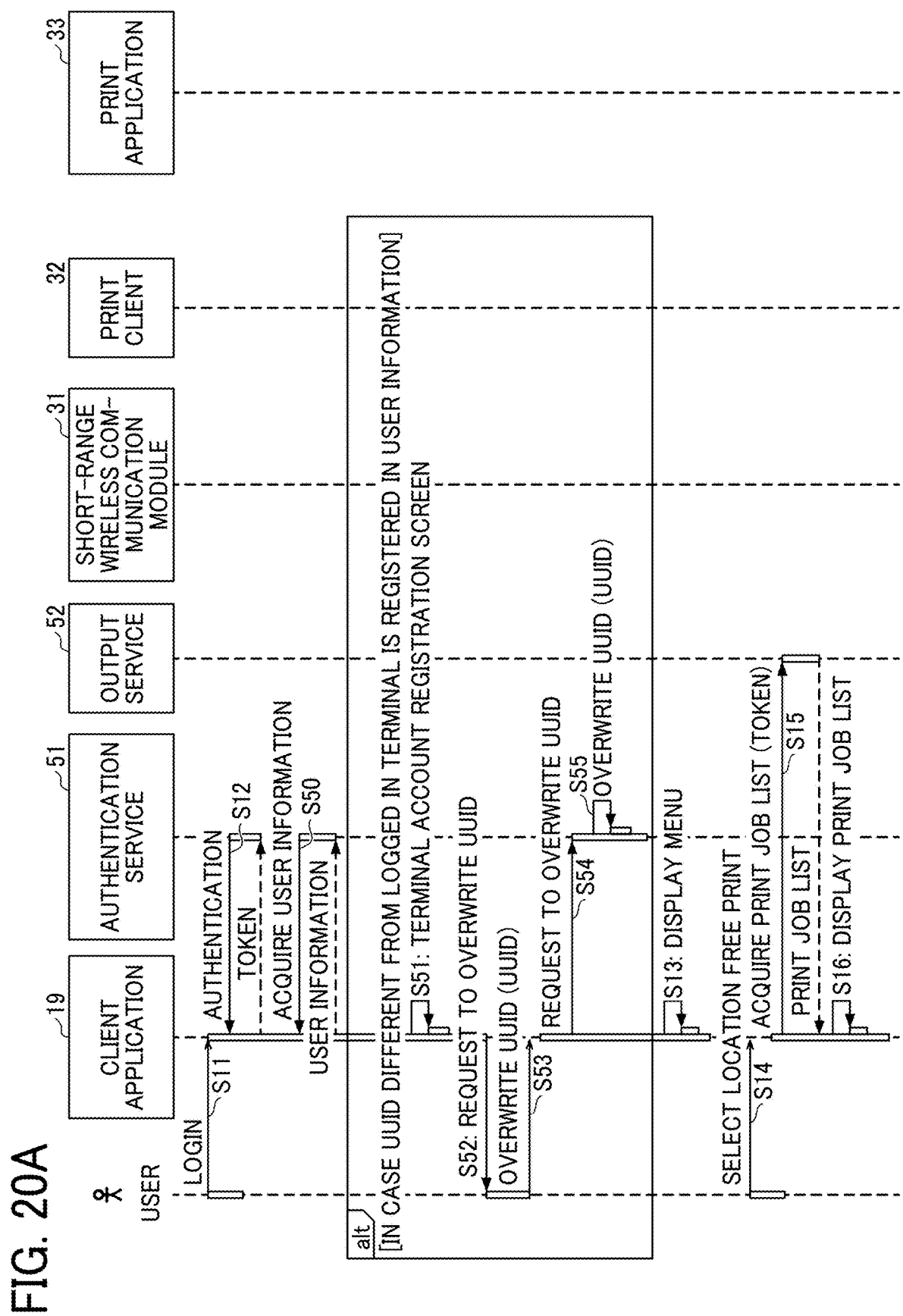

FIGS. 20A, 20BA and 20BB are sequence diagrams illustrating an example of a process in which the output apparatus 30 executes the print job reserved for printing by the user, that involves updating the UUID. In the description of FIGS. 20A, 20BA and 20BB, difference from FIGS. 10A, 10BA, 10BB is mainly described. Steps S11 and S12 may be the same as in FIG. 10A.

In step S50, the communication unit 15 of the client application 19 designates a token and acquires the UUID stored in the account information storage unit 63.

In step S51, the client application 19 determines whether the current UUID and the UUID included in the account information match. When the current UUID and the UUID included in the account information do not match, the display control unit 16 of the client application 19 displays the terminal account registration screen 300. The user checks the check box 301 associated with "registering the authentication information in the account" and presses the completion button 302. The case where the UUIDs do not match includes a case where the user reinstalled the client application 19 on the information processing apparatus 10 or a case where the information processing apparatus 10 is replaced by a new one.

In step S52, the display control unit 16 of the client application 19 displays a dialog or the like for confirming whether to register the UUID.

In step S53, the user inputs to register the UUID in the client application 19. The operation reception unit 17 of the client application 19 receives the input.

In step S54, the communication unit 15 of the client application 19 requests the authentication service 51 to overwrite the UUID.

In step S55, the communication unit 53 of the authentication service 51 receives the UUID registration request, and the authentication service 51 overwrites the UUID in association with the user ID stored in the account information storage unit 63.

Subsequent process may be the same as in FIGS. 10A, 10BA and 10BB.

According to this modified embodiment, when the UUID of the client application 19 changes, the client application 19 automatically displays the terminal account registration screen 300, so that the user can overwrite the UUID from the client application 19 on the output system 50.

In a second embodiment, an information processing system 1 that allows a user to pull print using an IC card is described.

Figure 21:
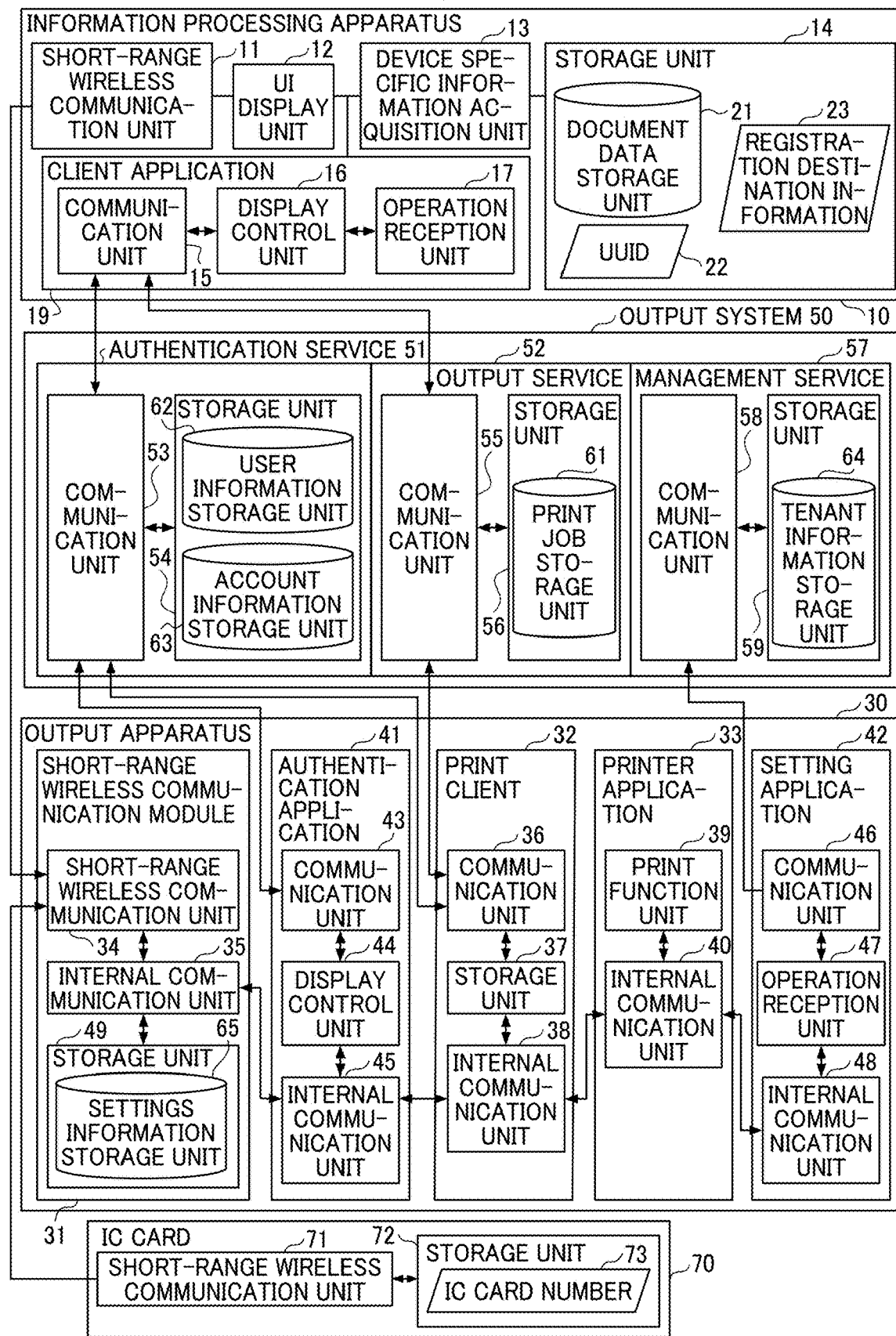
FIG. 21 is a block diagram illustrating an example of a functional configuration of the information processing apparatus, the output system, and the output apparatus of the information processing system according to a second embodiment of the present disclosure.

FIG. 21 is a block diagram illustrating an example of a functional configuration of an information processing apparatus 10, an output system 50, and an output apparatus 30 included in the information processing system 1 according to the second embodiment of the present disclosure. In the description of FIG. 21, difference from FIG. 6 is mainly described.

The output system 50 of the present embodiment includes a management service 57. The management service 57 manages tenant information. For example, the management service 57 manages whether a tenant is allowed to log in using a smart device or the IC card.

The management service 57 includes a communication unit 58. The communication unit 58 receives a setting of availability of the IC card or smart device from a PC. Further, the communication unit 58 receives an inquiry about the availability of the IC card or the smart device from the output apparatus 30 and returns the availability.

A storage unit 59 of the management service 57 includes a tenant information storage unit 64.

TABLE 6

| TENANT ID | 123 |
| TENANT NAME | SAMPLE COMPANY |

TABLE 6-continued

| AVAILABILITY OF IC CARD OR SMART DEVICE | IC CARD: ENABLED SMART DEVICE: ENABLED |
| ... | ... |

Table 6 illustrates an example of the tenant information stored in the tenant information storage unit 64. The tenant information mainly includes information related to tenant settings and the like. The tenant information includes a tenant ID, a tenant name, and availability of the IC card or the smart device in association with each other. —The "tenant ID" is identification information for identifying the tenant. —The tenant name is a general name of the tenant (for example, company name, department name, etc.). —The availability of the IC card or smart device is a setting of whether the output apparatus 30 in the tenant is permitted to log in using the IC card or smart device.

Since the user and the output apparatus 30 belong to one or more tenants, the output system 50 can identify the tenant when the user or the output apparatus 30 is identified.

Further, in Table 6, the availability of the IC card or smart device is registered in the tenant, but the availability of the IC card or smart device may be registered for each output apparatus 30.

The output apparatus 30 includes an authentication application 41 and a setting application 42. When the short-range wireless communication module 31 detects the information processing apparatus 10 or the IC card, the authentication application 41 requests the output system 50 to authenticate using the UUID received by the short-range wireless communication module 31. In response to a successful authentication, the authentication application 41 receives the token or the like from the output system 50, and further permits a use of the output apparatus 30.

The authentication application 41 includes a communication unit 43, a display control unit 44, and an internal communication unit 45. The communication unit 43 transmits the UUID to the output system 50 and receives an authentication result (token or the like). The internal communication unit 45 receives the UUID from the internal communication unit 35 of the short-range wireless communication module 31. In response to an authentication failure, the display control unit 44 displays a login screen according to the setting of availability of the IC card or smart device and displays an account information input screen 250 described below.

Further, the short-range wireless communication module 31 of the present embodiment includes a storage unit 49. The storage unit 49 includes a setting information storage unit 65 (Table 7).

TABLE 7

| AVAILABILITY OF IC CARD OR SMART DEVICE | IC CARD: ENABLED SMART DEVICE: ENABLED |
| PRINT SETTINGS | DEFAULT PRINT SETTINGS |
| SCAN SETTINGS | DEFAULT SCAN SETTINGS |
| ... | ... |

Table 7 illustrates an example of the setting information stored in the setting information storage unit 65. The setting information includes various settings in the output apparatus 30. The setting information includes items such as availability of the IC card or smart device, print settings, and scan settings.

The availability of the IC card or smart device indicates whether the output apparatus 30 is permitted to log in using the IC card or smart device.

The print settings indicate default print settings.

The scan settings indicate default scan settings.

The setting application 42 receives the setting of whether the management service 57 permits use of the IC card or smart device.

The setting application 42 displays a usage setting screen described below and receives the settings related to the login method on the output apparatus 30. The setting application 42 receives a setting of whether to execute an event (whether to authenticate) according to the detection of the IC card or the information processing apparatus 10 when the user holds the IC card or the information processing apparatus 10 over the output apparatus 30. The operation reception unit 47 of the setting application 42 receives these settings.

The communication unit 46 of the setting application 42 receives the setting of availability of the IC card or smart device from the management service 57 of the output system 50. The internal communication unit 48 of the setting application 42 communicates with other applications included in the output apparatus 30.

The IC card 70 includes a communication function and an information storage function. The IC card 70 includes a short-range wireless communication unit 71 similar to the information processing apparatus 10. The short-range wireless communication unit 71 communicates with the output apparatus 30 by, for example, NFC. Further, the IC card 70 includes a storage unit 72, and the storage unit 72 stores an IC card number 73.

Figure 22:
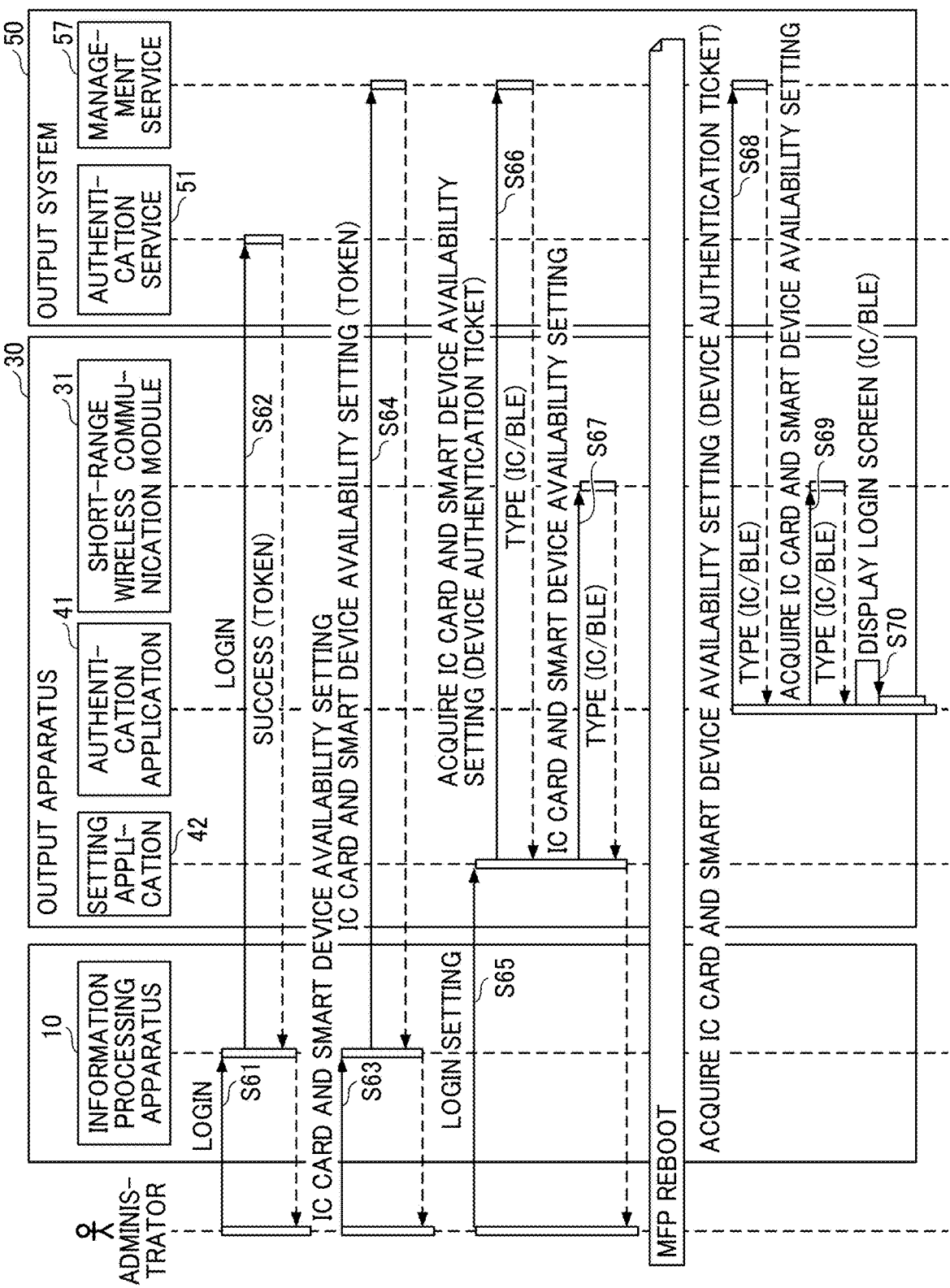
FIG. 22 is a sequence diagram illustrating an example of a process in which the output system and the output apparatus receive a login method setting in response to an operation by the user.
Figure 23A:
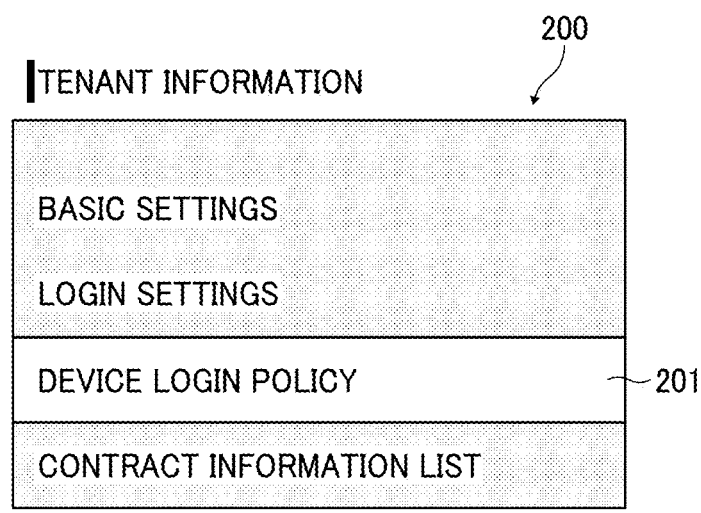
FIGS. 23A and 23B are diagrams illustrating an example of a tenant management screen displayed by the information processing apparatus.
Figure 23B:
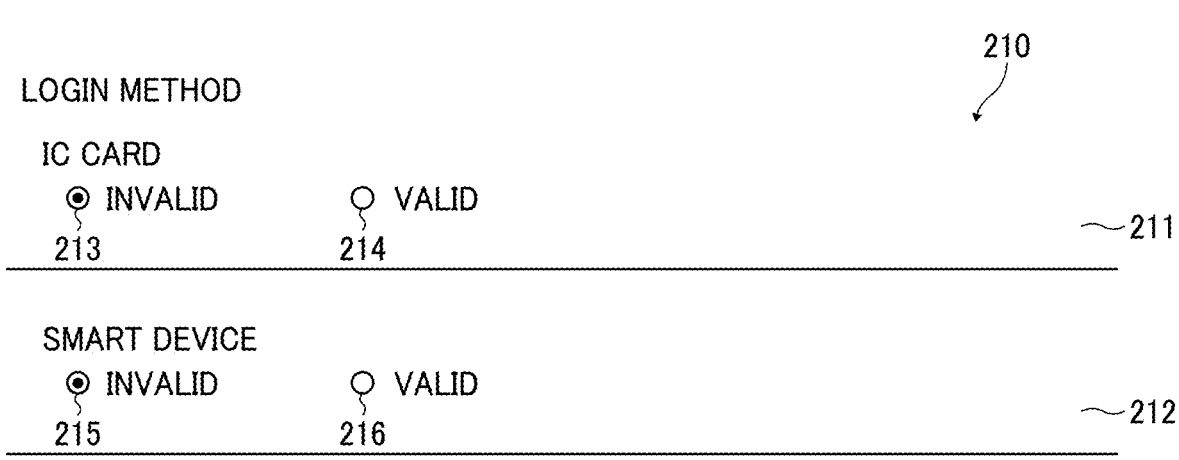
Figure 24:
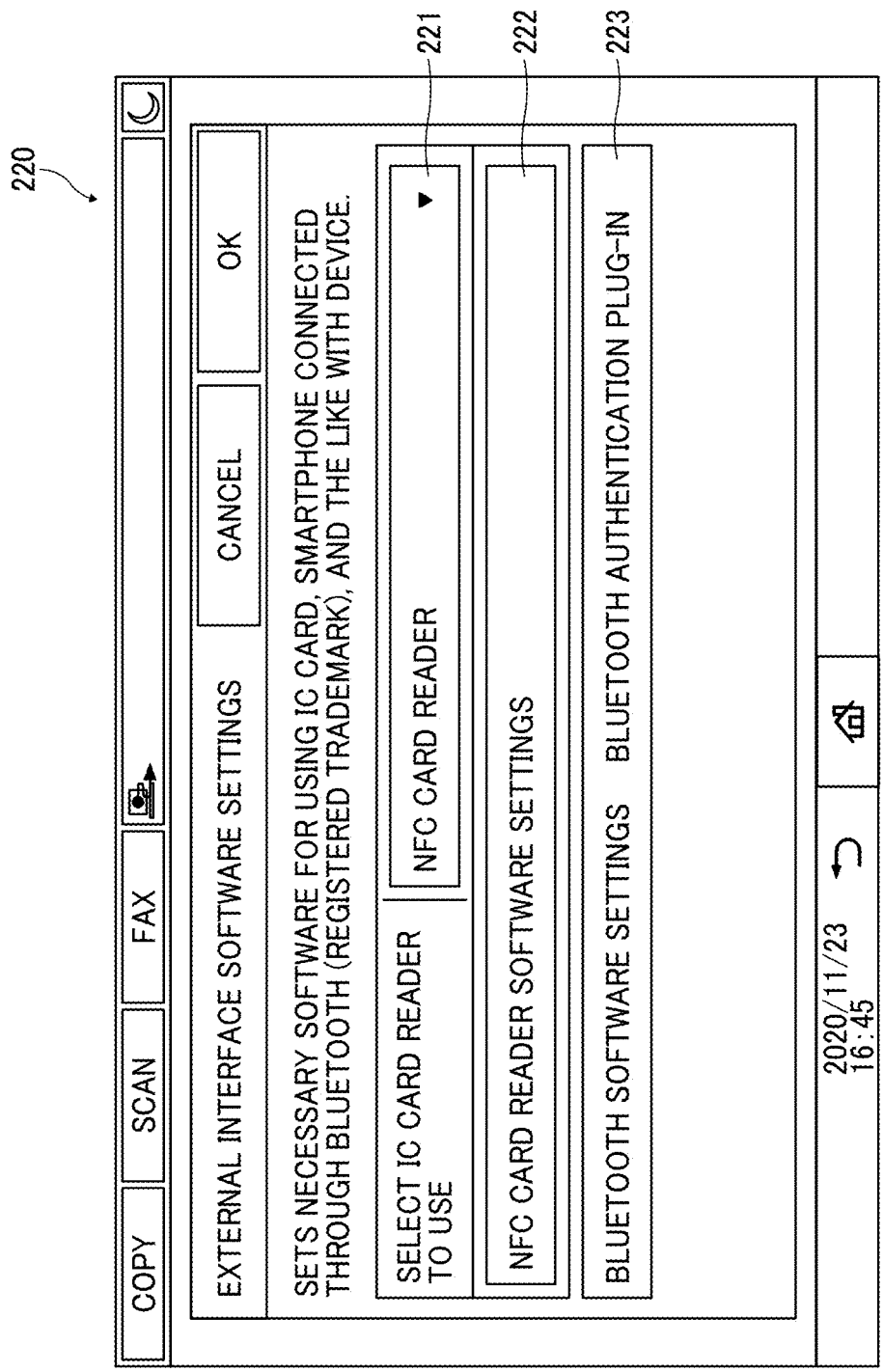
FIG. 24 is a diagram illustrating an example of a usage setting screen displayed by the output apparatus.
Figure 25:
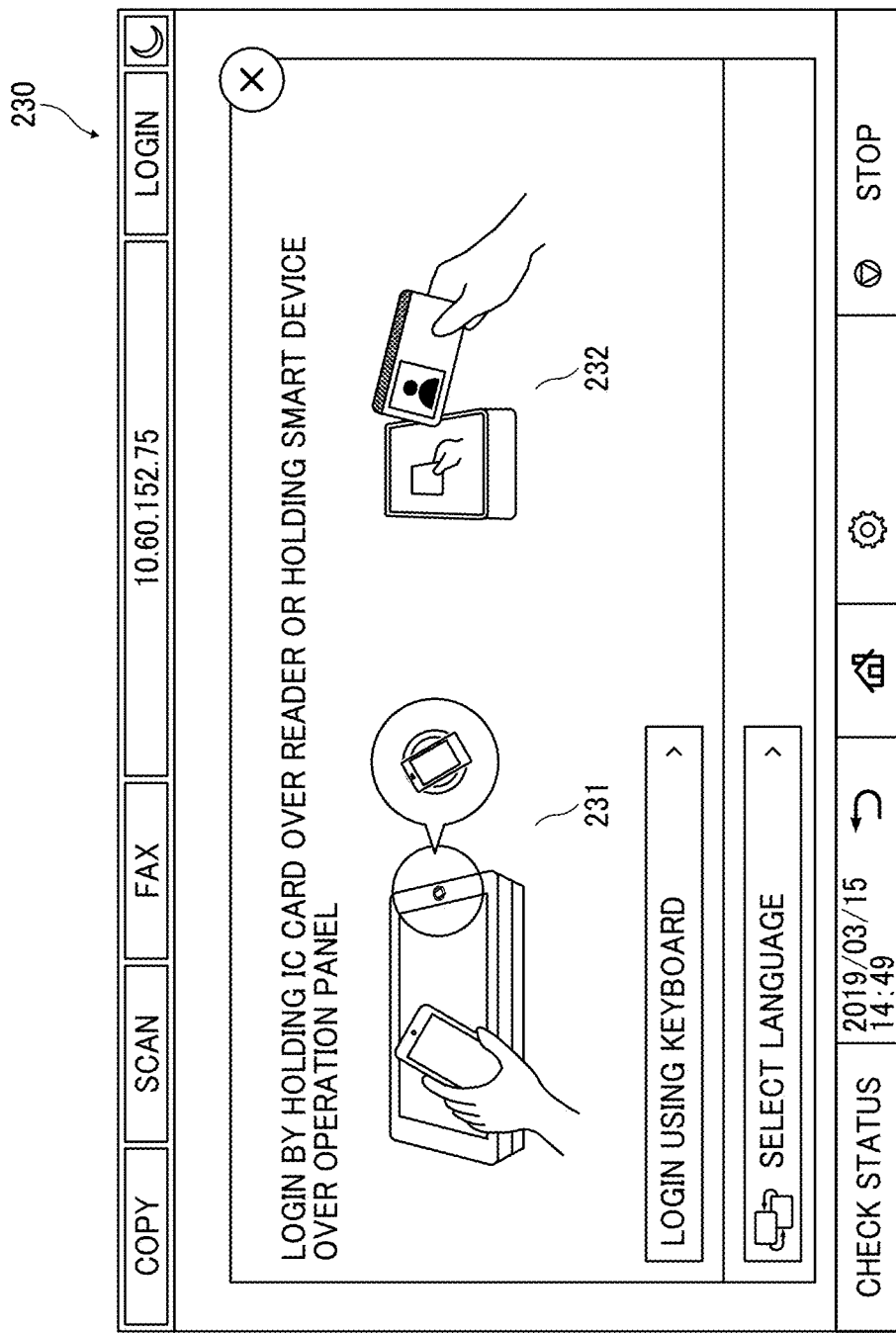
FIG. 25 is a diagram illustrating an example of a login screen displayed by the output apparatus.

With reference to FIGS. 22 to 25, a process of setting a login method by an administrator is described. FIG. 22 is a sequence diagram illustrating an example of the process in which the output system 50 and the output apparatus 30 receive a login method setting in response to an operation by the user. FIGS. 23 to 25 illustrate screen examples referred to in this sequence diagram.

In step S61, the administrator operates the information processing apparatus 10 to communicate the information processing apparatus 10 with the output system 50. The PC is assumed as the information processing apparatus 10, but a smartphone may also be used. The administrator inputs, for example, the user ID and password on a login screen displayed by the UI display unit 12 of the information processing apparatus 10. The UI display unit 12 of the information processing apparatus 10 receives login information.

In step S62, the information processing apparatus 10 sends a login request including the user ID and password to the authentication service 51. The communication unit 53 of the authentication service 51 receives the login request. The authentication service 51 determines whether the authentication is successful or unsuccessful depending on whether the user ID and password are stored in the user information storage unit 62. In response to a successful authentication, the authentication service 51 generates a token and stores the token in association with the user ID in the user information storage unit 62. The communication unit 53 of the authentication service 51 transmits the token to the information processing apparatus 10.

In step S63, in response to the successful authentication, the administrator causes the information processing apparatus 10 to display the tenant management screen and sets whether the IC card or smart device can be used. An example of the tenant management screen is illustrated in FIGS. 23A and 23B.

In step S64, the information processing apparatus 10 transmits the availability of the IC card or smart device to the management service 57. The communication unit 58 of the management service 57 receives the availability of the IC card or smart device and stores the availability of the IC card or smart device in the tenant information storage unit 64. That is, since the user ID and the tenant are identified by the token, the availability of the IC card or smart device is set for the tenant.

In step S65, the administrator sets the login method of the output apparatus 30 from the screen of the output apparatus 30.

In step S66, the operation reception unit 47 of the setting application 42 receives the login method setting. As a result, the communication unit 46 of the setting application 42 attaches the device authentication ticket and requests the output system 50 whether the IC card or the smart device can be used.

The communication unit 58 of the management service 57 receives the request for availability of the IC card or smart device, and the management service 57 identifies the tenant with the device authentication ticket. The management service 57 acquires the availability of the IC card or smart device from the tenant information storage unit 64, and the communication unit 58 transmits the availability to the output apparatus 30.

In step S67, the communication unit 46 of the setting application 42 receives the availability of the IC card or smart device. The internal communication unit 48 of the setting application 42 passes the availability of the IC card or smart device to the short-range wireless communication module 31, and the short-range wireless communication module 31 stores the availability of the IC card or smart device in the setting information storage unit 65. In this way, the output apparatus 30 in the tenant can share the setting of availability of the IC card or smart device in the tenant. However, as described above, the administrator may be able to set the availability of the IC card or smart device for each output apparatus 30.

The administrator can also set the availability of the IC card or smart device in the output apparatus 30. In addition, the administrator sets an IC card detection plug-in or a BLUETOOTH (registered trademark) plug-in that detects the authentication information of the smart device. The IC card uses the NFC method, and the smart device uses the BLUETOOTH method. The methods can be set by the administrator from the usage setting screen. An example of the usage setting screen is illustrated in FIG. 24.

In the case of IC cards, the administrator may make different settings such as NFC in Japan and USB overseas. Further, the administrator may select NFC or USB from the screen of the output apparatus 30.

Depending on the specification of the output apparatus 30, the administrator restarts the output apparatus 30 as soon as the setting is completed.

In step S68, the communication unit 43 of the authentication application 41 of the restarted output apparatus 30 attaches the device authentication ticket and acquires the availability of the IC card or smart device from the management service 57. This is to confirm consistency of the settings of the output apparatus 30 and the output system 50.

In step S69, the internal communication unit 45 of the authentication application 41 acquires the availability of the IC card or smart device stored in the setting information storage unit 65 from the internal communication unit 35 of the short-range wireless communication module 31.

In step S70, the display control unit 44 of the authentication application 41 displays an appropriate login screen according to the setting of availability of the IC card or smart device.

Pattern 1: When both the output system 50 and the output apparatus 30 have the availability of the IC card or smart device already set, the authentication application 41 displays a login screen (a screen indicating the IC card or smart device being held). An example of the login screen is illustrated in FIG. 25.

Pattern 2: When both the output system 50 and the output apparatus 30 are set to allow only one of the IC card or the smart device, the authentication application 41 displays a login screen indicating only one of the available IC cards or the smart device being held.

Pattern 3: When there is a discrepancy between the settings of the output system 50 and the output apparatus 30 (setting in the output system 50 is valid but the setting is invalid in the output apparatus 30, or the output system 50 is invalid but the setting is valid in the output apparatus 30), the authentication application 41 determines that the setting of availability of the IC card or smart device is invalid. The authentication application 41 does not display the login screen indicating either the IC card or the smart device being held (the user logs in with the user ID and password).

In the present embodiment, each time the login screen is displayed, the output apparatus 30 checks the availability setting of the IC card or smart device in the output system 50 and checks the availability of the IC card or smart device in the setting information storage unit 65. For example, the authentication application 41 checks when the login screen is displayed again after pressing the login button, or when the authentication application 41 is activated after the output apparatus 30 is restarted.

FIGS. 23A and 23B are diagrams illustrating an example of a tenant management screen displayed by the information processing apparatus 10. FIG. 23A illustrates a menu screen 200 for the administrator to display the tenant management screen. The administrator presses a device login policy button 201. FIG. 23B illustrates an example of the tenant management screen 210.

The tenant management screen 210 includes an IC card setting field 211 and a smart device setting field 212. The IC card setting field 211 includes an invalid radio button 213 and a valid radio button 214. The administrator sets the availability of the IC card at the time of login in the output apparatus 30.

The smart device setting field 212 includes an invalid radio button 215 and a valid radio button 216. The administrator sets the availability of the smart device at the time of login in the output apparatus 30.

FIG. 24 is a diagram illustrating an example of the usage setting screen 220 displayed by the output apparatus 30. The usage setting screen 220 includes following items.

A selection field 221 of an IC card reader to be used. The administrator can set, for example, NFC or FELICA (registered trademark).
A software setting field for an NFC card reader 222. The administrator can set the software to be used in the NFC card reader.
A BLUETOOTH (registered trademark) software setting field 223. The administrator can set the software used in BLUETOOTH (registered trademark).

FIG. 25 is a diagram illustrating an example of a login screen 230 displayed by the output apparatus 30. Since the login screen 230 of FIG. 25 is a screen corresponding to the above pattern 1, the screen includes an illustration 231 of holding the smart device and an illustration 232 of holding the IC card. In this case, the user can log in with either the smart device or the IC card. In the case of the pattern 2, either the illustration 231 holding the smart device or the illustration 232 holding the IC card is displayed. In the case of pattern 3, neither illustration is displayed, and the input fields for the user ID and password are displayed.

Figure 26:
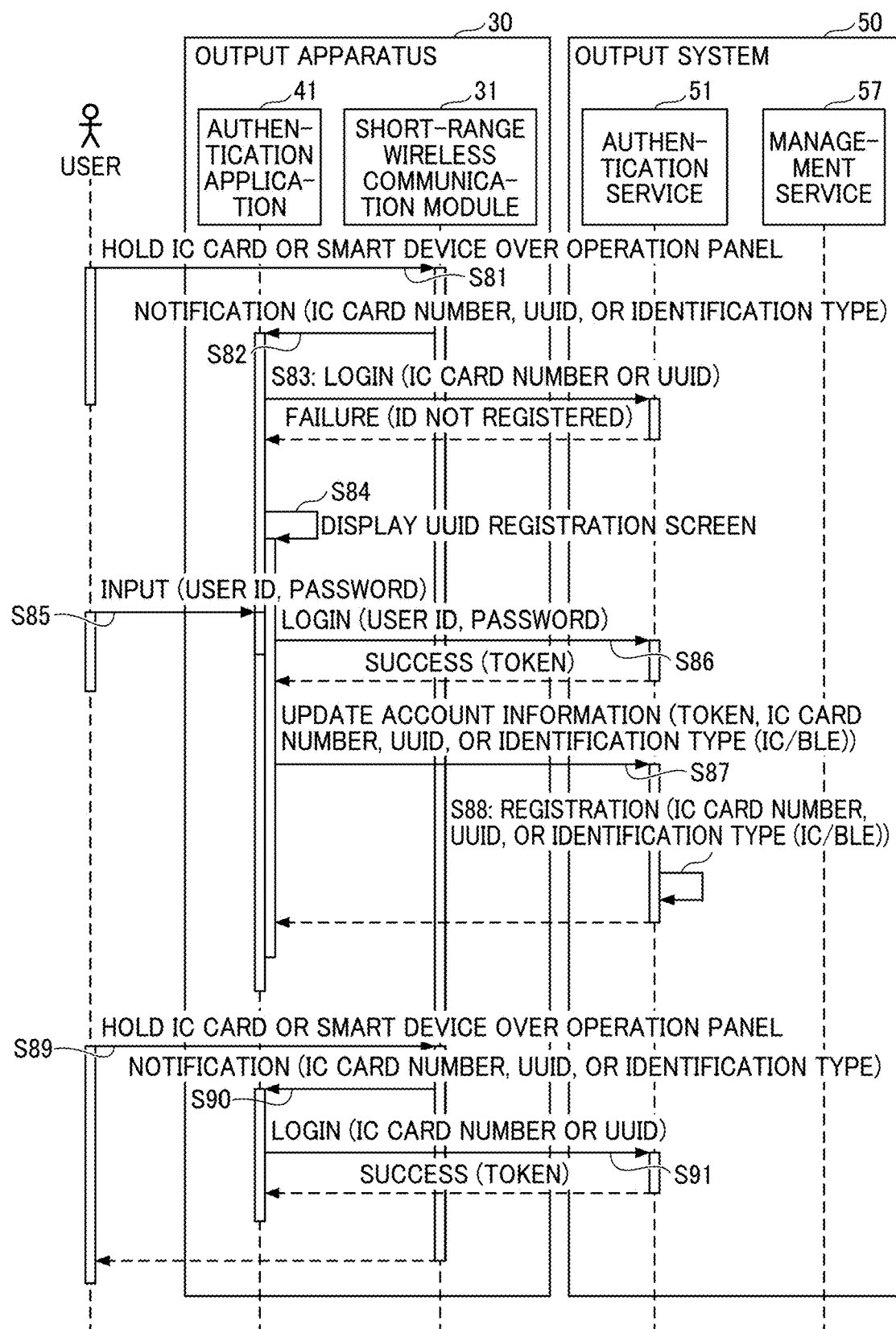
FIG. 26 is a sequence diagram illustrating an example of a process in which the user registers the UUID or integrated circuit (IC) card number and the output apparatus receives the login to the output system.
Figure 27A:
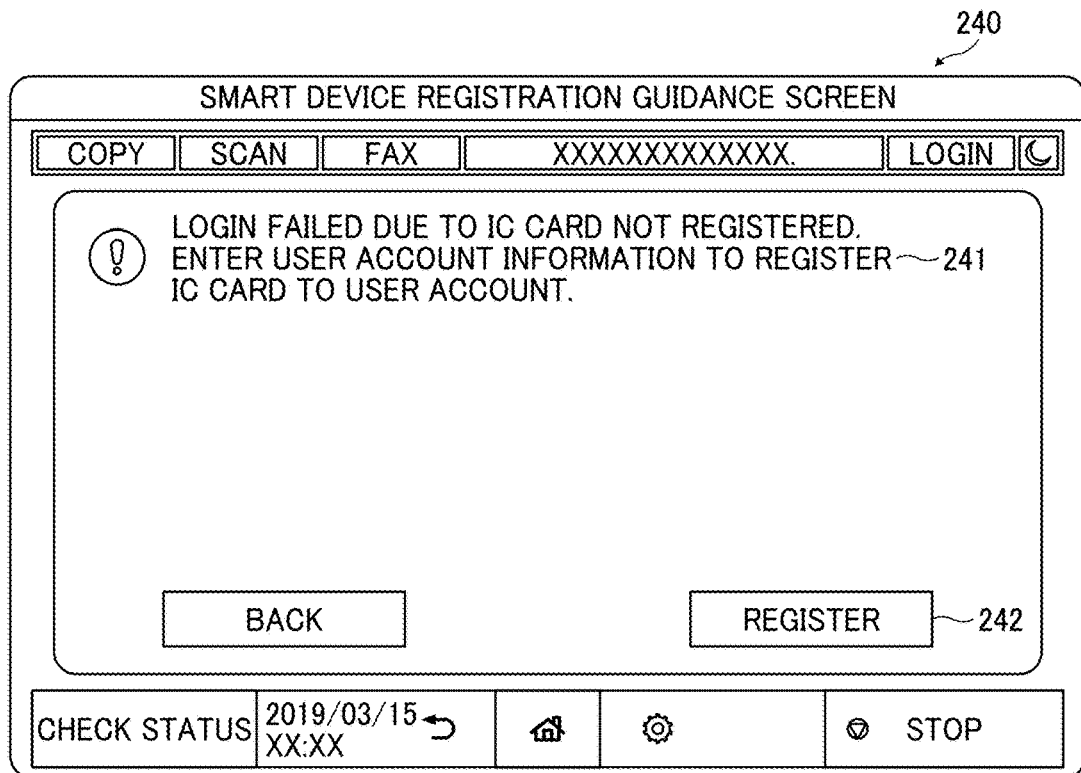
FIGS. 27A and 27B are diagrams illustrating an example of registration of the IC card number or UUID to be displayed by the output apparatus.
Figure 27B:
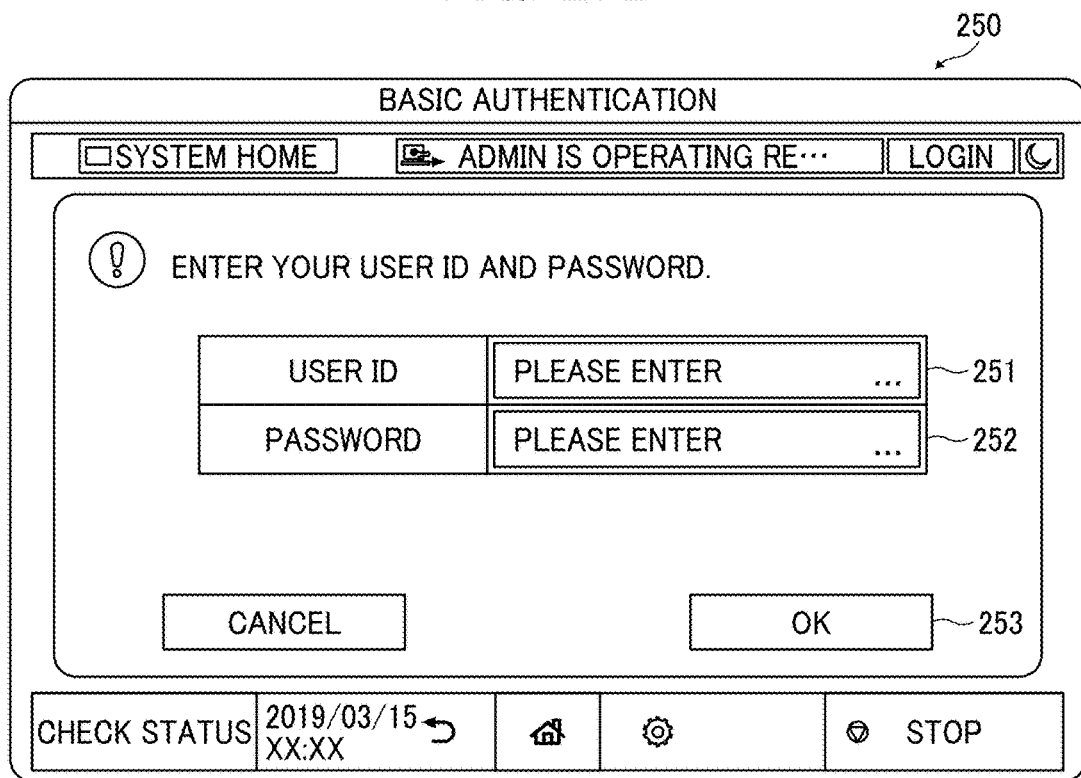

With reference to FIGS. 26, 27A, 27B, and 28, a process in which the user logs in to the output system 50 is described. FIG. 26 is a sequence diagram illustrating an example of the process in which the user registers the UUID or IC card number and the output apparatus 30 receives a login to the output system 50. FIGS. 27A, 27B, and 28 illustrate examples of screens referred to in the sequence diagram.

In step S81, with the output apparatus 30 displaying the login screen illustrated in FIG. 25, the user holds the IC card or smart device over the operation panel. At this stage, it is assumed that the UUID or IC card number is not registered in the output system 50.

The short-range wireless communication unit 34 of the short-range wireless communication module 31 communicates with the IC card or the information processing apparatus 10. The short-range wireless communication unit 34 acquires the IC card number 73 from the IC card or the UUID 22 from the information processing apparatus 10.

In step S82, the internal communication unit 35 of the short-range wireless communication module 31 transmits the IC card number or UUID, and the identification type (either the IC card or the information processing apparatus 10) to the authentication application 41.

In step S83, the communication unit 43 of the authentication application 41 transmits the IC card number or UUID to the authentication service 51. The communication unit 53 of the authentication service 51 receives the IC card number or UUID. The authentication service 51 determines whether the IC card number or UUID is stored in the account information storage unit 63. Since the IC card number or UUID is not stored at the time of step S83, the communication unit 53 of the authentication service 51 transmits an authentication failure (ID not registered) to the output apparatus 30.

In step S84, in response to receiving the authentication failure (ID not registered) by the communication unit 43 of the authentication application 41, the display control unit 44 displays the IC card number or UUID registration screen on the operation panel. FIGS. 27A and 27B illustrate examples of the registration screens.

In step S85, the user enters own user ID and password on the registration screen.

In step S86, the communication unit 43 of the authentication application 41 transmits to the authentication service 51, a login request including the user ID and password. The authentication service 51 determines whether the authentication is successful or unsuccessful depending on whether a pair of the user ID and the password is stored in the user information storage unit 62. In response to a successful authentication, the authentication service 51 generates a token and associates the token with the user ID. The communication unit 53 of the authentication service 51 transmits the token to the output apparatus 30.

In step S87, in response to the successful authentication, the communication unit 43 of the authentication application 41 requests the authentication service 51 to update the account information by attaching the IC card number or UUID, the identification type, and the token.

In step S88, the communication unit 53 of the authentication service 51 receives the account information update request. The authentication service 51 stores the IC card number or UUID and the identification type in the account information storage unit 63 in association with the user ID identified by the token.

The user can check the registration record from the my page screen by logging in to the output system 50 with the information processing apparatus 10. Also, the registration can be canceled. An example of the my page screen is illustrated in FIG. 28.

The process of steps S89 to S91 is the same as that of steps S81 to S83. That is, the communication unit 53 of the authentication service 51 receives the login request. The authentication service 51 determines whether the IC card number or UUID is stored in the account information storage unit 63. Since the IC card number or UUID is stored at the time of step S91, the communication unit 53 of the authentication service 51 notifies the authentication application 41 of the authentication success together with a token associated with the IC card number or the user ID identified by the UUID.

FIGS. 27A and 27B are diagrams illustrating examples of the screens for registering the IC card number or UUID. FIG. 27A is a guidance screen 240 for inquiring the user whether the 1C card number or UUID is to be registered. The guidance screen 240 includes a message 241 stating "Login failed due to IC card not registered. Enter user account information to register IC card to the user account" and a registration button 242. In response to the user pressing the registration button 242, the screen transitions to an account information input screen 250.

FIG. 27B illustrates an example of the account information input screen 250. The account information input screen 250 includes a user ID input field 251 and a password input field 252. The user enters the user ID and password and presses an OK button 253. The user logs in to the output system 50 and register the IC card number or UUID.

FIG. 28 illustrates an example of the my page screen 260 displayed by the PC. The my page screen 260 includes an IC card setting status display field 261 and a smart device setting status display field 262.

The IC card setting status display field 261 includes an IC card availability status 263, an IC card number 264, and a disable button 265. Availability indicates whether login with the IC card is possible.

The smart device setting status display field 262 includes a smart device availability status 266, UUID 267, and a disable button 268. Availability indicates whether login by the smart device is possible.

Figure 29A:
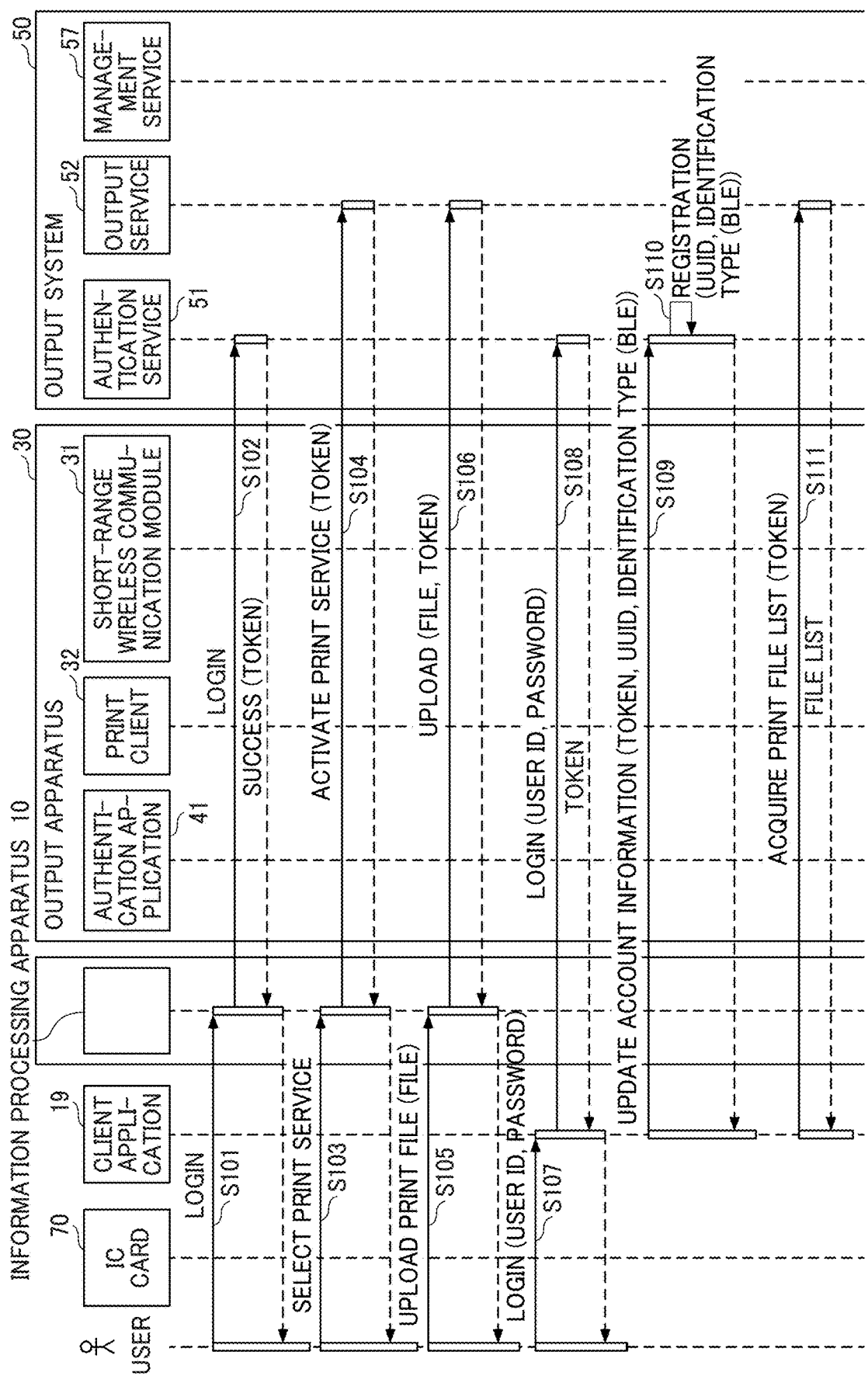

With reference to FIGS. 29A, 29B, 30, and 13 to 18, a process of pull print is described. FIGS. 29A and 29B are sequence diagrams illustrating an example of the process in which the information processing apparatus 10 registers a print job in the output system 50 and the output apparatus 30 acquires the print job from the output system 50 and prints the print job in response to an operation of the user. FIGS. 30 and 13 to 18 illustrate examples of screens referred to in the sequence diagram.

In steps S101 and S102, the user enters the user ID and password on the login screen displayed by the information processing apparatus 10. Since steps S101 and S102 are a stage in which the print job is being registered in the output system 50, the information processing apparatus 10 is assumed as a PC. However, a smartphone can also register the print job as the information processing apparatus 10.

The process of steps S101 and S102 may be the same as the process of S61 and S62 of FIG. 22. When the information processing apparatus 10 already holds the token, it is not necessary to enter the user ID and password.

In steps S103 and S104, the user operates the information processing apparatus 10 to display the print file management screen for uploading the print job to the information processing apparatus 10. An example of the print file management screen is illustrated in FIG. 30.

In step S105, the user selects the file to be printed on the print file management screen. The information processing apparatus 10 receives selection of the file. At this stage, the selected file can be set for automatic print.

In step S106, the information processing apparatus 10 uploads the print target file together with the token to the output service 52. The communication unit 55 of the output service 52 receives the file and stores the file in the print job storage unit 61 in association with the user ID identified by the token.

In step S107, the user activates the client application 19 on the information processing apparatus 10. In step S107, a smartphone is assumed as the information processing apparatus 10, but the PC may also be used. An example of the activation screen is illustrated in FIG. 13. The user transitions the activation screen to the terminal login screen and enters the user ID and password on the terminal login screen. An example of the terminal login screen is illustrated in FIG. 14.

In step S108, the communication unit 15 of the client application 19 sends a login request including the user ID and password to the output system 50. The communication unit 53 of the authentication service 51 receives the login request and determines whether the authentication is successful or unsuccessful depending on whether the pair of the user ID and the password is stored in the user information storage unit 62. In response to a successful authentication, the authentication service 51 generates a token and associates the token with the user ID. The communication unit 53 of the authentication service 51 transmits the token to the information processing apparatus 10.

In step S109, in response to the successful authentication, the client application 19 displays the terminal account registration screen. The user checks the automatic registration of the smart device authentication information and presses the completion button. FIG. 15 is a diagram illustrating an example of the terminal account registration screen.

The communication unit 15 of the client application 19 transmits an account information update including the token, UUID, and identification type to the authentication service 51.

In step S110, the communication unit 53 of the authentication service 51 receives the account information update. The authentication service 51 stores the identification type and UUID in the account information storage unit 63 in association with the user ID identified by the token.

In response to the user selecting the check box 301 associated with "register authentication information in the account" on the terminal account registration screen, the user can print by simply holding the smart device. In response to registering the authentication information, the top screen of FIG. 16 is displayed.

In step S111, the communication unit 15 of the client application 19 transmits a request for a print file list together with the token to the output service 52. The communication unit 55 of the output service 52 receives the request for the print file list. The output service 52 identifies the user ID associated with the token. The output service 52 acquires a list of print jobs identified by the user ID from the print job storage unit 61, and the communication unit 55 transmits the list to the information processing apparatus 10.

The communication unit 15 of the client application 19 receives the list of print jobs, and the display control unit 16 displays the print job list screen. FIG. 17 is a diagram illustrating an example of the print job list screen.

In step S112, the user selects the file to be automatically printed on the print job list screen and presses the completion button. The operation reception unit 17 of the client application 19 accepts the selection of the file.

In step S113, the communication unit 15 of the client application 19 transmits the print job ID and token of the selected print job to the output service 52. The communication unit 55 of the output service 52 receives the print job ID and the token and changes the print reservation setting associated with the print job ID to "TRUE".

In response to completion of the transmission, the information processing apparatus 10 displays the terminal login screen. FIG. 18 illustrates an example of the terminal login screen.

In step S114, the user holds the information processing apparatus 10 or the IC card over the output apparatus 30 to log in for the automatic print. When the user logs in with the information processing apparatus 10, the user holds the information processing apparatus 10 over the operation panel while keeping the terminal login screen displayed. When logging in with the IC card, the user holds the IC card over the operation panel.

The short-range wireless communication unit 34 of the output apparatus 30 communicates with the IC card or smart device. The short-range wireless communication unit 34 acquires the IC card number or UUID.

In step S115, the internal communication unit 35 of the short-range wireless communication module 31 notifies the authentication application 41 of the IC card number or UUID and the identification type (either the IC card or the smart device).

In step S116, the communication unit 43 of the authentication application 41 transmits a login request to the authentication service 51 including the IC card number or UUID and a device authentication ticket. The communication unit 53 of the authentication service 51 receives the login request. The authentication service 51 determines whether the IC card number or UUID is stored in the account information storage unit 63. The UUID is stored at the time of step S116. The IC card number may be stored by the process illustrated in FIG. 26 or the like. The communication unit 53 of the authentication service 51 transmits a successful authentication result and the token associated with the user ID to the output apparatus 30.

In step S117, the communication unit 43 of the authentication application 41 receives the token. The internal communication unit 45 of the authentication application 41 transmits the token and the identification type to the print client 32.

In step S118, the communication unit 36 of the print client 32 transmits to the output service 52, a request for the print job including the token and the identification type. The communication unit 55 of the output service 52 receives the print job request. The output service 52 identifies the user ID based on the token. The output service 52 acquires the print job associated with the user ID and having the print reservation setting "TRUE" from the print job storage unit 61. The communication unit 55 of the output service 52 transmits the print job to the output apparatus 30.

In step S118, the output service 52 refers to automatic print execution settings to be described with reference to FIG. 35. The output service 52 determines whether the user has logged in with the IC card or information processing apparatus 10 permitted to perform the automatic print. In the output service 52, the communication unit 55 transmits the print job having the print reservation setting "TRUE" to the output apparatus 30 only when the user logs in with the identification type permitted to perform the automatic print. When the output service 52 logs in with an identification type that is not permitted to perform automatic printing, the communication unit 55 transmits the print job having the print reservation setting "TRUE" or "FALSE" to the output apparatus 30. When the user logs in with the identification type permitted to perform the automatic print, the communication unit 55 of the output service 52 notifies the output apparatus 30 that the user logged in with the identification type permitted to perform the automatic print. As a result, the output apparatus 30 can switch between executing the automatic print and displaying the print job list.

In step S119, the communication unit 36 of the print client 32 receives the print job. The internal communication unit 38 of the print client 32 prints the file by passing the print job to the print application 33.

During printing, the output apparatus 30 displays the print execution screens of FIGS. 31 to 34. When the user wants to stop the job during printing, the user can interrupt execution of the print job by pressing a stop key on the operation panel. The output apparatus 30 displays that the printing has been stopped.

FIG. 30 is a diagram illustrating an example of a print file management screen 270 displayed by the information processing apparatus 10. The print file management screen 270 displays a print job list 271 registered by the user in the output system 50. Each print job is displayed with a check box 272, and the user selects a print job by checking the check box 272.

Figure 31:
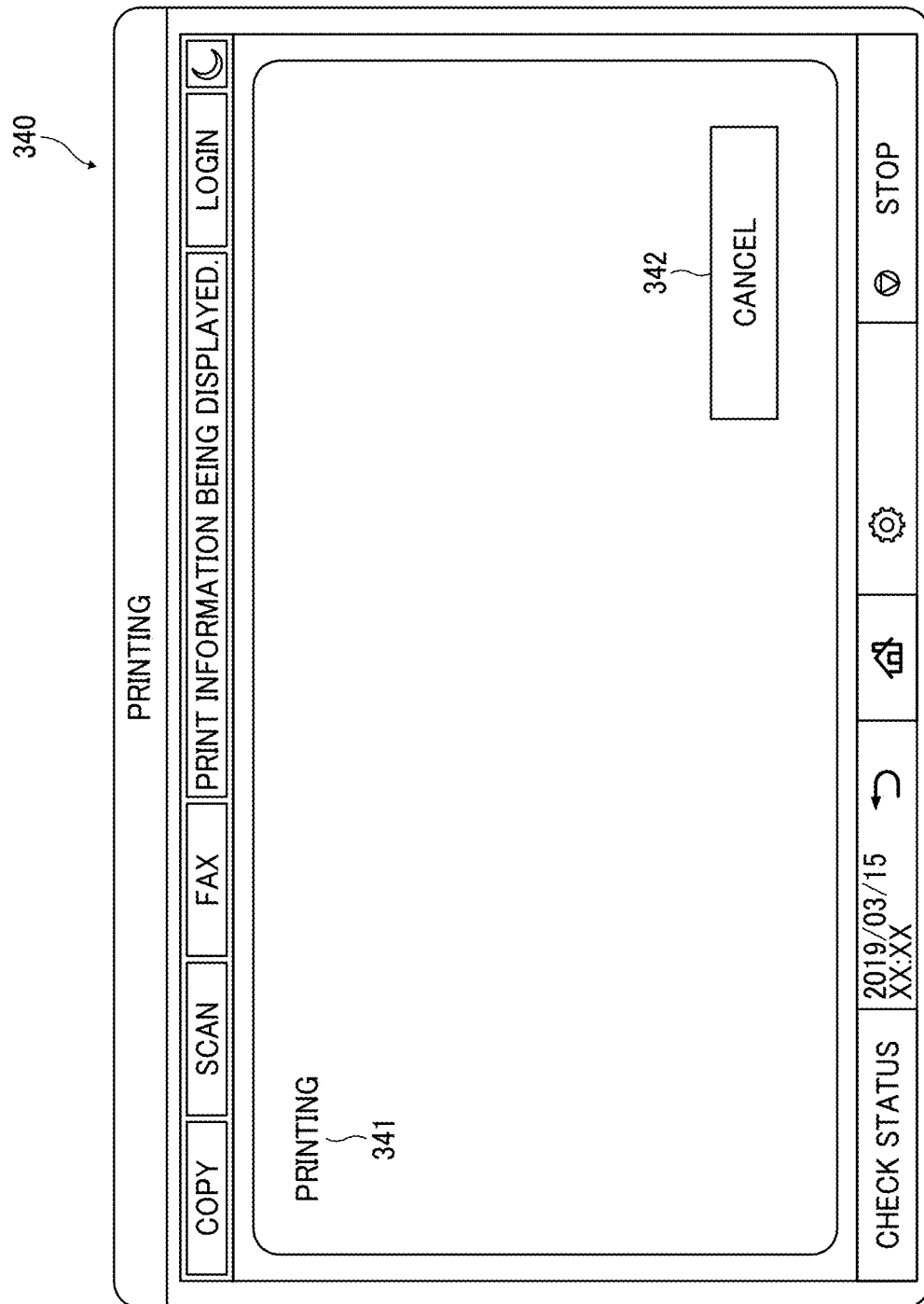
FIG. 31 is a diagram illustrating an example of a first print execution screen displayed by the output apparatus.

FIG. 31 illustrates an example of a first print execution screen displayed by the output apparatus 30. The first print execution screen 340 is displayed by the output apparatus 30 in response to receiving the identification information of the print job. The first print execution screen 340 includes the message 341 "printing" and a cancel button 342.

Figure 32:
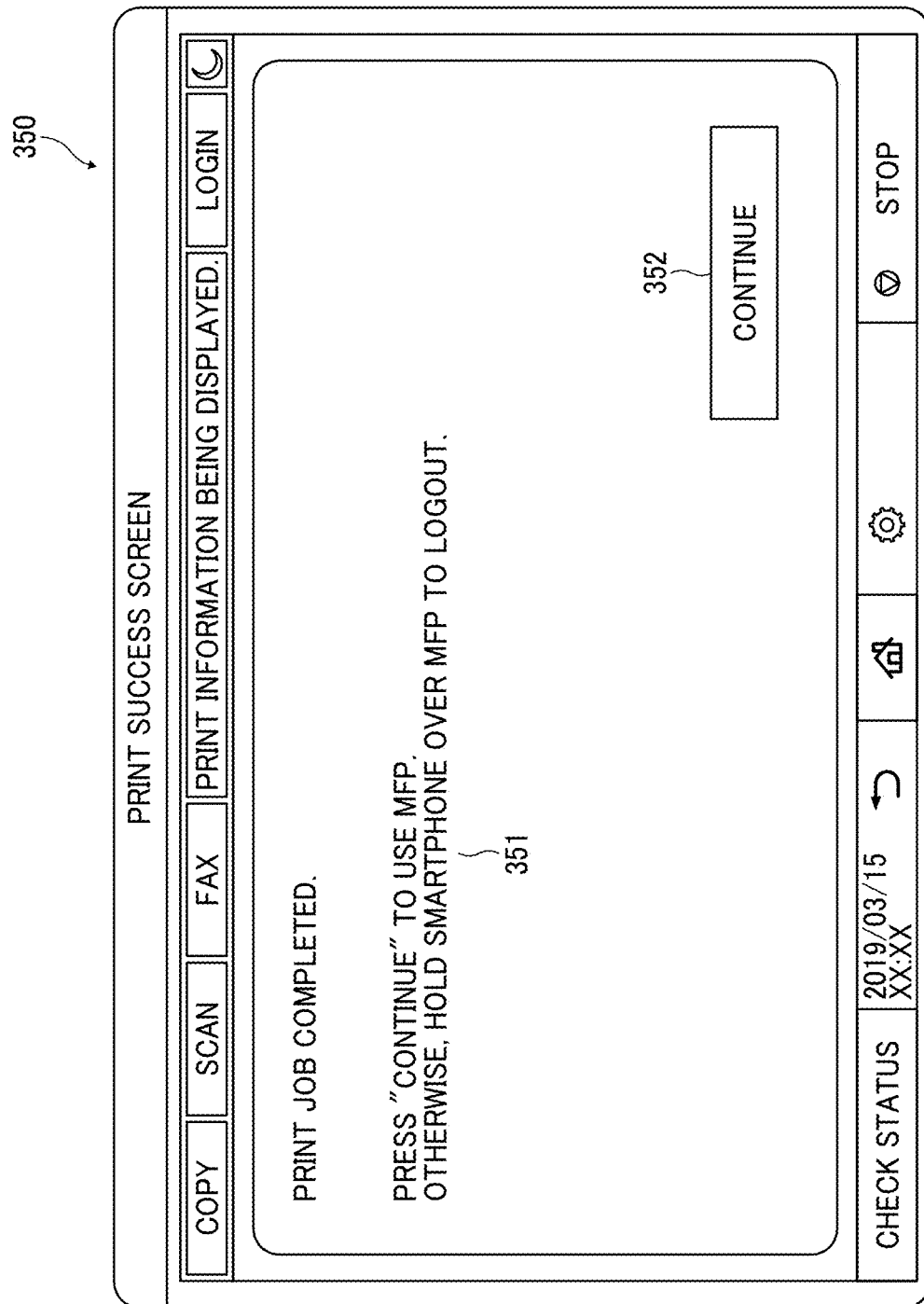
FIG. 32 is a diagram illustrating an example of a second print execution screen displayed by the output apparatus.

In response to a successful printing, the first print execution screen 340 transitions to a second print execution screen 350 illustrated in FIG. 32. The second print execution screen 350 displays a completion of printing. In addition, the second print execution screen 350 includes a message 351 stating, "Press "continue" to use MFP. Otherwise, hold smartphone over MFP to logout." and an operation continuation button 352.

Figure 33:
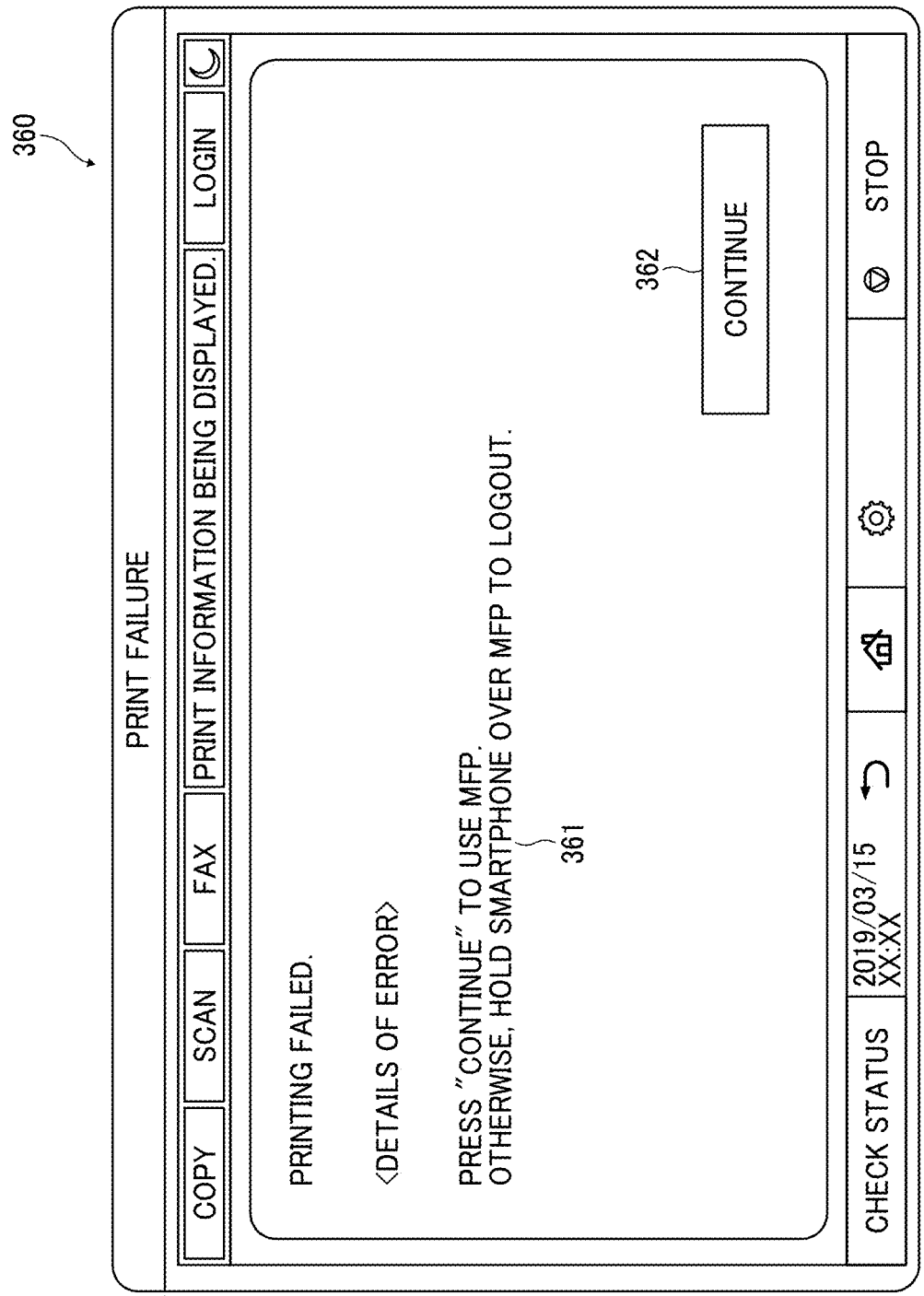
FIG. 33 is a diagram illustrating an example of a third print execution screen displayed by the output apparatus.

In response to a print failure, the first print execution screen 340 transitions to a third print execution screen 360 illustrated in FIG. 33. The third print execution screen 360 displays a printing failure. The third print execution screen 360 includes a message 361 stating "Press "continue" to use MFP. Otherwise, hold smartphone over MFP to logout." and an operation continuation button 362.

The printing failure occurs when the output apparatus 30 cannot receive the print job, when the output apparatus 30 causes an error such as running out of paper, and the like.

Figure 34:
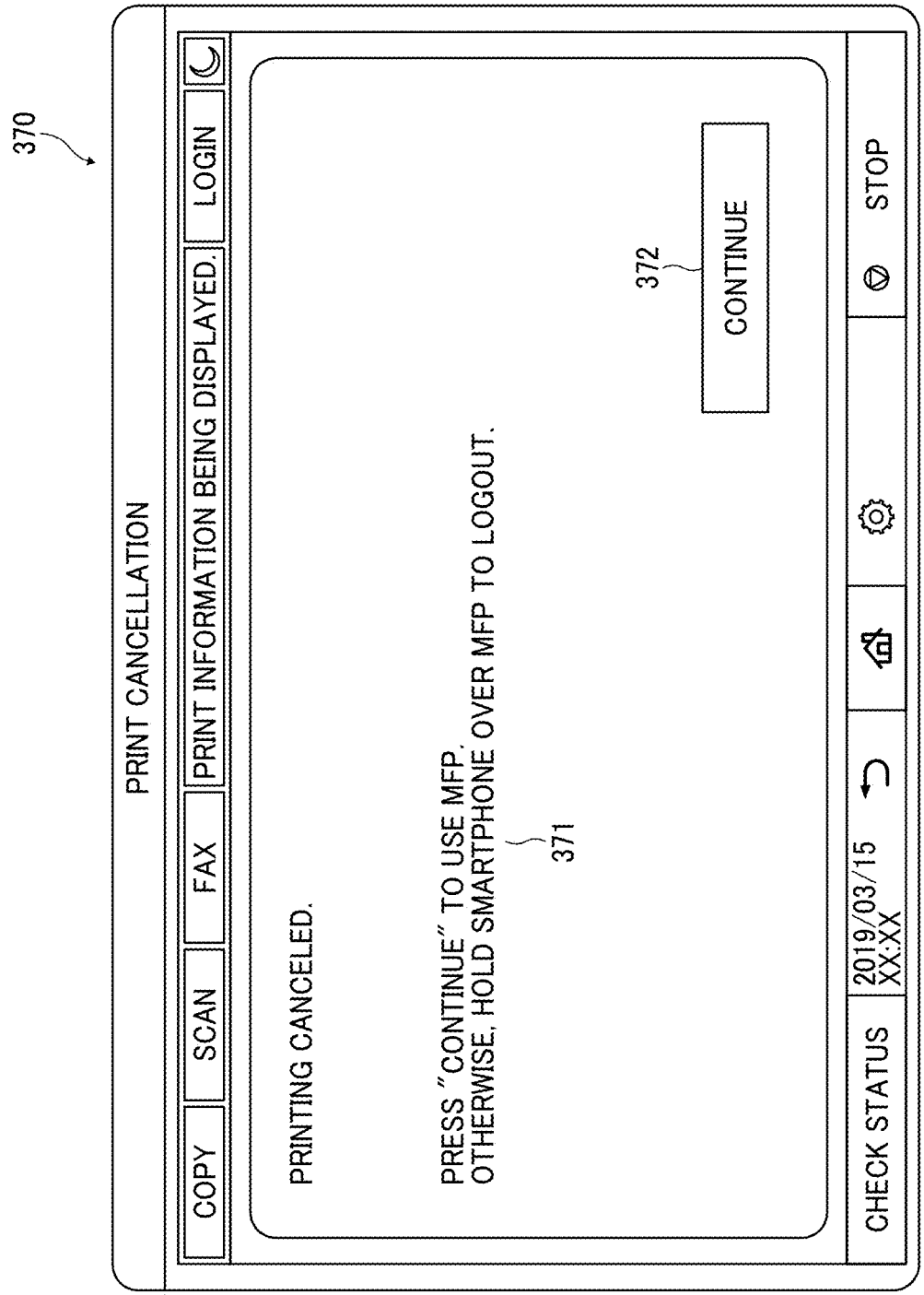
FIG. 34 is a diagram illustrating an example of a fourth print execution screen displayed by the output apparatus.

In response to a cancellation of printing, the first print execution screen 340 transitions to a fourth print execution screen 370 illustrated in FIG. 34. The fourth print execution screen 370 displays the cancellation of printing. In addition, the fourth print execution screen 370 includes a message 371 stating "Press "continue" to use MFP. Otherwise, hold smartphone over MFP to logout." and an operation continuation button 372.

In FIGS. 29A and 29B, in response to the user holding the information processing apparatus 10 or the IC card over the output apparatus 30, printing is automatically executed. However, the user may want the output apparatus 30 to display a list of print jobs to select a print job to be printed by the output apparatus 30. Therefore, the user can set whether to execute the automatic print on the output system 50.

Figure 35:
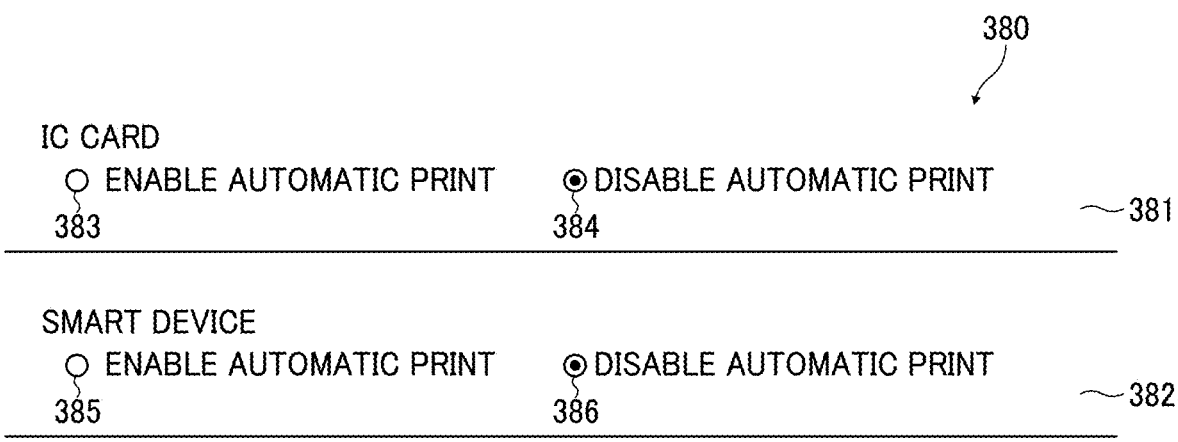
FIG. 35 is a diagram illustrating an example of an automatic print execution setting screen displayed by the information processing apparatus.

FIG. 35 is a diagram illustrating an example of an automatic print execution setting screen 380 displayed by the information processing apparatus 10. The user logs in, displays the my page screen on the information processing apparatus 10, selects a menu, and displays the automatic print execution setting screen 380.

The automatic print execution setting screen 380 includes an IC card setting field 381 and a smart device setting field 382. The IC card setting field 381 includes a radio button 383 that enables the automatic print and a radio button 384 that disables the automatic print. The user sets whether to enable the automatic print when the IC card is held over.

The smart device setting field 382 includes a radio button 385 that enables the automatic print and a radio button 386 that disables the automatic print. The user sets whether to enable the automatic print when the smart device is held over.

In response to the user setting the radio buttons 384 and 386 that disable the automatic print, the automatic print is not executed even when the user logs in to the output apparatus 30 in step S118 of FIG. 29. The print client 32 of the output apparatus 30 displays a list of print jobs.

FIG. 36 is an example of a print job selection screen 390 displayed in response to the user holding the IC card or the information processing apparatus 10 over the output apparatus 30 with the radio buttons 384 and 386 that disable the automatic print selected. The print job selection screen 390 includes the print job 391 associated with the user ID. The user selects a print job (file) and presses the confirmation button 392. Accordingly, the output apparatus 30 prints the selected file. The print job selection screen 390 may display only the print job with the print reservation setting "TRUE".

According to the automatic print execution setting screen 380, the user can change whether to perform the automatic print depending on whether the user logs in with the IC card or the information processing apparatus 10. For example, since the user who uses the information processing apparatus 10 often has already selected the print job, the user checks the radio button 385 for the automatic print. Since the user who uses the IC card cannot select the print job, the user checks the radio button 384 that disables the automatic print. As described above, the output apparatus 30 can switch between enabling and disabling the automatic print depending on whether the user logs in with the IC card or the information processing apparatus 10.

According to the information processing system of the present embodiment, in addition to the effect of the first embodiment, the user can login with the IC card. In addition, the administrator can set the availability of the IC card or smart device for each output apparatus 30. When the IC card number or UUID is not registered, the user can register the IC card number or UUID by holding the IC card or the information processing apparatus 10 over the output apparatus 30 and logging in with the user ID and password.

The above-described embodiment is illustrative and do not limit the present disclosure. Thus, numerous additional modifications and variations are possible in light of the above teachings within the scope of the present disclosure. Any one of the above-described operations may be performed in various other ways, for example, in an order different from the one described above.

For example, not only the information processing apparatus 10 but also the output apparatus can display the list of print jobs. The user can select a print job to print on the output apparatus 30. In this case, the user can set the print settings on the output apparatus 30.

Further, in the present embodiment, the image forming apparatus is mainly used as the output apparatus 30, but the present disclosure is not limited to the image forming apparatus. The output apparatus 30 includes, for example, an output apparatus such as a projector (PJ), an interactive white board (a white board having an electronic blackboard function capable of mutual communication (IWB)), a digital signage, a head up display (HUD) device, and an industrial machine, an imaging device, a sound collecting device, a medical device, a network home appliance, an automobile (connected car), a notebook PC, a mobile phone, a smartphone, a tablet terminal, a game console, a personal digital assistant (PDA), a digital camera, a wearable PC or a desktop PC.

Further, the configuration example illustrated in FIG. 6 and the like is divided according to the main functions in order to facilitate understanding of the processing by the information processing apparatus 10, the output system 50, and the output apparatus 30. The present disclosure is not limited by the way of dividing the processing unit or the name. The processing of the information processing apparatus 10, the output system 50, and the output apparatus 30 can be divided into more processing units according to the processing content. Further, one processing unit can be divided so as to include more processing.

The apparatuses or devices described in the present embodiments are merely one example of plural computing environments that implement one or more embodiments disclosed herein. In certain embodiments, the output system 50 includes a plurality of computing devices, such as a server cluster. The plurality of computing devices is configured to communicate with one another through any type of communication link, including a network, shared memory, etc., and perform the processes disclosed herein.

Further, the output system 50 can be configured to share the disclosed processing steps, such as FIG. 10, in various combinations. For example, a process executed by a unit may be executed by a plurality of information processing apparatuses included in the output system 50. Further, the output system 50 may be integrated into one server or may be divided into a plurality of devices.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), a digital signal processor (DSP), a field programmable gate array (FPGA), and conventional circuit components arranged to perform the recited functions.

The invention claimed is:

1. A system for interacting with a client which includes a client application configured to receive and process a login request from a user, the system comprising:
a server including:
circuitry configured to receive a print job from the client after the client receives and processes the login request;
circuitry configured to create a print job list including the print job, another print job, and a third print job;
circuitry configured to make a print reservation for the print job and the another print job without including the third print job in response to a selection of the print job from the print job list, the selection being transmitted from the client in association with the user who performed the login; and
circuitry configured to transmit the print job; and
a printer including circuitry configured to read a QR code displayed by a terminal, the QR code corresponding to the print job, circuitry configured to transmit, circuitry configured to receive, and circuitry configured to print,
wherein after reading the QR code by the circuitry configured to read and transmitting corresponding information by the circuitry configured to transmit of the printer, the circuitry configured to receive of the printer receives the print job and the another print job from the server and the circuitry configured to print prints the print job and the another print job, without printing the third print job.

2. The system according to claim 1, wherein:
the printer includes circuitry configured to obtain the information which is identification information based on the QR code,
the circuitry configured to transmit of the printer transmits the identification information as the corresponding information to the server,
the server includes circuitry configured to receive the identification information, and the circuitry configured to transmit the print job of the server transmits the print job to the printer based on the identification information which is received, and
the circuitry configured to print prints the print job after the circuitry configured to receive of the printer receives the print job from the server.

3. The system according to claim 2, wherein:
the identification information is information corresponding to a user.

4. The system according to claim 3, wherein:
the identification information is a universally unique identifier (UUID).

5. The system according to claim 1, wherein the server further comprises:
circuitry configured to delete the print reservation in response to the printer printing the print job.

6. The system of claim 1, wherein the server further comprises:
circuitry configured to receive a type of device that transmits source identification information corresponding to the QR code and a setting of whether to allow login according to the type of device,
circuitry configured to transmit the setting to the terminal.

7. The system of claim 1, wherein the server further comprises:

circuitry configured to associate user identification information with the print job; and
circuitry configured to transmit a token to the printer in response to a login request from the printer including source identification information which corresponds to the QR code, the source identification information received from the printer,
wherein in response to a request of electronic data corresponding to the QR code, the request being received from the printer including the token, the circuitry configured to transmit of the server transmits the print job which is associated with the user identified by the token to the printer.

8. The system of claim 1, wherein:
the printer is a multifunction peripheral.

9. The system of claim 1, wherein:
the print job originates from the terminal.

10. The system according to claim 1, wherein:
the printer automatically executes printing of the print job in response to the printer reading the QR code displayed on the terminal.

11. The system according to claim 1, wherein:
the terminal further includes circuitry configured to receive changed print settings.

12. The system according to claim 1, wherein:
the terminal further includes circuitry configured to send the print job to the server, and
the server includes circuitry configured to reserve the print job sent by the terminal.

13. A method, comprising:
receiving, by a server, a print job from a client which includes a client application which has received and processed a login request from a user;
creating a print job list including the print job, another print job, and a third print job;
making a print reservation for the print job and the another print job without including the third print job in response to a selection of the print job from the print job list, the selection being transmitted from the client in association with the user who performed the login;
reading, by a printer, a QR code displayed by a terminal, the QR code corresponding to the print job;
transmitting information corresponding to the QR code from the printer to the server;
transmitting, from the server, the print job and the another print job to the printer in response to receiving the information corresponding to the QR code; and
printing the print job and the another print job by the printer, without printing the third print job.

14. The method according to claim 13, further comprising:
obtaining, by the printer, the information which is identification information based on the QR code,
wherein the transmitting of the information corresponding to the QR code transmits the identification information as the corresponding information to the server,
the method further comprising receiving the identification information by the server,
wherein the transmitting the print job from the server to the printer transmits the print job to the printer based on the identification information, and
wherein the printing prints the print job after the printer receives the print job from the server.

15. The method according to claim 13, further comprising:
deleting the print reservation in response to the printer printing the print job.

16. The method of claim 13, further comprising:
receive, by the server, a type of device that transmits source identification information corresponding to the QR code and a setting of whether to allow login according to the type of device,
transmitting, by the server, the setting to the terminal.

17. The method of claim 13, further comprising:
associating user identification information with the print job; and
transmitting a token to the printer in response to a login request from the printer including source identification information which corresponds to the QR code, the source identification information received from the printer,
wherein in response to a request of electronic data corresponding to the QR code, the request being received from the printer including the token, the transmitting of the print job from the server transmits the print job which is associated with the user identified by the token to the printer.

18. The method of claim 13, wherein:
the print job originates from the terminal.

* * * * *